US012673402B2

(12) United States Patent
Zheng et al.

(10) Patent No.: US 12,673,402 B2
(45) Date of Patent: Jul. 7, 2026

(54) FASTENER DRIVER AND NAIL GUN

(71) Applicant: Nanjing Chervon Industry Co., Ltd., Nanjing (CN)

(72) Inventors: Chengyu Zheng, Nanjing (CN); Hengyong Hu, Nanjing (CN); Li Xing, Nanjing (CN); Shubin Tong, Nanjing (CN); Lianghua Ni, Nanjing (CN); Jian Yu, Nanjing (CN); Xu Wang, Nanjing (CN); Tao Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/255,032

(22) Filed: Jun. 30, 2025

(65) Prior Publication Data

US 2025/0326099 A1 Oct. 23, 2025

Related U.S. Application Data

(63) Continuation of application No. PCT/CN2024/139023, filed on Dec. 13, 2024.

(30) Foreign Application Priority Data

| | | |
|---|---|---|
| Dec. 25, 2023 | (CN) | 202311804837.7 |
| Dec. 25, 2023 | (CN) | 202311809662.9 |
| Dec. 25, 2023 | (CN) | 202323566807.5 |
| Mar. 20, 2024 | (CN) | 202410320585.9 |
| Dec. 5, 2024 | (CN) | 202411779342.8 |

(51) Int. Cl.
*B25C 1/00* (2006.01)

(52) U.S. Cl.
CPC .............. *B25C 1/008* (2013.01); *B25C 1/001* (2013.01)

(58) Field of Classification Search
CPC .. B25C 1/04; B25C 1/00; B25C 1/008; B25C 1/06; B25C 1/001; B25C 1/047; B25C 7/00
See application file for complete search history.

(56) References Cited

U.S. PATENT DOCUMENTS

| | | | | |
|---|---|---|---|---|
| 2012/0085806 A1* | 4/2012 | Lee | B25C 1/008 227/8 |
| 2019/0039219 A1* | 2/2019 | Suarez | B25C 5/1606 |
| 2021/0362311 A1* | 11/2021 | Garces | B25C 1/008 |
| 2022/0134522 A1* | 5/2022 | Zimmerman | B25C 1/005 |
| 2023/0264332 A1* | 8/2023 | Neuhoff | B25C 1/04 227/107 |

* cited by examiner

*Primary Examiner* — Thomas M Wittenschlaeger
(74) *Attorney, Agent, or Firm* — Greenberg Traurig, LLP

(57) ABSTRACT

A fastener driver includes: a trigger assembly operated by a user to switch between a first state in which a striker is allowed to strike a fastener and a second state in which the striker is forbidden to strike the fastener; a lifting assembly, where at least part of the lifting assembly is movably disposed in a magazine to drive the fastener to move in the magazine; and a dry fire prevention assembly having a dry fire prevention state, where the dry fire prevention assembly includes a stopper, and in the dry fire prevention state, the trigger assembly is forbidden by the stopper to switch to the first state. When the trigger assembly obstructs the stopper from performing a first motion, the lifting assembly drives the stopper to perform a second motion.

20 Claims, 35 Drawing Sheets

FASTENER DRIVER AND NAIL GUN

RELATED APPLICATION INFORMATION

This application is a continuation of International Application Number PCT/CN2024/139023, filed on Dec. 13, 2024, through which this application also claims the benefit under 35 U.S.C. § 119(a) of Chinese Patent Application No. 202311809662.9 filed on Dec. 25, 2023, Chinese Patent Application No. 202311804837.7 filed on Dec. 25, 2023, Chinese Patent Application No. 202323566807.5 filed on Dec. 25, 2023, Chinese Patent Application No. 202410320585.9 filed on Mar. 20, 2024, and Chinese Patent Application No. 202411779342.8 filed on Dec. 5, 2024, the disclosures of which are incorporated herein by reference in their entireties.

BACKGROUND

A fastener driver in the related art is usually used for fixing a workpiece. A user drives a fastener into the workpiece to fix the workpiece. In general, the user needs to load multiple fasteners into the magazine of the fastener driver to continuously use the fastener driver. When a small number of fasteners remain in the magazine of the fastener driver in the related art, the fasteners and the striker may not fit well, affecting the user experience.

This part provides background information related to the present application, and the background information is not necessarily the existing art.

SUMMARY

An object of the present application is to solve or at least alleviate part or all of the preceding problems. The present application provides a fastener driver that is convenient to use.

The present application adopts the technical solutions below.

In a first aspect, an example of the present application provides a fastener driver. The fastener driver includes: a striking assembly including a striker configured to strike a fastener; and a magazine for accommodating the fastener. The fastener driver further includes: a trigger assembly operated by a user to switch between a first state in which the striker is allowed to strike the fastener and a second state in which the striker is forbidden to strike the fastener; a lifting assembly, where at least part of the lifting assembly is movably disposed in the magazine to drive the fastener to move in the magazine; and a dry fire prevention assembly having a dry fire prevention state, where the dry fire prevention assembly includes a stopper, and in the dry fire prevention state, the trigger assembly is forbidden by the stopper to switch to the first state. When the trigger assembly obstructs the stopper from performing a first motion, the lifting assembly drives the stopper to perform a second motion.

In some examples, the first motion is a first movement of rotating about a first axis along a first direction, and the second motion includes the first movement of rotating about the first axis along the first direction and a second movement of rotating about a second axis along a second direction.

In some examples, the lifting assembly includes a first lifting portion, the stopper includes a first abutment surface, and the first lifting portion abuts against the first abutment surface to drive the stopper to perform the first motion or the second motion.

In some examples, when the stopper performs the second motion, the lifting assembly drives the fastener to move.

In some examples, at least part of the trigger assembly is configured to move along a first straight line, and the trigger assembly includes an obstruction portion in the circumferential direction of the first straight line and a trigger portion extending substantially perpendicular to the first straight line.

In some examples, the fastener drive further includes an elastic member, where when the lifting assembly applies a first action force to the stopper and the obstruction portion applies a second action force to the stopper, the stopper applies a third action force to the elastic member to perform the second motion.

In some examples, the elastic member drives the stopper to perform a third motion when the second action force decreases to zero.

In some examples, the first motion is a first movement of rotating about a first axis along a first direction, the second motion includes the first movement of rotating about the first axis along the first direction and a second movement of rotating about a second axis along a second direction, and the third motion includes the first movement of rotating about the first axis along the first direction and a third movement of rotating about the second axis along a third direction.

In some examples, the elastic member has an elastic force, and the ratio of the elastic force to the mass of the stopper is greater than 1 N/g and less than or equal to 10 N/g.

In some examples, the trigger assembly includes an accommodation compartment, and the accommodation compartment accommodates at least part of an induction device that causes the trigger assembly to switch between the first state and the second state.

In some examples, the dry fire prevention assembly includes a limit portion that limits the magnitude of the second motion of the stopper.

In some examples, the limit portion includes an accommodation space, the stopper includes a rotary portion accommodated in the accommodation space, and the length of the accommodation space in a front and rear direction limits the magnitude of the second motion of the stopper.

In some examples, in the front and rear direction, the ratio of the length of the accommodation space to the length of the rotary portion is greater than or equal to 1.2.

In some examples, the limit portion is provided on the magazine.

A fastener driver includes: a striking assembly including a striker configured to strike a fastener; and a magazine for accommodating the fastener. The fastener driver further includes: a trigger assembly operated by a user to switch between a first state in which the striker is allowed to strike the fastener and a second state in which the striker is forbidden to strike the fastener; a lifting assembly, where at least part of the lifting assembly is movably disposed in the magazine to drive the fastener to move in the magazine; and a dry fire prevention assembly having a dry fire prevention state, where the dry fire prevention assembly includes a stopper, and in the dry fire prevention state, the trigger assembly is forbidden by the stopper to switch to the first state. When a preset number of fasteners remain in the magazine, the lifting assembly drives the stopper to perform a motion, where the motion includes a movement of rotating about a first axis and a movement of rotating about a second axis.

In some examples, the stopper flips to allow at least part of the lifting assembly to be lifted when the preset number of the fasteners remain in the magazine.

A fastener driver includes: a striking assembly including a striker configured to strike a fastener; and a magazine for accommodating the fastener. The fastener driver further includes: a trigger assembly operated by a user to switch between a first state in which the striker is allowed to strike the fastener and a second state in which the striker is forbidden to strike the fastener; a dry fire prevention assembly having a dry fire prevention state, where the dry fire prevention assembly includes a stopper, and in the dry fire prevention state, the trigger assembly is forbidden by the stopper to switch to the first state; a lifting assembly, where at least part of the lifting assembly is movably disposed in the magazine to drive the fastener to move in the magazine, and the lifting assembly is configured to drive the stopper to switch to the dry fire prevention state; and an elastic member abutting against the stopper. When the trigger assembly is in the first state and obstructs the stopper from switching to the dry fire prevention state, the elastic member absorbs energy, and when the trigger assembly switches to the second state, the elastic member releases the energy to drive the stopper to switch to the dry fire prevention state.

In some examples, at least part of the trigger assembly is configured to move along a first straight line, and the trigger assembly includes an obstruction portion in the circumferential direction of the first straight line and a trigger portion extending substantially perpendicular to the first straight line.

In some examples, the trigger assembly includes an accommodation compartment, and the accommodation compartment accommodates at least part of an induction device that causes the trigger assembly to switch between the first state and the second state.

In some examples, the elastic member has an elastic force, and the ratio of the elastic force to the mass of the stopper is greater than 1 N/g and less than or equal to 10 N/g.

In a second aspect, an example of the present application provides a nail gun. The nail gun includes: a housing; an electric motor disposed in the housing; a firing assembly configured to be movable from an initial position to a firing position to drive a nail into a workpiece and movable from the firing position to the initial position within a nailing cycle; at least one light-emitting device disposed on the housing; a driver circuit configured to at least control the energization of the electric motor; a first control circuit configured to independently control the light-emitting device at least when the electric motor is not started; a light emission control switch connected to the first control circuit; and a controller configured to at least control the running of the electric motor, where the controller is configured to control the electric motor to start when receiving a signal that the electric motor is energized and the light emission control switch is triggered.

In some examples, the nail gun further includes a main unit switch configured to at least control the energization of the controller.

In some examples, the nail gun further includes a push rod switch disposed at the lower end of the firing assembly, and the push rod switch is triggered when abutting against the workpiece.

In some examples, when the main unit switch and the push rod switch are both triggered, the driver circuit is turned on and the electric motor is energized.

In some examples, when the light emission control switch, the main unit switch, and the push rod switch are all triggered, the electric motor is controlled to start.

In some examples, the nail gun further includes a detection circuit configured to detect whether the light emission control switch is triggered.

In some examples, the detection circuit sends the corresponding signal that the light emission control switch is triggered to the controller.

In some examples, the controller is configured to control the start of the electric motor according to the state of the driver circuit and the state of the detection circuit.

In some examples, when the light-emitting device is lit, the electric motor is not necessarily energized.

In some examples, the first control circuit and the driver circuit are disposed on the same circuit board.

In some examples, the first control circuit and the driver circuit are disposed on different circuit boards.

In some examples, the nail gun further includes a parameter detection unit configured to be capable of detecting an operating parameter of the electric motor and/or a battery parameter of a battery pack for powering the nail gun.

In some examples, the controller is configured to capable of at least controlling the light-emitting device to change a light emission form to issue an alarm prompt when a fault of the nail gun is determined according to the operating parameter and/or the battery parameter.

In this example, the light-emitting device is configured to issue the alarm prompt in at least one form of the number of light-emitting devices, an emitted color, a light emission frequency, the number of flashes, a brightness level, or the content displayed through light emission.

In some examples, the housing is further formed with a handle portion for a user to hold, the light emission control switch and the main unit switch are disposed in the handle portion separately, and the light emission control switch and the main unit switch are configured to adjacent to each other.

A nail gun includes: a housing; an electric motor disposed in the housing; a firing assembly configured to be movable from an initial position to a firing position to drive a nail into a workpiece and movable from the firing position to the initial position within a nailing cycle; at least one light-emitting device disposed on the housing; a driver circuit configured to at least control the energization of the electric motor; a first control circuit configured to independently control the light-emitting device at least when the electric motor is not started; a controller configured to at least control the running of the electric motor; and a detection circuit connected to the first control circuit and the controller, where the controller is configured to control the start of the electric motor according to the state of the driver circuit and the state of the detection circuit.

A nail gun includes: a housing; an electric motor disposed in the housing; a firing assembly configured to be movable from an initial position to a firing position to drive a nail into a workpiece and movable from the firing position to the initial position within a nailing cycle; at least one light-emitting device disposed on the housing; a light emission control switch controlling at least the state of the light-emitting device; a controller controlling at least the running of the electric motor; a main unit switch controlling at least the energization of the controller; and a push rod switch disposed at the lower end of the firing assembly, where when the push rod switch abuts against the workpiece, the push rod switch is triggered. The controller is configured to control the electric motor to start when receiving a signal that the light emission control switch, the main unit switch, and the push rod switch are all triggered.

In some examples, the nail gun further includes a first control circuit configured to independently control the light-emitting device to operate at least when the electric motor is not started.

In some examples, the light emission control switch is connected to the first control circuit, and the first control circuit is connected to the controller.

In some examples, the controller is configured to control the electric motor to start when receiving the signal that the light emission control switch, the main unit switch, and the push rod switch are all triggered and remain in a triggered state.

In a third aspect, an example of the present application provides a fastener driver. The fastener driver includes: a transmission mechanism for driving a striking assembly to move, where the striking assembly includes a striker; an accommodation portion; and a light-emitting device including a connection portion, where at least part of the connection portion is movably accommodated in the accommodation portion.

In some examples, the connection portion includes a slider, and the accommodation portion includes a rail for guiding the slider to move.

In some examples, the light-emitting device includes a light-emitting portion, and the light-emitting portion moves along with the connection portion when the connection portion moves relative to the accommodation portion.

In some examples, the light-emitting portion is rotatable relative to the connection portion.

In some examples, the light-emitting device includes a light-emitting portion and a flexible rod, and the light-emitting portion is connected to the connection portion through the flexible rod.

In some examples, the fastener driver includes a trigger configured to control the start and stop of the fastener driver, and at least part of the accommodation portion is disposed above the trigger.

In some examples, the fastener driver includes a housing, the housing includes a transmission portion accommodating at least part of the transmission mechanism, and the accommodation portion is disposed on the transmission portion.

In some examples, the accommodation portion is configured to be substantially parallel to the extension direction of the transmission housing.

In some examples, the connection portion is configured to slide along the extension direction of the accommodation portion.

In some examples, the light-emitting device includes a light-emitting diode (LED).

In a fourth aspect, an example of the present application provides a fastener driver. The fastener driver includes: a striking assembly including a striker and a piston connected to the striker; a transmission mechanism driving the striking assembly to move; a magazine configured to accommodate a fastener; and a display device configured to display visual information to a user by emitting light. The display device extends substantially along an extension direction. The display device includes a light-emitting portion, and the length of the light-emitting portion in the extension direction is greater than or equal to 30 mm.

In some examples, the fastener driver further includes a sensing device configured to sense the number of fasteners, and the display device displays the visual information in response to the number of fasteners sensed by the sensing device.

In some examples, the display device has a first mode and a second mode, and the display device switches between the first mode and the second mode according to the number of fasteners sensed by the sensing device.

In some examples, the light-emitting portion emits light in the first mode, and the light-emitting portion is off in the second mode.

In some examples, the fastener driver further includes a controller, the sensing device includes a transmitting portion configured to transmit a signal and a receiving portion configured to receive the signal transmitted by the transmitting portion, and when the receiving portion receives the signal, the controller controls the display device to display the visual information.

In some examples, the display device is disposed on the magazine.

In some examples, the sensing device is disposed on the magazine.

In some examples, the display device and at least part of the sensing device are located on two sides of the fastener, respectively.

In some examples, the display device includes multiple lamp beads arranged along the extension direction.

A fastener driver includes: a striking assembly including a striker and a piston connected to the striker; a transmission mechanism driving the striking assembly to move; a magazine configured to accommodate a fastener and extending substantially along an extension direction; and a display device displaying visual information to a user by emitting light. The display device is disposed on the magazine, and the length of the display device in the extension direction is greater than or equal to 30 mm.

BRIEF DESCRIPTION OF THE DRAWINGS

FIG. 58 is a fifth circuit schematic of a nail gun according to an example.

DETAILED DESCRIPTION

Figure 1:
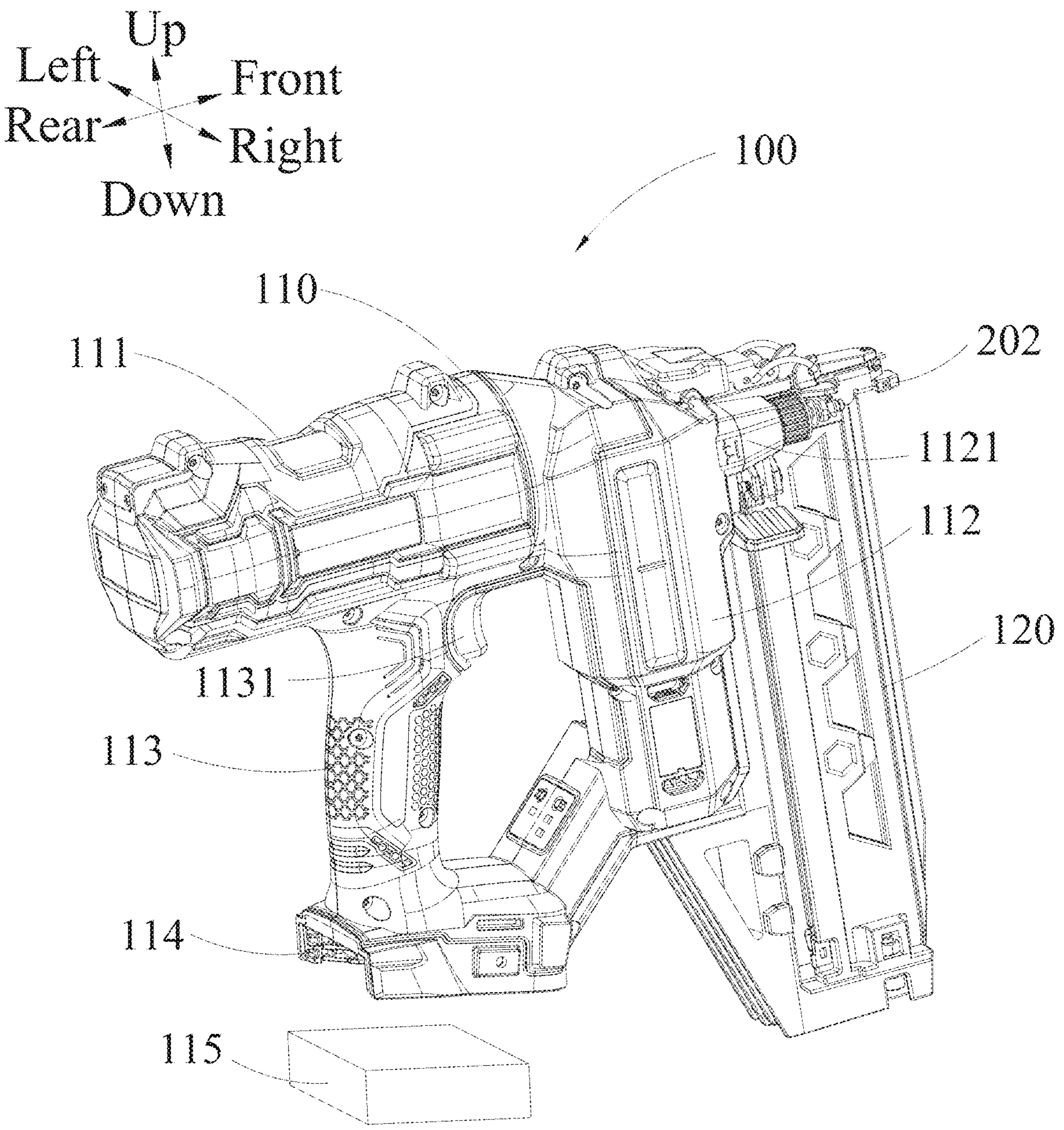
FIG. 1 is a perspective view of a fastener driver according to an example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

Technical solutions of the present application are further described below in conjunction with drawings and examples.

Figure 2:
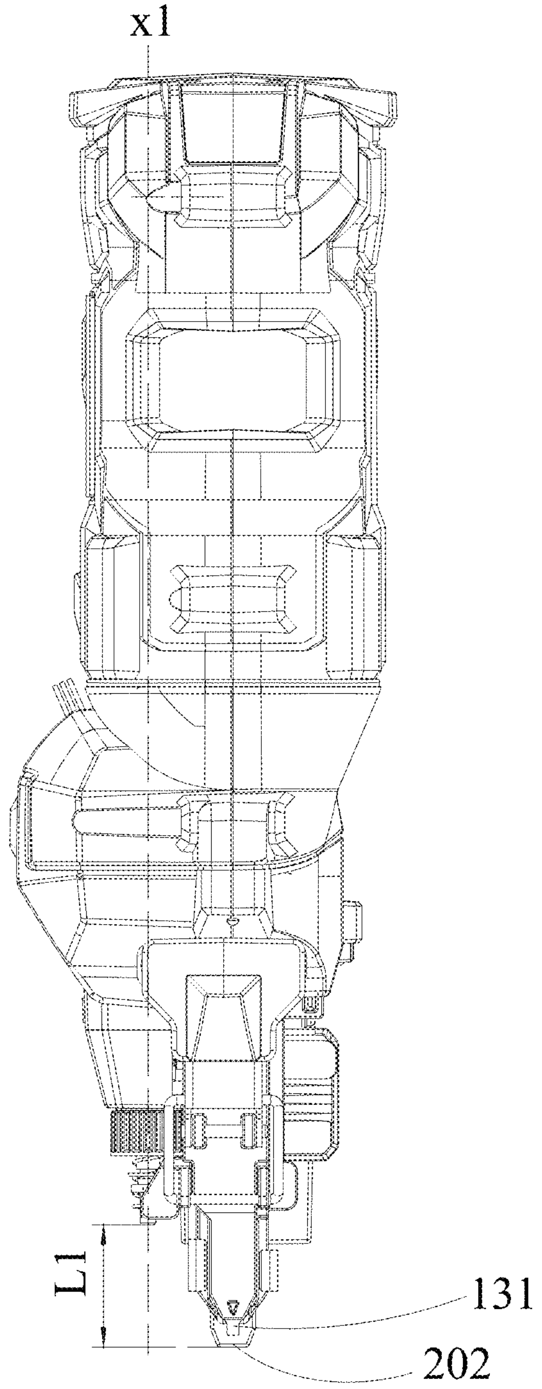
FIG. 2 is a top view of the fastener driver in FIG. 1.

This example provides a fastener driver 100. As shown in FIGS. 1 and 2, the fastener driver 100 provided in this example is a single-cylinder fastener driver inflated in advance. The fastener driver may be a single-cylinder fastener driver, a dual-cylinder fastener driver, a fastener driver inflated in advance, a fastener driver not inflated in advance, a spring fastener driver, or the like, which is not limited here. The fastener driver 100 can generate a striking force on a fastener 10, thereby driving the fastener 10 into a workpiece. The fastener driver 100 includes a housing 110 and a magazine 120. The housing 110 includes a main housing 111, a transmission portion 112, and a grip 113 for a user to hold. The magazine 120 is configured to accommodate fasteners 10, and at least part of the magazine 120 is disposed on the outer side of the housing 110. The fastener 10 provided in this example is a nail. The dimension of the nail may be 15 Ga, 16 Ga, 18 Ga, 23 Ga, 25 Ga, or the like, which is not limited here. The use angle of the nail may be 0 degrees, 5 degrees, 10 degrees, 15 degrees, 20 degrees, 25 degrees, 30 degrees, or the like, which is not limited here. The nail may be a straight nail, a U-shaped nail, or the like, which is not limited here.

An end of the grip 113 is connected to the main housing 111. The grip 113 is provided with a trigger 1131 connected to a main switch. The user triggers the main switch through the trigger 1131 to control the start and stop of the fastener driver 100. The main switch may be a mechanical or electronic switch. The fastener driver 100 includes a coupling portion 114. The other end of the grip 113 is connected to the coupling portion 114, and the coupling portion 114 is configured to be connected to a direct current power supply or an alternating current power supply. In this example, a battery pack 115 is detachably mounted to the coupling portion 114, and the specification and power of the battery pack 115 are not limited here.

Figure 3:
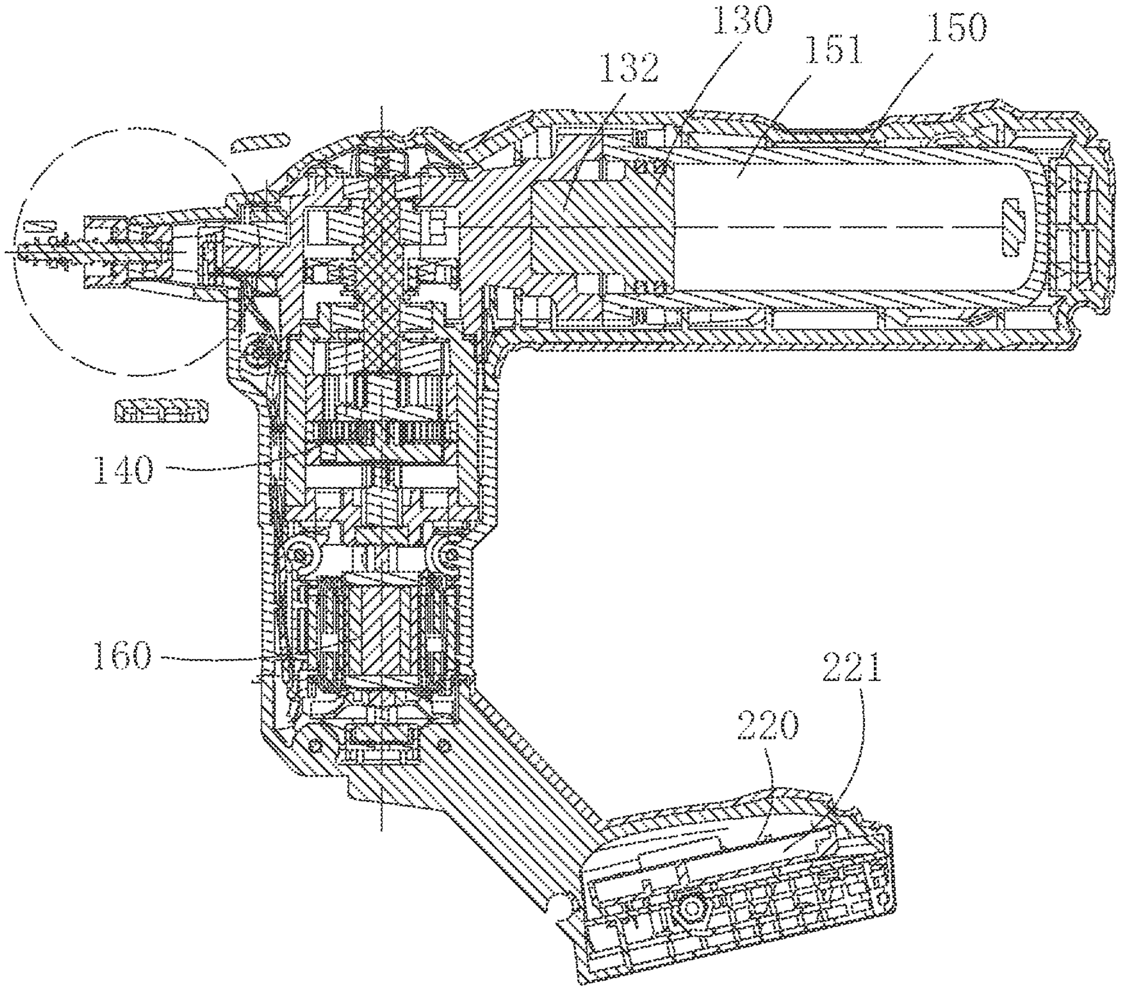
FIG. 3 is a sectional view of the fastener driver in FIG. 1 taken along line x1.
Figure 4:
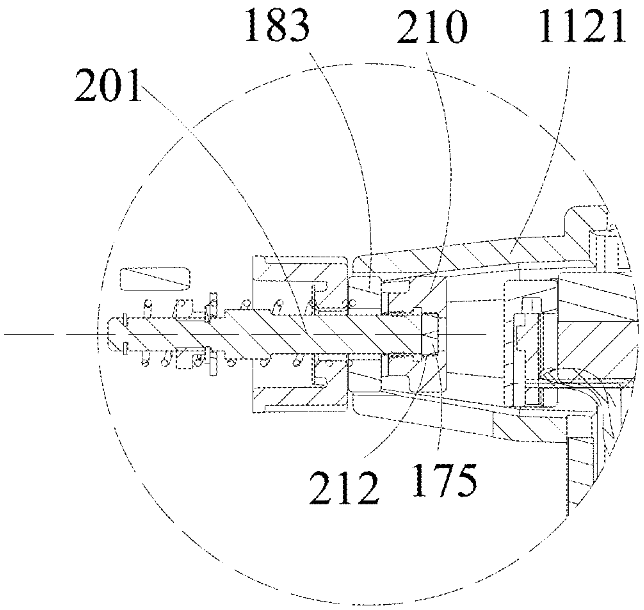
FIG. 4 is an enlarged view of a trigger assembly and an extension portion of the fastener driver in FIG. 3.
Figure 5:
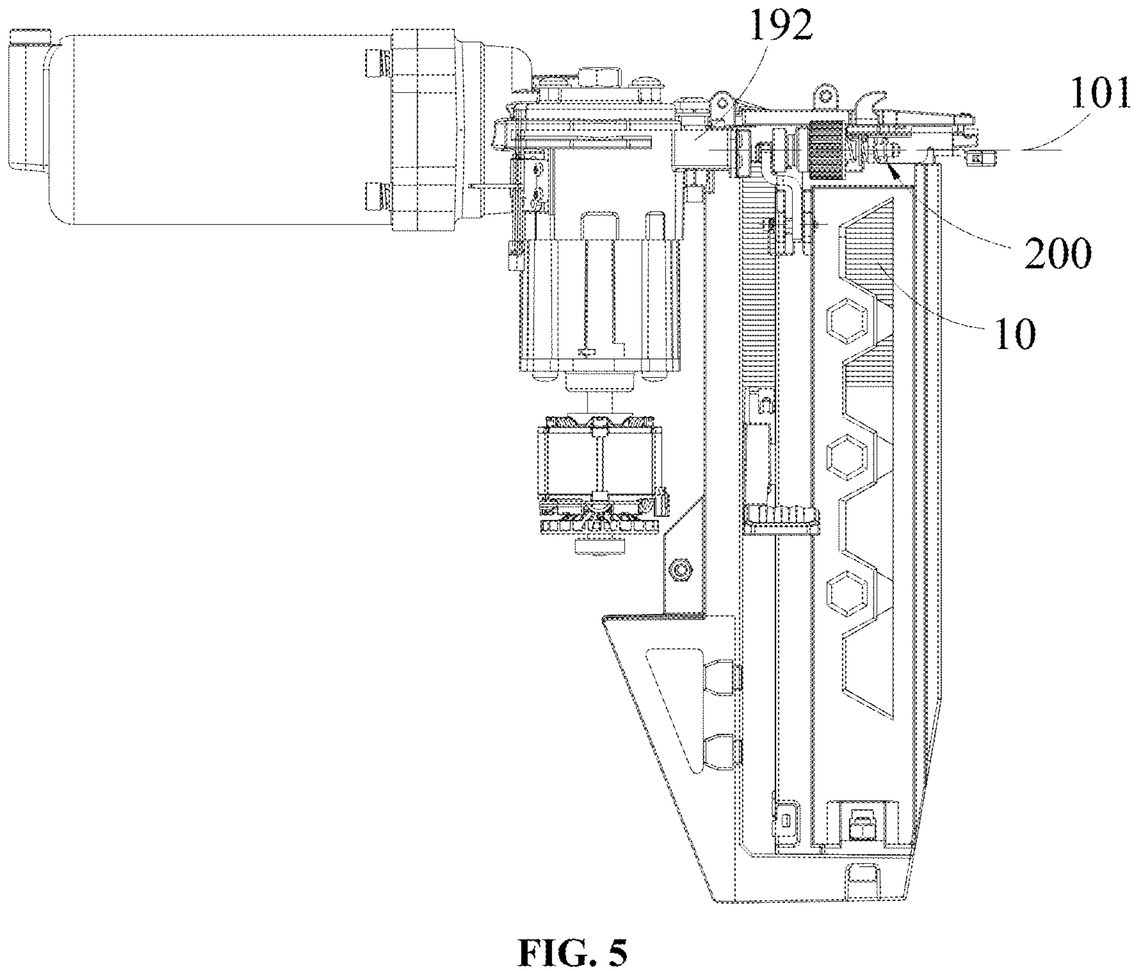
FIG. 5 is a right view of the fastener driver in FIG. 1 with a housing removed.

As shown in FIGS. 2 and 3, the fastener driver 100 further includes a striking assembly 130, a transmission mechanism 140, an energy storage device 150, and a motor 160. The striking assembly 130 includes a striker 131 and a piston 132. The striker 131 is mounted on the piston 132, and the piston 132 is substantially located behind the striker 131. The energy storage device 150 drives the piston 132 and the striker 131 to move forward to output a striking force along a striking direction. The striker 131 strikes the fastener 10 to drive the fastener 10 into the workpiece. The transmission mechanism 140 drives the striker 131 to move backward to store energy for the energy storage device 150. The energy storage device 150 includes a first cylinder 151. The first cylinder 151 accommodates the piston 132 and allows the piston 132 and part of the striker 131 to reciprocate in the first cylinder. An accommodation space is formed on the inner side of the main housing 111 to accommodate at least part of the energy storage device 150 and the striking assembly 130. The main housing 111 supports at least part of the energy storage device 150. The motor 160 drives at least the transmission mechanism 140, and the battery pack 115 provides energy for the motor 160. An accommodation space is formed on the inner side of the transmission portion 112. At least part of the motor 160 and the transmission mechanism 140 are accommodated in the transmission portion 112. The transmission portion 112 supports at least part of the motor 160 and the transmission mechanism 140. In this example, the motor 160 is an electric motor. When the transmission mechanism 140 drives the striking assembly 130 to move backward, the air in the first cylinder 151 is compressed, and the energy storage device 150 stores energy. When the energy storage device 150 drives the striking assembly 130 to move forward, the elastic potential energy of the compressed air is converted into kinetic energy, and the striking assembly 130 outputs the striking force.

As shown in FIGS. 3 to 7, the fastener driver 100 includes a trigger assembly 200. The trigger assembly 200 is operated by the user. At least part of the trigger assembly 200 is configured to move along a first straight line 101. The trigger assembly 200 has a first state and a second state. In the first state, the trigger assembly 200 allows the striker 131 to strike the fastener 10. In the second state, the trigger assembly 200 forbids the striker 131 to strike the fastener 10. The user operates the trigger assembly 200 to cause the trigger assembly 200 to switch between the first state and the second state. In general, the user presses the at least part of the trigger assembly 200 against the workpiece so that the at least part of the trigger assembly 200 moves. The trigger assembly 200 includes a trigger rod 201 and a contact member 202. The contact member 202 is at least partially located at the frontmost end of the fastener driver 100, so the contact member 202 is first in contact with the workpiece when the user aligns the front end of the fastener driver 100 with the workpiece and causes the front end of the fastener driver 100 to approach the workpiece. When the contact member 202 is in contact with the workpiece and moves, the trigger rod 201 moves along with the contact member 202. At least part of the trigger rod 201 and the contact member

202 are configured to move along the first straight line 101. It is to be noted that the trigger rod 201 and the contact member 202 move relative to the housing 110 along the first straight line 101. After the contact member 202 is in contact with the workpiece, the user continues operating the fastener driver 100 to move toward the workpiece, and the positions of the trigger rod 201 and the contact member 202 relative to the workpiece remain unchanged. However, the housing 110 moves toward the workpiece, so the trigger rod 201 and the contact member 202 move backward relative to the housing 110 along the first straight line 101. Similarly, when the contact member 202 remains in contact with the workpiece, the user operates the fastener driver 100 to move away from the workpiece, and the positions of the trigger rod 201 and the contact member 202 relative to the workpiece remain unchanged. However, the housing 110 moves away from the workpiece, so the trigger rod 201 and the contact member 202 move forward relative to the housing 110 along the first straight line 101. The trigger rod 201 is connected to the contact member 202 through threads. Thus, the contact member 202 can drive the trigger rod 201 to move along the first straight line 101, and the trigger rod 201 can also move relative to the contact member 202.

The fastener driver 100 includes a safety switch. When both the safety switch and the main switch are triggered, the user may drive out the fastener 10 by using the fastener driver 100. The trigger assembly 200 is configured to trigger the safety switch. When the trigger assembly 200 moves to a trigger position, the safety switch is triggered. The safety switch may be a mechanical or electronic switch.

When the trigger assembly 200 does not abut against the workpiece or when the trigger assembly 200 abuts against the workpiece but does not move to the trigger position, the trigger assembly 200 is in the second state. When the trigger assembly 200 abuts against the workpiece and moves backward to the trigger position along the first straight line 101, the safety switch is triggered, and the trigger assembly 200 is in the first state. When the safety switch is turned on and the user presses the trigger 1131, the striker 131 drives out one fastener 10. The striker 131 remains at a shutdown position after completing the stroke, so as to wait for the next time the user presses the trigger 1131 and the safety switch is turned on to strike the next fastener 10. At the shutdown position, the fastener driver 100 shuts down. When the user presses the trigger 1131, a driving mechanism continues to drive the striker 131 to move backward to a top dead center position. The air in the first cylinder 151 is substantially compressed to a limit, and the elastic potential energy stored by the energy storage device 150 substantially peaks. The striking assembly 130 stops moving rearward, and the striker 131 moves substantially to the rearmost position to which the striker 131 can move. In some examples, in the case where the trigger 1131 is pressed, the striker 131 strikes one fastener 10 each time the safety switch is turned on, that is, each time the user presses the fastener driver 100 against the workpiece. After the striker 131 completes one stroke, fasteners 10 move in the magazine 120 so that the striker 131 can drive out the next fastener 10. The striking assembly 130 reciprocates under the drive of the transmission mechanism 140 and the energy storage device 150 to continuously strike the fasteners 10 in sequence. Within each striking cycle, the fastener driver 100 drives out one fastener 10.

The fastener driver 100 includes a guide assembly 180 that guides the fastener 10 to move along the striking direction. The guide assembly 180 communicates with at least part of the magazine 120. The fastener driver 100 further includes a support frame 190. The support frame 190 connects the energy storage device 150 to the guide assembly 180. The support frame 190 includes a hole 191, and the striker 131 passes through the support frame 190 via the hole 191.

The support frame 190 is fixedly connected to the energy storage device 150, and the guide assembly 180 is fixedly connected to the support frame 190. The support frame 190 is fixedly connected to both the energy storage device 150 and the guide assembly 180 so that the energy storage device 150 and the guide assembly 180 have a high degree of coaxiality. The guide assembly 180 includes a first guide member 181 and a second guide member 182. The second guide member 182 includes an input port 1821. The input port 1821 communicates with at least part of the magazine 120 so that the fastener 10 is lifted from the magazine 120 to the guide assembly 180 through the input port 1821.

Figure 6:
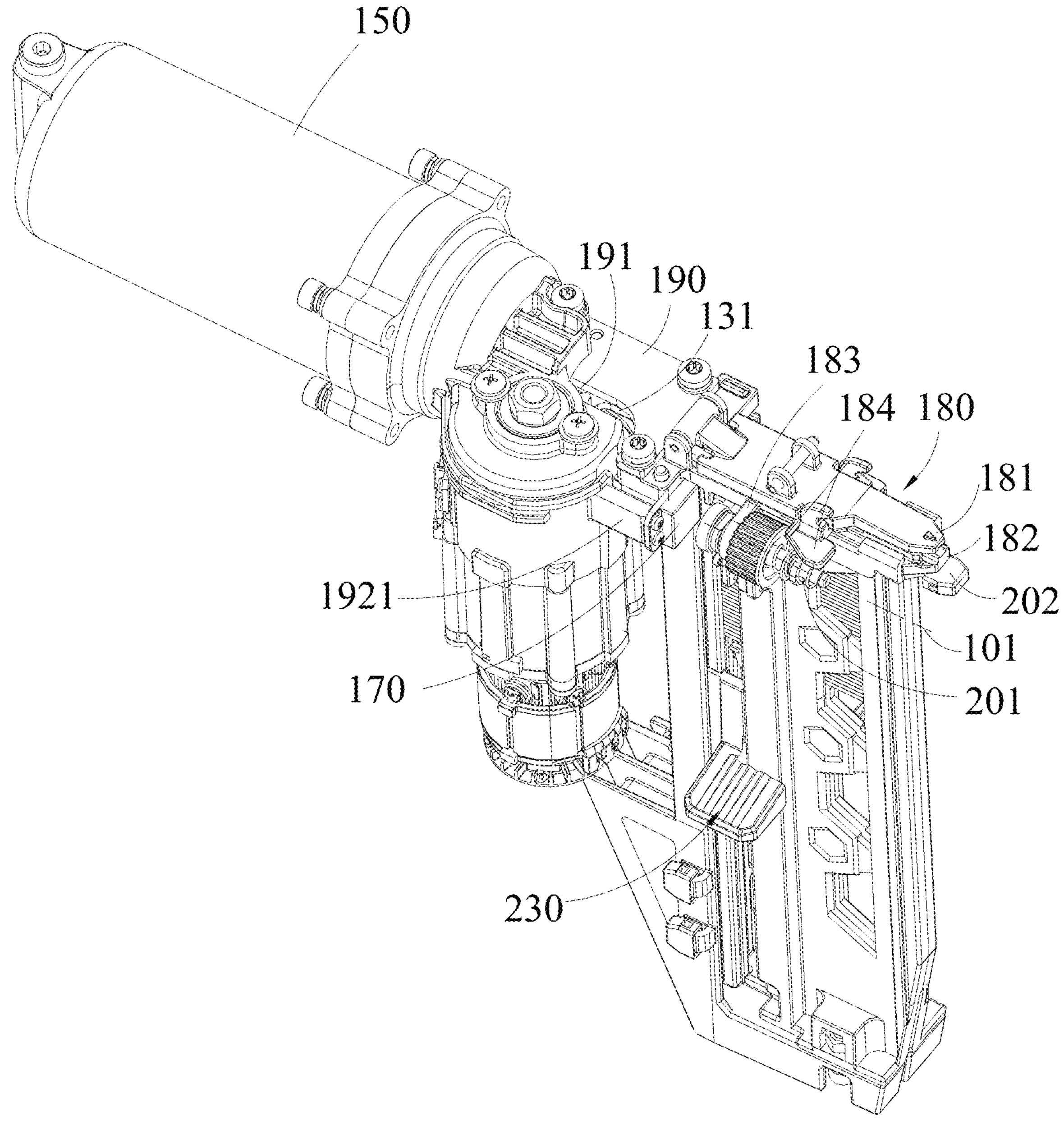
FIG. 6 is a perspective view of the fastener driver in FIG. 5.
Figure 7:
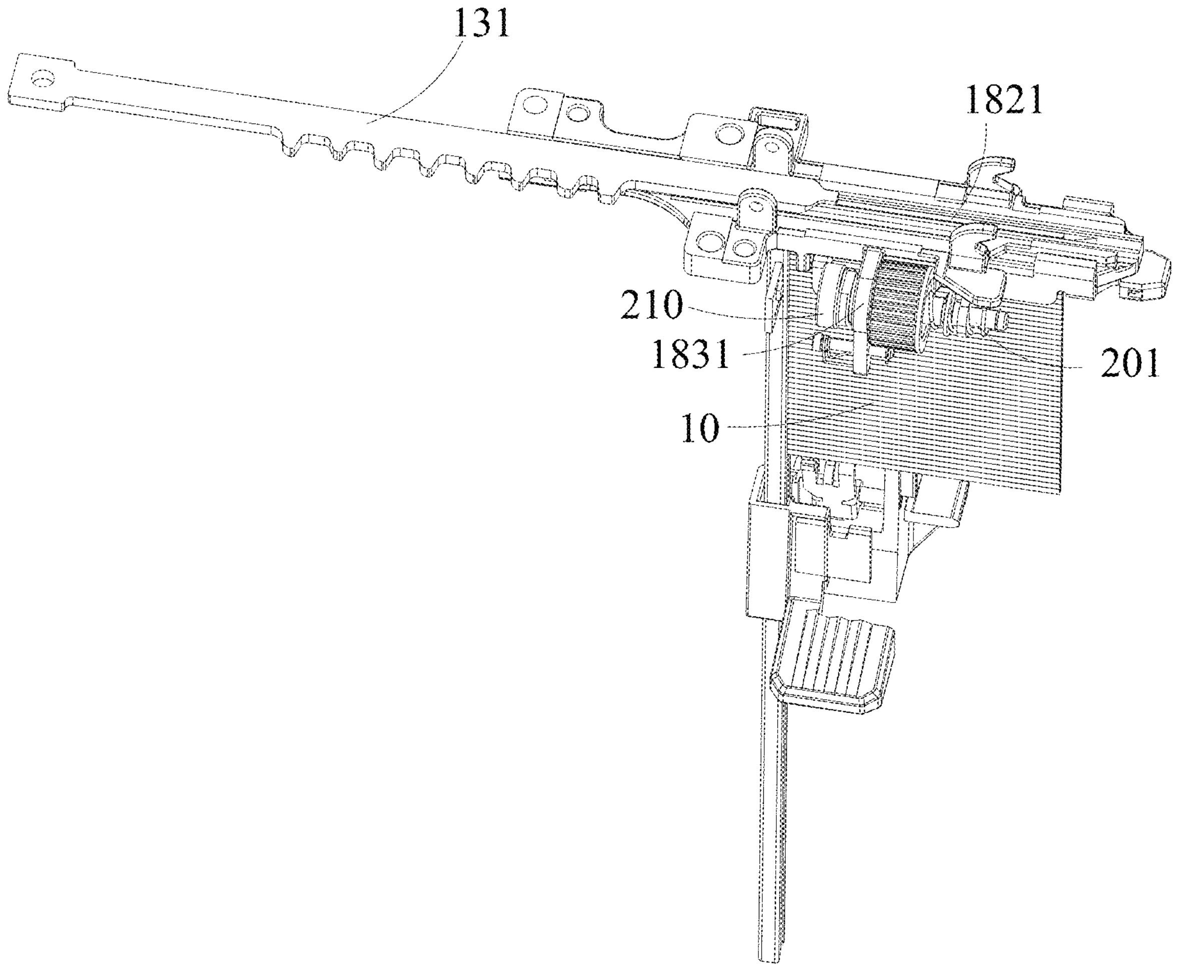
FIG. 7 is a perspective view of a striker, fasteners, a second guide member, a trigger assembly, a lifting assembly, and part of a dry fire prevention assembly of the fastener driver in FIG. 1 from one angle of view.
Figure 8:
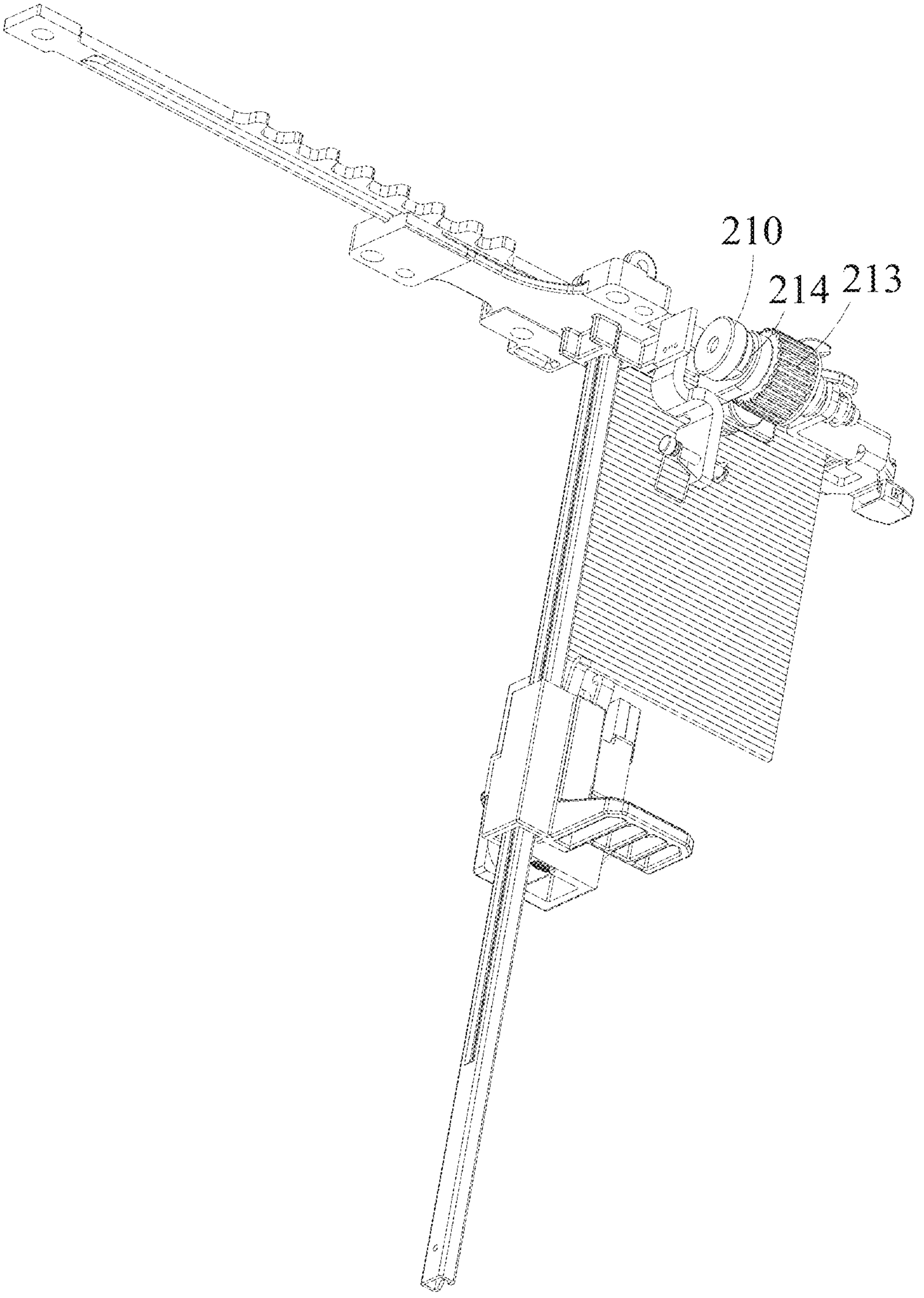
FIG. 8 is a perspective view of a striker, fasteners, a second guide member, a trigger assembly, a lifting assembly, and part of a dry fire prevention assembly of the fastener driver in FIG. 1 from another angle of view.
Figure 9:
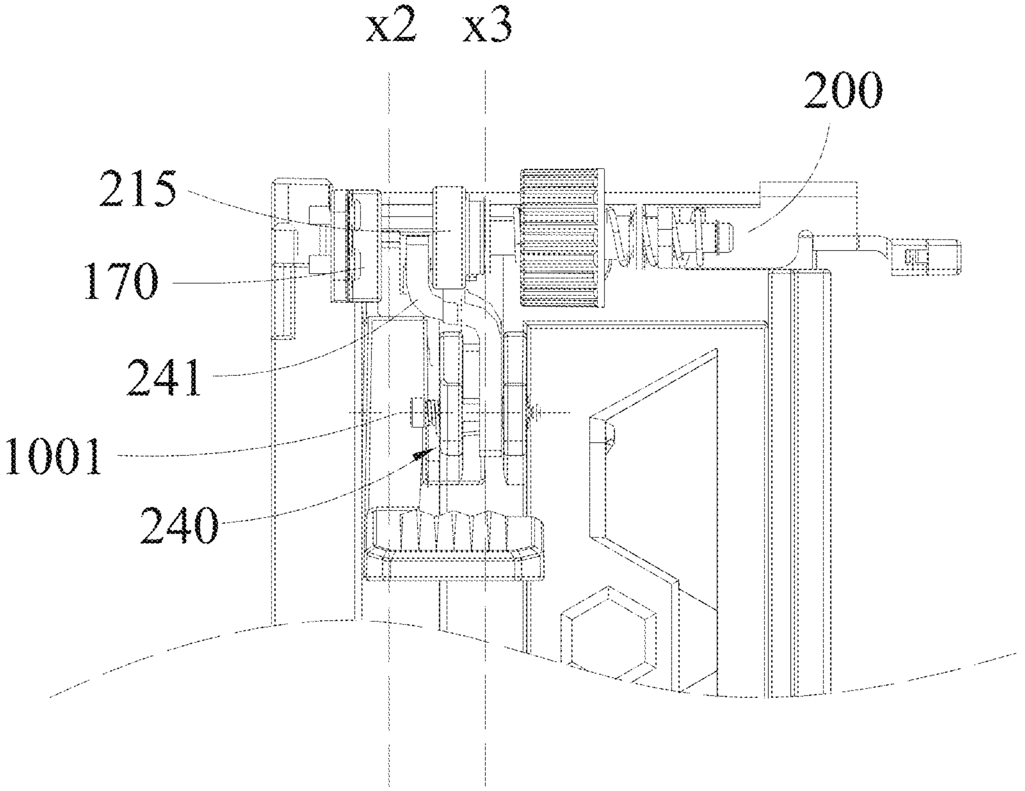
FIG. 9 is a right view of a trigger assembly, a lifting assembly, part of a dry fire prevention assembly, and part of a magazine of the fastener driver in FIG. 1.
Figure 10:
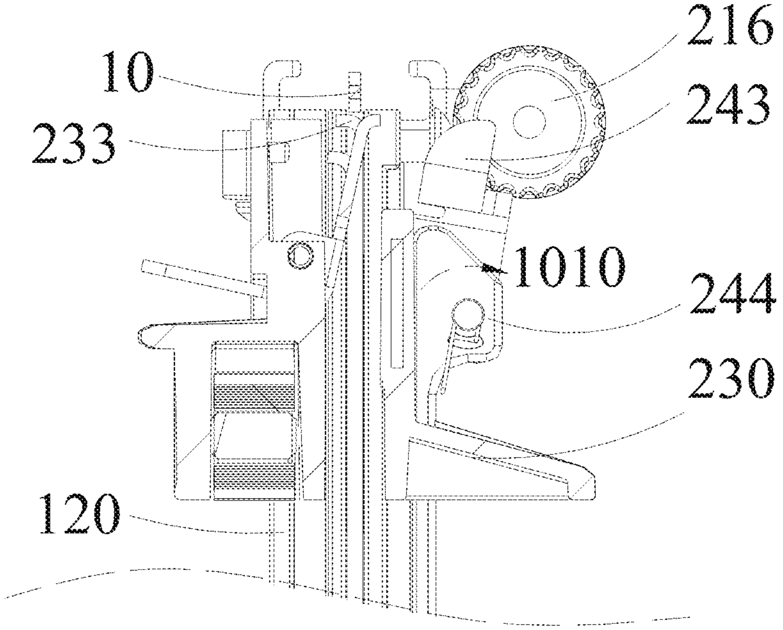
FIG. 10 is a sectional view of the fastener driver in FIG. 9 taken along line x2.
Figure 11:
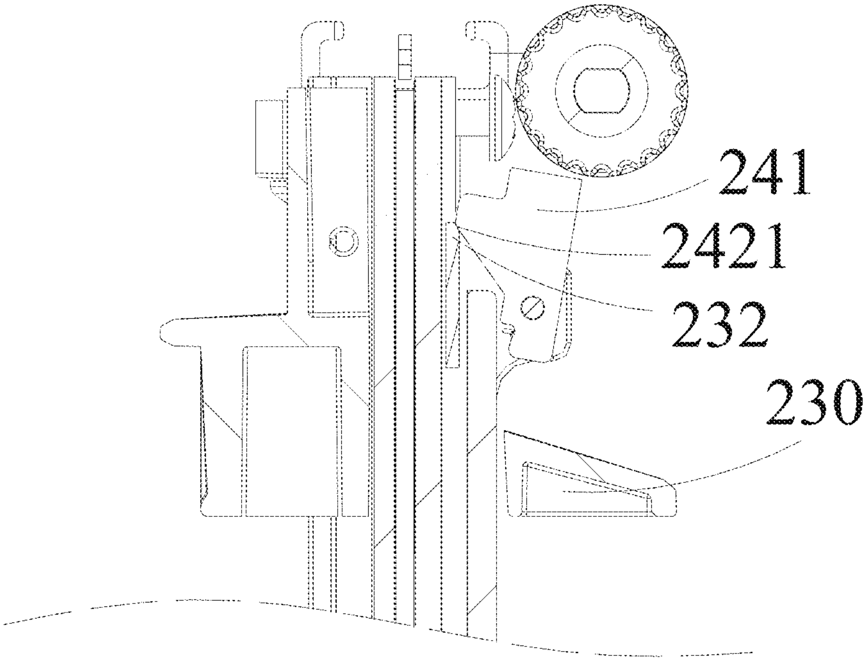
FIG. 11 is a sectional view of the fastener driver in FIG. 9 taken along line x3.
Figure 12:
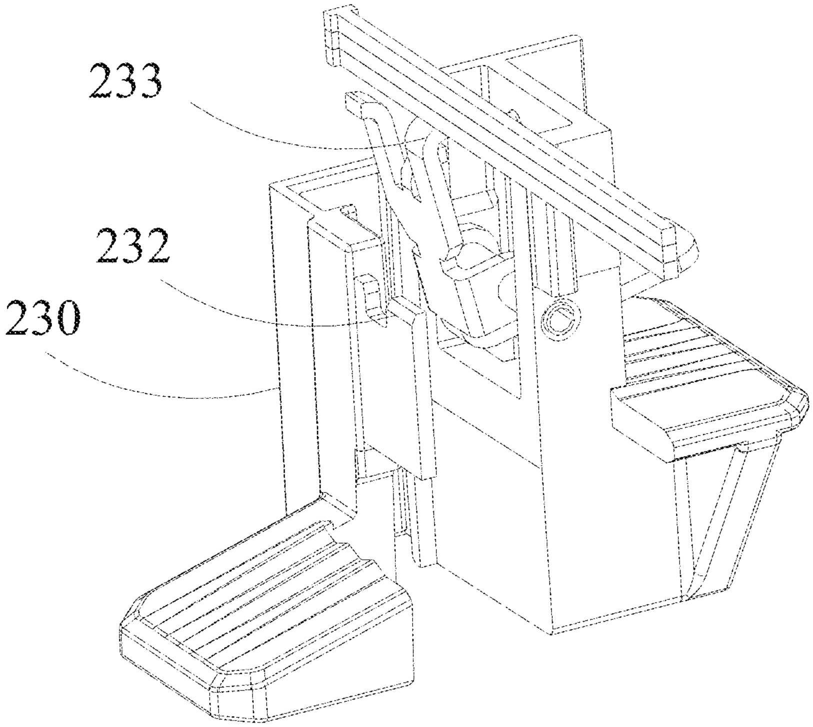
FIG. 12 is a perspective view of a lifting assembly of the fastener driver in FIG. 1.
Figure 13:
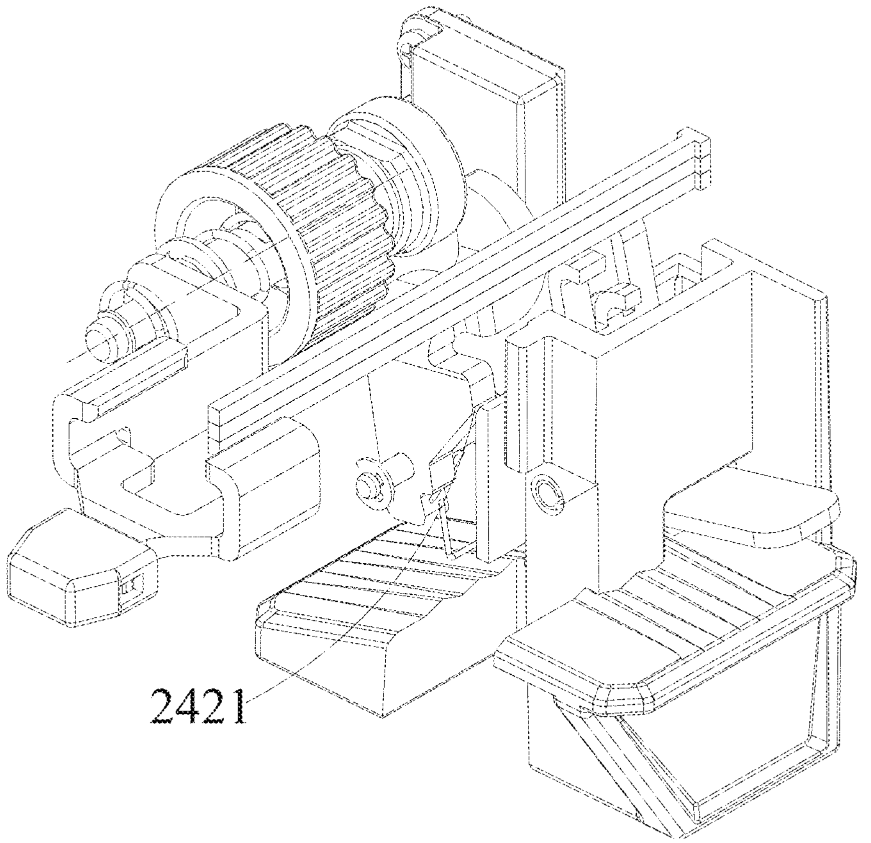
FIG. 13 is a perspective view of a lifting assembly, a trigger assembly, and part of a dry fire prevention assembly of the fastener driver in FIG. 1.

As shown in FIGS. 6 and 7, the guide assembly 180 includes a first mounting portion 183 for mounting the trigger rod 201. The first mounting portion 183 includes a first protrusion 1831 formed on the second guide member 182. The first protrusion 1831 is formed with a through hole. Thus, the first protrusion 1831 can be sleeved on the trigger rod 201 through the through hole. The trigger rod 201 is supported by the first mounting portion 183. When the contact member 202 moves, the contact member 202 drives the trigger rod 201 to pass through the first mounting portion 183 and move along the first straight line 101. The trigger rod 201 is supported by the first mounting portion 183, which saves a manufacturing cost and provides a stable structure. The support frame 190 includes a second mounting portion 192 for mounting a detection mechanism 170. The detection mechanism 170 is configured to detect a position of the trigger assembly 200. The second mounting portion 192 includes a second protrusion 1921 formed on the support frame 190. The detection mechanism 170 is fixedly mounted on the second protrusion 1921 through screws.

The detection mechanism 170 is mounted on the support frame 190, the support frame 190 is fixedly connected to the guide assembly 180, and the guide assembly 180 supports the trigger assembly 200. Thus, both the guide assembly 180 and the detection mechanism 170 are mounted to the support frame 190, and the positional relationship between the detection mechanism 170 and the guide assembly 180 is fixed. The guide assembly 180 supports the trigger assembly 200 so that the positional relationship between the trigger assembly 200 and the detection mechanism 170 is stable and reliable. Thus, it is convenient for the detection mechanism 170 to accurately identify the position of the trigger assembly 200, thereby reducing an error. As shown in FIGS. 3 and 4 and FIGS. 7 and 8, the trigger assembly 200 includes a rod sleeve 210, and the rod sleeve 210 includes a hole. The rod sleeve 210 is sleeved on the end of the trigger rod 201 adjacent to the detection structure through the hole. In this example, the rod sleeve 210 and the trigger rod 201 are detachably connected to each other through threads. Thus, the rod sleeve 210 and the trigger rod 201 are convenient to mount and form a simple and compact structure. After the rod sleeve 210 is fixedly mounted to the trigger rod 201, the rod sleeve 210 moves synchronously along with the trigger rod 201. In some examples, the rod sleeve 210 may be connected to the trigger rod 201 in other manners, or the rod sleeve 210 may be integrally formed with the trigger rod 201. The trigger assembly 200 includes an accommodation compartment 212, and the accommodation compartment 212 accommodates at least part of an induction device 175. The accommodation compartment 212 is provided in the rod sleeve 210. In this example, the accommodation compartment 212 is a cylindrical empty compartment formed in the center of the rod sleeve 210. The accommodation compartment 212 may be open or closed, which is not limited here.

The induction device 175 causes the trigger assembly 200 to switch between the first state and the second state. The fastener driver 100 includes a control device 220, and the control device 220 includes a controller 221. The controller 221 is configured to be connected to the detection mechanism 170. The controller 221 is connected to the detection mechanism 170 so that a signal can be transmitted and received between the controller 221 and the detection mechanism 170. The detection mechanism 170 is configured to induce a position of the induction device 175. When the induction device 175 moves to the trigger position along with the trigger assembly 200, the detection mechanism 170 detects the induction device 175 and controls, through the controller 221, the safety switch to be turned on, and the trigger assembly 200 is in the first state. When the induction device 175 moves away from the trigger position along with the trigger assembly 200, the detection mechanism 170 detects that the induction device 175 is not at the trigger position, the detection mechanism 170 controls, through the controller 221, the safety switch to be turned off, and the trigger assembly 200 is in the second state. The induction device 175 includes a magnetic element 176, specifically a cylindrical magnet. The detection mechanism 170 includes a Hall sensor 171. The magnet is directly mounted in the rod sleeve 210 to be fixed to the trigger rod 201. The magnet moves along with the rod sleeve 210 and the trigger rod 201. Thus, it is simple to mount the magnet, the structure is stable and compact, and the detection precision is high. In some examples, the detection mechanism 170 may include a potentiometer or the like, and the induction device 175 may include another part that can be detected by the detection mechanism 170, which are not limited here, as long as the detection mechanism 170 can detect the position of the induction device 175.

The trigger assembly 200 includes a depth adjustment member 213 and a gasket 214. The user rotates the depth adjustment member 213 to adjust the depth to which the fastener 10 is driven into the workpiece. The depth adjustment member 213 is drivingly connected to the trigger rod 201. When the depth adjustment member 213 is rotated, the depth adjustment member 213 drives the trigger rod 201 and the rod sleeve 210 to rotate as well. The gasket 214 is disposed between the rod sleeve 210 and the first mounting portion 183 to prevent the moving rod sleeve 210 from being in direct contact with the stationary first mounting portion 183, thereby preventing the rod sleeve 210 from loosening due to friction. The gasket 214 is fixedly sleeved on the trigger rod 201 through a flat position so that the gasket 214 can move synchronously with the trigger rod 201. The rod sleeve 210, the gasket 214, and the trigger rod 201 move synchronously so that friction is reduced, parts do not loosen, and connection is stable and reliable.

As shown in FIGS. 1 to 4, the housing 110 includes an extension portion 1121. The extension portion 1121 accommodates the first mounting portion 183, part of the trigger rod 201, the rod sleeve 210, the induction device 175, and the detection mechanism 170. The part of the trigger rod 201, the rod sleeve 210, and the induction device 175 may move in the extension portion 1121. The extension portion 1121 prevents dust from contaminating the parts, has a simple and reliable structure, saves the cost, and has an attractive appearance. In this example, the extension portion 1121 is integrally formed with the transmission portion 112, and the manufacturing cost is low. In some examples, the extension portion 1121 is integrally formed with the main housing 111.

The distance L1 between the end of the trigger rod 201 away from the detection mechanism 170 and the frontmost end of the fastener driver 100 is greater than or equal to 30 mm and less than or equal to 60 mm. In some examples, L1 is greater than or equal to 35 mm and less than or equal to 55 mm. In some examples, L1 is greater than or equal to 40 mm and less than or equal to 50 mm. The frontmost end of the fastener driver 100 is unobstructed and is good in visibility, making it convenient for the user to insert the guide assembly 180 into a narrow space for work.

As shown in FIG. 6, the guide assembly 180 includes a stop block 184. The stop block 184 prevents an irregular workpiece from being first in contact with the trigger rod 201 instead of the contact member 202 when the user uses the fastener driver 100 to work on the irregular workpiece, thereby creating a safety hazard. The stop block 184 is located above the trigger rod 201. In some examples, the stop block 184 may be located below the trigger rod 201. In a front and rear direction, the frontmost end of the stop block 184 is substantially flush with the frontmost end of the trigger rod 201. The position of the stop block 184 is fixed relative to the housing 110. Thus, after the workpiece is in contact with the stop block 184, the workpiece is blocked by the stop block 184 and does not continue to cause the movement of the trigger rod 201, and the safety switch cannot be triggered, thereby improving safety. The distance between the end of the stop block 184 away from the detection mechanism 170 and the frontmost end of the fastener driver 100 is substantially equal to L1, and the frontmost end of the fastener driver 100 is unobstructed and is good in visibility. The stop block 184 is provided on the second guide member 182, which forms a compact structure. In this example, the stop block 184 is integrally formed with the second guide member 182, which saves the cost.

The striker 131 remains at the shutdown position after completing one stroke. The fastener driver 100 includes a lifting assembly 230. At least part of the lifting assembly 230 is movably disposed in the magazine 120 to drive the fasteners 10 to move in the magazine 120. After one fastener 10 is driven out, the lifting assembly 230 lifts the next fastener 10 through the input port 1821 to the guide assembly 180 to be driven out by the striker 131. The lifting assembly 230 needs to lift one fastener 10 from the magazine 120 to the front end of the striker 131 during the time difference between the time when the striker 131 arrives at the shutdown position and the time when the fastener driver 100 drives out the next fastener 10. If the lifting assembly 230 is stuck, the fastener 10 may not be lifted to the position where the fastener 10 can be driven out by the striker 131, and the striker 131 can continuously move but cannot drive out the fastener 10, which causes inconvenience of use and reduces work efficiency.

Generally, to quickly drive out the fastener 10 with the next stroke, at the shutdown position, the striker 131 and the piston 132 are in the state of compressing air in the first cylinder 151. When the fastener driver 100 vibrates or encounters other situations, the striker 131 may be out of control accidentally and drive out the fastener 10 when the user is unaware, causing danger.

In some examples, at the shutdown position, the front end of the striker 131 is located behind the fastener 10, and the striker 131 and the fastener 10 do not overlap in the front and rear direction. The fastener driver 100 includes a device for preventing the striker 131 from driving out the fastener 10 accidentally. The device for preventing the striker 131 from driving out the fastener 10 accidentally is provided so that the striker 131 is prevented from driving out the fastener 10 accidentally. In these examples, the time difference between the time when the striker 131 arrives at the shutdown position and the time when the fastener driver 100 drives out the next fastener 10 depends on the speed at which the user operates the fastener driver 100. After the user drives out one fastener 10, the striker 131 moves to the shutdown position. Subsequently, the user lifts the fastener driver 100, moves the fastener driver 100 to a proper position, and drives out one fastener 10 again. The time difference between the time when the striker 131 arrives at the shutdown position and the time when the fastener driver 100 drives out the next fastener 10 is substantially equal to the time consumed by the user in lifting, moving, and pressing the fastener driver 100. It is to be understood that the average time consumed by the user in lifting, moving, and pressing the fastener driver 100 is generally greater than 1 second. That is to say, the striker 131 and the input port 1821 do not interfere with each other, and therefore, after the striker 131 moves to the shutdown position, the lifting assembly 230 may start to lift the fastener 10, and the lifting assembly 230 needs to lift the fastener 10 to the guide assembly 180 within more than 1 second.

In this example, as shown in FIG. 7, at the shutdown position, the striker 131 presses above the fastener 10, and the striker 131 and the fastener 10 overlap in the front and rear direction. At the shutdown position, the striker 131 interferes with the input port 1821. Thus, the fastener 10 is not driven out even if the striker 131 accidentally performs a drive after stopping at the shutdown position. In this example, the time difference between the time when the striker 131 arrives at the shutdown position and the time when the fastener driver 100 drives out the next fastener 10 depends on the speed at which the striker 131 moves and the distance between the shutdown position and the top dead center position. After the user drives out one fastener 10, the striker 131 quickly moves to the shutdown position. Since the striker 131 interferes with the input port 1821 at the shutdown position, in the process where the user lifts, moves, and presses the fastener driver 100, the striker 131 remains at the shutdown position and obstructs the lifting assembly 230 from lifting the fastener 10 to the guide assembly 180. When the user presses the trigger 1131 again, the striker 131 moves to the top dead center position, that is, the striker 131 moves backward. When the striker 131 moves until the striker 131 does not interfere with the input port 1821, the lifting assembly 230 may start to lift the fastener 10 to the guide assembly 180. In addition, this lift needs to end before the striker 131 moves forward from the top dead center position to be in contact with the fastener 10, that is, the striker 131 moves to a striking position. The time difference between the time when the striker 131 arrives at the shutdown position and the time when the fastener driver 100 drives out the next fastener 10 is substantially equal to the time consumed by the striker 131 in moving from the shutdown position to the top dead center position and then moving to the striking position. The time consumed by the striker 131 in moving from the shutdown position to the top dead center position and then moving to the striking position is generally much less than 1 second. In this example, the time consumed by the striker 131 in moving from the shutdown position to the top dead center position and then moving to the striking position is about 0.02 seconds to 0.04 seconds. That is to say, the lifting assembly 230 needs to lift the fastener 10 to the guide assembly 180 within about 0.02 seconds to 0.04 seconds. In order that the lifting assembly 230 lifts the fastener 10 in place within a brief period of time, the lifting assembly 230 needs to move smoothly without getting stuck.

As shown in FIGS. 9 to 13, the fastener driver 100 includes a dry fire prevention assembly 240 having a dry fire prevention state. The dry fire prevention assembly 240 includes a stopper 241. It is defined that the dry fire prevention assembly 240 is in the dry fire prevention state when the stopper 241 is located on the movement path of the trigger assembly 200. It is defined that the trigger assembly 200 is in the first state when the trigger assembly 200 is located on the movement path of the stopper 241. In the dry fire prevention state, the stopper 241 forbids the trigger assembly 200 to switch to the first state, and the trigger assembly 200 can only remain in the second state. In this way, the user cannot use the fastener driver 100 to drive out the fastener 10 in the dry fire prevention state. When the remaining number of the fasteners 10 reaches a relatively low preset value, the dry fire prevention assembly 240 switches to the dry fire prevention state. The function of the dry fire prevention state is that in the dry fire prevention state, the user can learn that the number of the fasteners 10 is insufficient and thus add fasteners 10 to the magazine 120 in time. It is defined that the remaining number of fasteners 10 is the minimum preset value in the dry fire prevention state. In some examples, the minimum preset value is 1, 2, 3, 4, 5, 6, 7, 8, 9, or 10.

Before the dry fire prevention assembly 240 enters the dry fire prevention state, a certain number of fasteners 10 remain in the magazine 120. It is to be understood that the number of fasteners 10 remaining in the magazine 120 is greater than or equal to the minimum preset value before the dry fire prevention assembly 240 enters the dry fire prevention state. As the dry fire prevention assembly 240 is closer to the dry fire prevention state, the number of fasteners 10 remaining in the magazine 120 becomes smaller and smaller, and the number of fasteners 10 becomes closer to the minimum preset value.

The lifting assembly 230 is movably disposed on the magazine 120. In this example, the lifting assembly 230 moves up and down relative to the magazine 120 under the operation of the user. The lifting assembly 230 includes an elastic member for the magazine. The elastic member for the magazine biases the lifting assembly 230 toward the guide assembly 180. The user overcomes an elastic force and operates the lifting assembly 230 to move away from the guide assembly 180 to leave a space for adding the fasteners 10. When the magazine 120 is filled with the fastener 10, the lifting assembly 230 is farthest from the guide assembly 180, and when the fasteners 10 are used up, the lifting assembly 230 is closest to the guide assembly 180. Each time one fastener 10 is driven out by the striker 131, the space above the remaining fasteners 10 is vacated. If the input port 1821 is unobstructed, the lifting assembly 230 lifts the fasteners 10 in the magazine 120 upward under the drive of the elastic member for the magazine to add one fastener 10 to the front end of the striker 131. The elastic member for the magazine is a spring, and the spring may be a tension spring or a coil spring.

The lifting assembly 230 drives the stopper 241 and the fasteners 10 to move. The lifting assembly 230 includes a first lifting portion 232 and a second lifting portion 233. The first lifting portion 232 is configured to drive the stopper 241 to move, and the second lifting portion 233 is configured to drive the fasteners 10 to move. After the fasteners 10 are loaded into the magazine 120, the second lifting portion 233 abuts against the lower end of the fasteners 10 and drives the fasteners 10 to move upward. The stopper 241 is disposed at the end of the magazine 120 adjacent to the guide assembly 180, and the stopper 241 includes a first abutment surface 2421.

As the fasteners 10 are gradually consumed, the lifting assembly 230 moves upward and gradually approaches the guide assembly 180. After the first lifting portion 232 abuts against the first abutment surface 2421, the lifting assembly 230 is drivingly connected to the stopper 241. When the lifting assembly 230 continues moving upward, the lifting assembly 230 starts to drive the stopper 241 to perform a first motion. The stopper 241 is configured to rotate about a first axis 1001. The first motion is a first movement of rotating about the first axis 1001 along a first direction 1010. The relative positions of the first lifting portion 232 and the second lifting portion 233 are fixed. When the first lifting portion 232 drives the stopper 241 to perform the first motion, the second lifting portion 233 simultaneously drives the fasteners 10 to move upward. In this example, the first lifting portion 232 has a bevel, and the second lifting portion 233 has an arc surface.

In a left and right direction, at least part of the stopper 241 is disposed between the magazine 120 and the trigger assembly 200. In the front and rear direction, at least part of the stop assembly is disposed between the trigger assembly 200 and the detection mechanism 170. The stopper 241 includes a stop portion 243 and a rotary portion 244. The stop portion 243 is farther from the first axis 1001 than the rotary portion 244. When the stopper 241 performs the first motion, the stopper 241 rotates about the first axis 1001 along the first direction 1010, and the stop portion 243 moves toward the trigger assembly 200. The trigger assembly 200 includes a trigger portion 216 extending perpendicular to the first straight line 101. As viewed along the first straight line 101, the stop portion 243 is located on the movement path of the trigger portion 216 when the stop portion 243 and the trigger portion 216 start to overlap. The stop portion 243 prevents the rod sleeve 210 and the trigger rod 201 from moving toward the detection mechanism 170 along the first straight line 101. The stop portion 243 prevents the induction device 175 from moving to a position where the induction device 175 can be detected by the detection mechanism 170, that is, the trigger position, and the safety switch cannot be triggered, and the dry fire prevention assembly 240 is in the dry fire prevention state. The fastener driver 100 reminds the user to add the fasteners 10. In other words, the fastener driver 100 is viewed along the front and rear direction, the stopper 241 prevents the rod sleeve 210 from moving backward when the stopper 241 and the rod sleeve 210 start to overlap, the dry fire prevention assembly 240 is in the dry fire prevention state, and the trigger assembly 200 can only remain in the second state. On the contrary, the fastener driver 100 is viewed along the left and right direction, the trigger assembly 200 enters the first state when the stopper 241 and the rod sleeve 210 start to overlap, the rod sleeve 210 prevents the stopper 241 from moving rightward, and the dry fire prevention assembly 240 cannot switch to the dry fire prevention state.

Each time a fastener 10 is driven out, the lifting assembly 230 is lifted upward once. The distance by which the lifting assembly 230 moves upward each time depends on the thickness of each fastener 10 in an up and down direction. Since the thickness of the fastener 10 is typically small, the distance of each lift of the lifting assembly 230 is relatively short. When the first lifting portion 232 abuts against the first abutment surface 2421 and moves upward, the first lifting portion 232 drives the stopper 241 to perform the first motion. The upward movement of the first lifting portion 232 drives the rotation of the stopper 241. Since the first lifting portion 232 moves upward by a very short distance each time, the stop portion 243 also rotates by a very small angle toward the trigger assembly 200 each time.

When a preset number of fasteners 10 remain in the magazine, the trigger assembly 200 obstructs the stopper 241 from performing the first motion. When the trigger assembly 200 obstructs the stopper 241 from performing the first motion, the lifting assembly 230 drives the stopper 241 to perform a second motion. When the trigger assembly 200 is in the first state and the trigger assembly 200 obstructs the stopper 241 from performing the first motion, the trigger assembly 200 obstructs the stopper 241 from switching to the dry fire prevention state, and therefore the lifting assembly 230 drives the stopper 241 to perform the second motion. The trigger assembly 200 includes an obstruction portion 215 in the circumferential direction of the first straight line 101. When the obstruction portion 215 is on the motion path along which the stop portion 243 performs the first motion, the obstruction portion 215 obstructs the stopper 241 from performing the first motion. In this example, the rod sleeve 210 includes the obstruction portion 215, and the obstruction portion 215 is the outer circumferential surface of the rod sleeve 210. Before the dry fire prevention assembly 240 enters the dry fire prevention state, the trigger assembly 200 may move along the first straight line 101 as usual. When the trigger assembly 200 moves to the trigger position, one fastener 10 is driven out. The striker 131 then moves rapidly to the shutdown position, and the striker 131 overlaps with the input port 1821 at the shutdown position. Therefore, until the next time the trigger assembly 200 moves to the trigger position, the striker 131 moves backward until the striker 131 does not overlap with the input port 1821, and the striker 131 prevents the lifting assembly 230 from lifting the fasteners 10. When the number of fasteners 10 does not reach the preset number, the lifting assembly 230 only abuts against the fasteners 10. When the fasteners 10 are gradually consumed and the number of fasteners 10 remaining in the magazine 120 is close to the preset number, the lifting assembly 230 moves to abut against the stopper 241. When the user operates the trigger assembly 200, the trigger assembly 200 moves to the trigger position, the striker 131 moves backward until the striker 131 does not overlap with the input port 1821, and the lifting assembly 230 drives the fasteners 10 to move upward and starts to drive the stopper 241 to perform the first motion.

Figure 14:
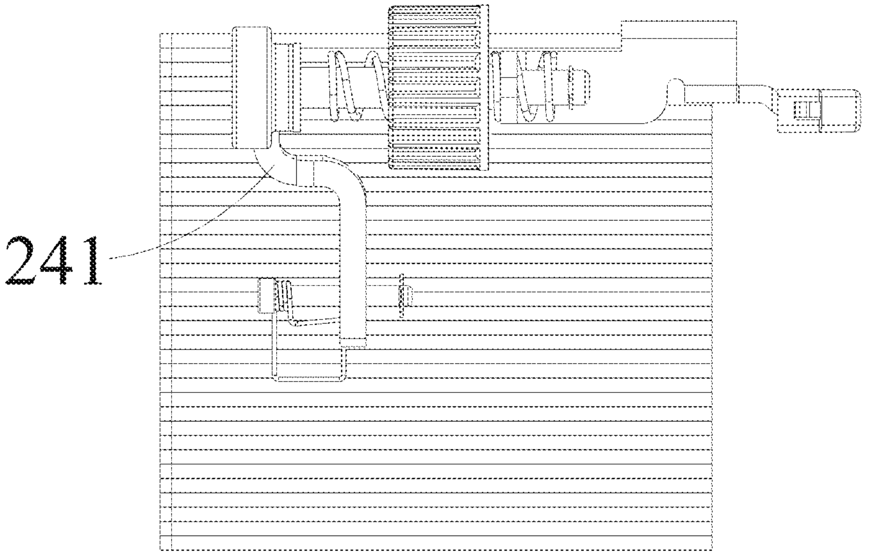
FIG. 14 is a right view of a trigger assembly, a stopper, and fasteners when the trigger assembly of the fastener driver in FIG. 1 is in a first state and the stopper performs a first motion.
Figure 15:
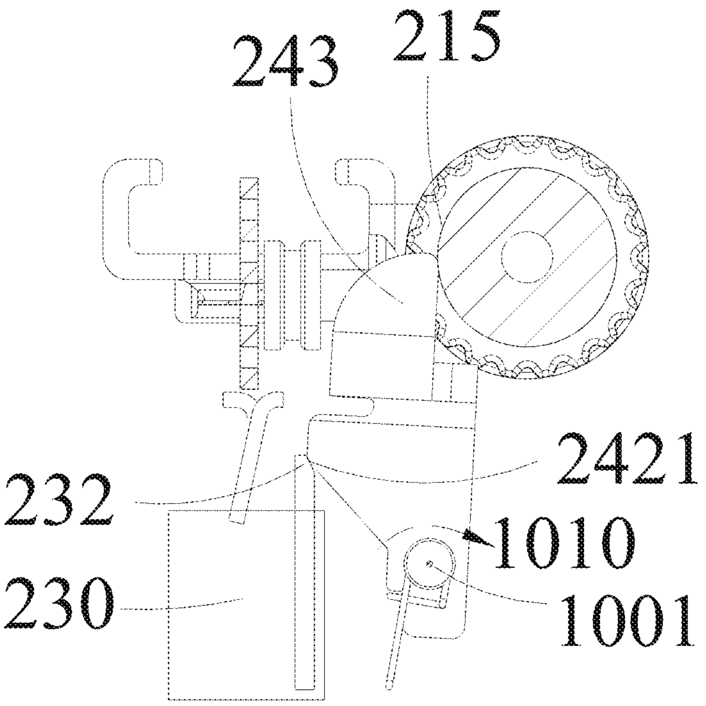
FIG. 15 is a rear view of a trigger assembly, a stopper, part of a lifting assembly, and fasteners when the trigger assembly of the fastener driver in FIG. 1 is in a first state and the stopper performs a first motion.
Figure 16:
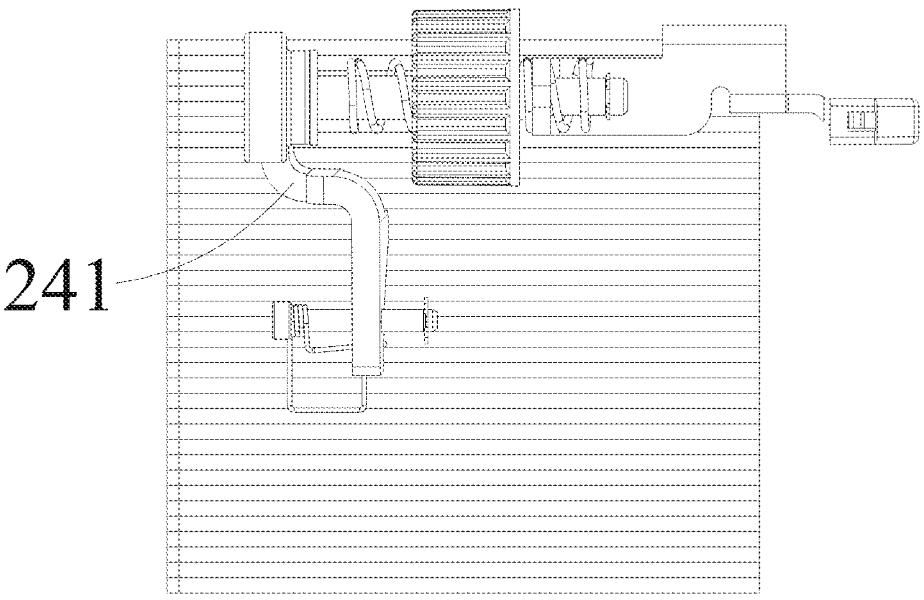
FIG. 16 is a right view of a trigger assembly, a stopper, and fasteners when the trigger assembly of the fastener driver in FIG. 1 is in a first state and the stopper performs a second motion.
Figure 17:
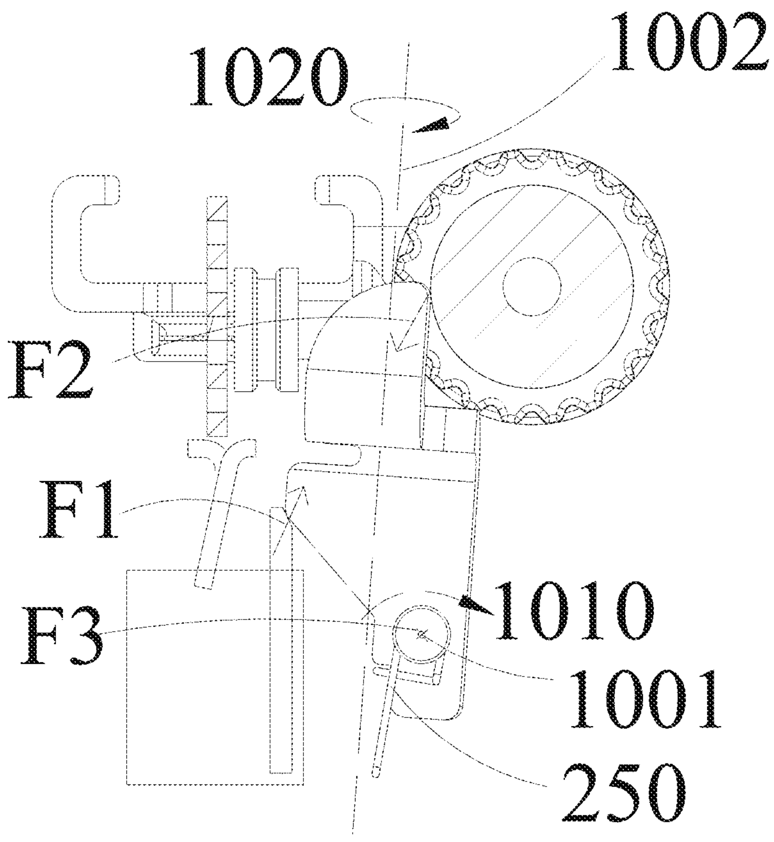
FIG. 17 is a rear view of a trigger assembly, a stopper, part of a lifting assembly, and fasteners when the trigger assembly of the fastener driver in FIG. 1 is in a first state and the stopper performs a second motion.
Figure 18:
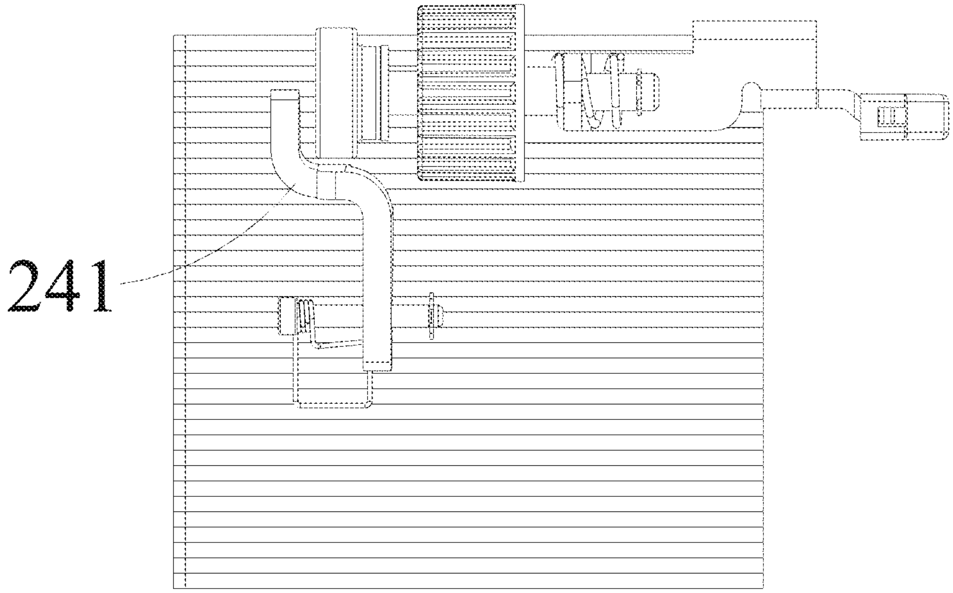
FIG. 18 is a right view of a trigger assembly, a stopper, and fasteners when the trigger assembly of the fastener driver in FIG. 1 is in a second state and the stopper performs a third motion.
Figure 19:
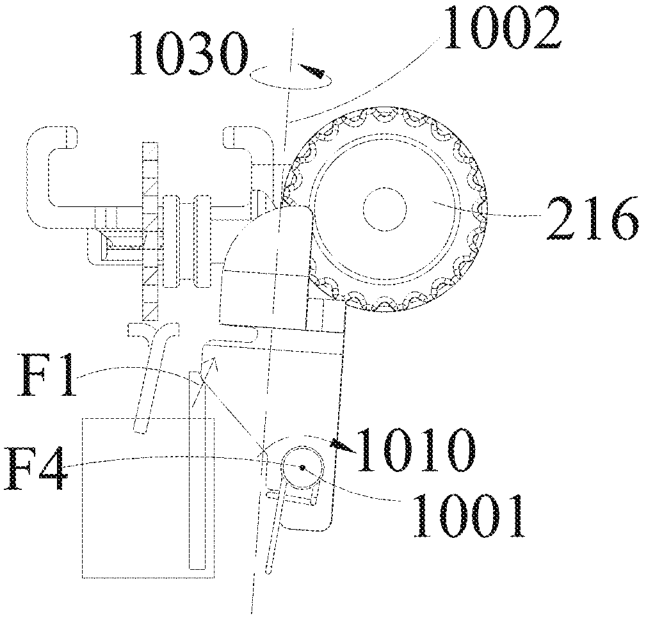
FIG. 19 is a rear view of a trigger assembly, a stopper, part of a lifting assembly, and fasteners when the trigger assembly of the fastener driver in FIG. 1 is in a second state and the stopper performs a third motion.

The trigger assembly 200 is in the first state in FIGS. 14 to 17, and the trigger assembly 200 is in the second state in FIGS. 18 and 19. As shown in FIGS. 14 and 15, when the trigger assembly 200 is at the trigger position, the fastener driver 100 is viewed from the left side or the right side, and the obstruction portion 215 and the stop portion 243 at least partially overlap in the front and rear direction. The fastener driver 100 is viewed from the front side or the rear side, and if the gap between the obstruction portion 215 and the stop portion 243 is small or the obstruction portion 215 is just in contact with the stop portion 243 in the left and right direction, the trigger assembly 200 obstructs the stopper 241 from performing the first motion. That is to say, when the number of fasteners 10 reaches the preset number, the striker 131 moves in the first state, the lifting assembly 230 then starts to drive the stopper 241 to perform the first motion, but the trigger assembly 200 obstructs the stopper 241 from performing the first motion. Since the lifting assembly 230 abuts against the stopper 241, the lifting assembly 230 cannot move upward if the stopper 241 cannot perform the first motion. The lifting assembly 230 is stuck, and the fastener 10 cannot be lifted to the input port 1821 to be driven out by the striker 131. If the stopper 241 cannot perform the first motion, the dry fire prevention assembly 240 cannot enter the dry fire prevention state, which means that each time the user operates the trigger assembly 200 to move, the striker 131 drives out no fastener. In particular, in this example, the striker 131 interferes with the input port 1821 at the shutdown position, and the lifting assembly 230 needs to lift the fasteners 10 to the input port 1821 within a very brief period of time. Once the lifting assembly 230 is even very slightly stuck, the lifting assembly 230 cannot lift the fasteners 10 normally, and the user cannot use the fastener driver 100 normally.

As shown in FIGS. 16 and 17, when the trigger assembly 200 obstructs the stopper 241 from performing the first motion, the lifting assembly 230 drives the stopper 241 to perform the second motion. The stopper 241 is further configured to rotate about a second axis 1002. The second motion includes the first movement of rotating about the first axis 1001 along the first direction 1010 and a second movement of rotating about the second axis 1002 along a second direction 1020. When the obstruction portion 215 abuts against the stop portion 243, the first lifting portion 232 abuts against the first abutment surface 2421 to drive the stopper 241 to perform the second motion. The second motion includes the first movement and the second movement. The first movement and the second movement are movements of rotating about different axes. When rotating about two different axes, the stopper 241 rotates in two dimensions. The stopper 241 has at least two rotational degrees of freedom. The first movement and the second movement occur substantially synchronously. The first movement and the second movement are combined, which may be understood as the flip of the stopper 241. In other words, the flip of the stopper 241, that is, the second motion of the stopper 241 may be split into the first movement and the second movement, but the first motion of the stopper 241 includes only the first movement. Thus, when the trigger assembly 200 obstructs the stopper 241 from performing the first motion, the stopper 241 is switched to perform the second motion so that the lift of at least part of the lifting assembly 230 is allowed. When the stopper 241 performs the second motion, the lifting assembly 230 drives the fasteners 10 to move. It is to be understood that in this example, the first axis 1001 is a fixed axis while the position of the second axis 1002 changes with the change of the position of the stopper 241 when the angle by which the stopper 241 rotates about the first axis 1001 is different. As long as the second motion includes the movements of rotating about two different axes, the position of the axis is not limited here. In some examples, the second motion may include movements of rotating about more axes.

When the trigger assembly 200 obstructs the stopper 241 from performing the first motion, the lifting assembly 230 may drive the stopper 241 to perform the second motion so that the lifting assembly 230 can normally lift the fasteners 10 for the following reason.

The fastener driver 100 includes an elastic member 250. When the lifting assembly 230 applies a first action force F1 to the stopper 241 and the obstruction portion 215 applies a second action force F2 to the stopper 241, the stopper 241 applies a third action force F3 to the elastic member 250 to perform the second motion. In other words, the compressive stresses applied to the stop portion 243 by the first lifting portion 232 and the obstruction portion 215 are converted into an elastic force through the elastic member 250. The forces are transferred to the elastic member 250, which serves to relieve the forces. During the conversion of the forces, the stopper 241 rotates about the second axis 1002 along the second direction 1020 to perform the second motion. The second axis 1002 extends substantially along the length direction of the stopper 241. When the stopper 241 rotates about the second axis 1002, the stopper 241 is viewed along the front and rear direction, the space occupied by the stop portion 243 in the left and right direction is reduced, and the lifting assembly 230 can move upward. When the stopper 241 performs the second movement, the first action force F1 and the second action force F2 are gradually converted into the third action force F3, and the deformation degree of the elastic member 250 is gradually increased. As the stopper 241 performs the second movement, the lifting assembly 230 is driven by the elastic member for the magazine to further drive the stopper 241 to perform the first movement, and the lifting assembly 230 smoothly moves upward to lift the fasteners 10 through the second lifting portion 233. The upward movement of the lifting assembly 230 and the second motion of the stopper 241 are complementary and synchronous, and there is no sequence therebetween.

As shown in FIGS. 18 and 19, after the stopper 241 performs the second motion, the elastic member 250 drives the stopper 241 to perform a third motion. When the second action force F2 decreases to zero, the elastic member 250 drives the stopper 241 to perform the third motion. When the user lifts the fastener driver 100 and the trigger assembly 200 moves forward to get out of the first state and starts to enter the second state, the contact area between the obstruction portion 215 and the stop portion 243 gradually decreases. Since the second action force F2 acting on the stopper 241 decreases to zero, the stress of the stopper 241 is no longer balanced, the elastic member 250 starts to restore the original shape, the elastic potential energy stored in the elastic member 250 is converted into kinetic energy, and the elastic member 250 applies a reaction force F4 to the stopper 241 to drive the stopper 241 to perform the third motion. The third motion includes a third movement of rotating about the second axis 1002 along a third direction 1030. The third movement and the second movement have opposite directions. The third motion also includes the first movement of rotating about the first axis 1001 along the first direction 1010. The stopper 241 performs the third motion. Then, as viewed along the front and rear direction, the stop portion 243 and the trigger portion 216 overlap in the left and right direction. In this case, the stop portion 243 is located on the movement path of the trigger portion 216. The stop portion 243 obstructs the trigger assembly 200 from moving, the stopper 241 forbids the trigger assembly 200 to switch to the first state, and the dry fire prevention assembly 240 enters the dry fire prevention state. The fastener driver 100 is smooth and convenient to use.

Figure 20:
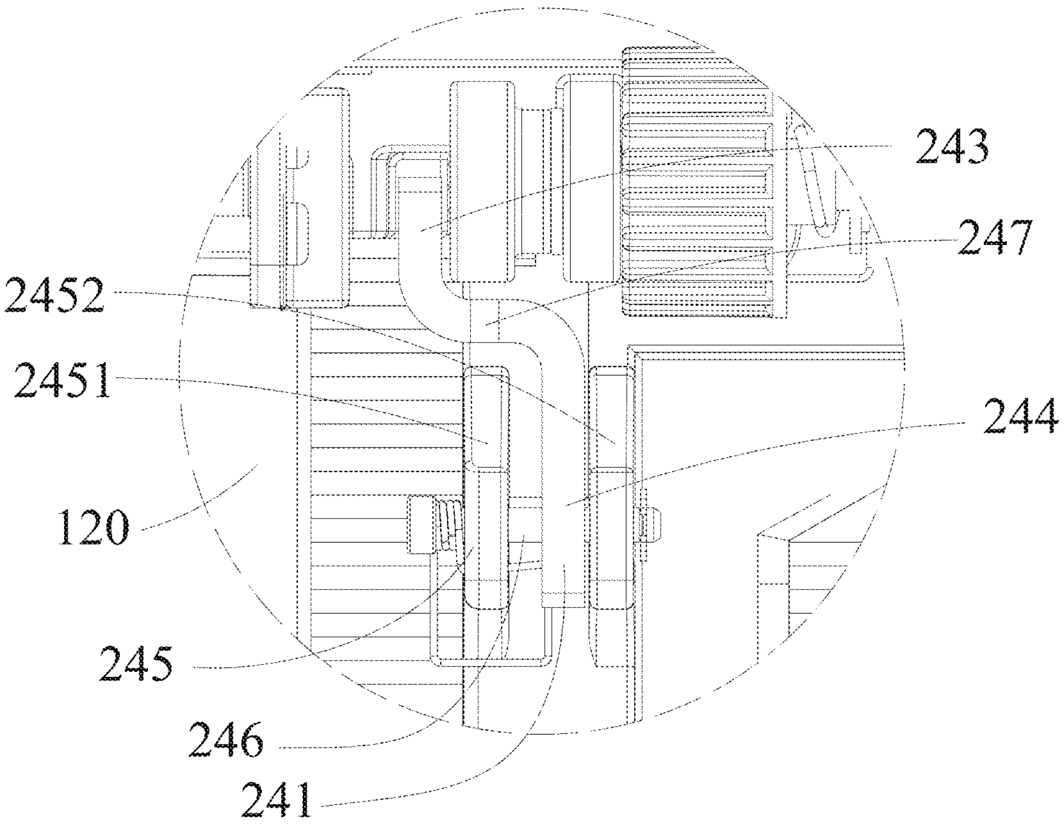
FIG. 20 is an enlarged view of a dry fire prevention assembly of the fastener driver in FIG. 1.
Figure 21:
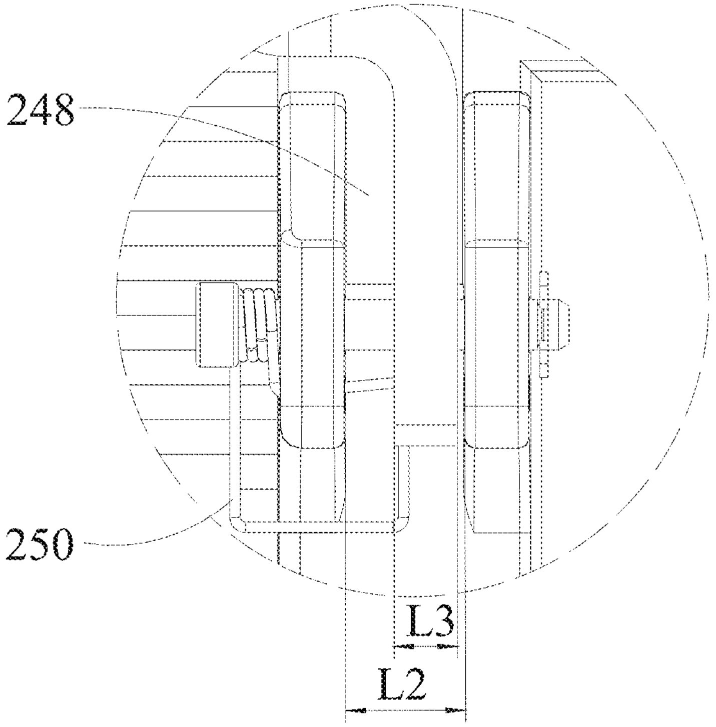
FIG. 21 is an enlarged view of a limit portion, a rotary portion, and an elastic member of the fastener driver in FIG. 20.

As shown in FIGS. 20 and 21, the dry fire prevention assembly 240 includes a limit portion 245 and a rotary shaft 246. The limit portion 245 limits the magnitude of the second motion of the stopper 241. The limit portion 245 is provided at the end of the magazine 120 close to the guide assembly 180 and the side of the magazine 120 close to the trigger assembly 200. In this example, the limit portion 245 and the magazine 120 are integrally formed, which saves the cost. At least part of the rotary shaft 246 is mounted in the limit portion 245. The limit portion 245 includes a first limit wall 2451 and a second limit wall 2452 that are provided opposite to each other in the front and rear direction. Each of the first limit wall 2451 and the second limit wall 2452 includes a hole. The rotary shaft 246 is passed through the holes of the first limit wall 2451 and the second limit wall 2452 to be mounted on the limit portion 245. In some examples, the rotary shaft 246 may be mounted on the limit portion 245 in other manners. The rotary shaft 246 is fixed relative to the limit portion 245. The rotary shaft 246 is substantially parallel to the first axis 1001. The stopper 241 includes an intermediate portion 247 and the rotary portion 244. The intermediate portion 247 connects the rotary portion 244 to the stop portion 243. The stop portion 243 is bent upward relative to the intermediate portion 247, and the rotary portion 244 is bent downward relative to the intermediate portion 247. The rotary portion 244 is closer to the rotary shaft 246 than the stop portion 243 and the intermediate portion 247. The rotary portion 244 is movably sleeved on the rotary shaft 246 and is in a clearance fit with the rotary shaft 246 to flip. The limit portion 245 includes an accommodation space 248 located between the first limit wall 2451 and the second limit wall 2452. The accommodation space 248 may be an open or closed space. At least part of the rotary portion 244 is accommodated in the accommodation space 248.

The length L2 of the accommodation space 248 in the front and rear direction limits the magnitude of the second motion of the stopper 241. The length of the rotary portion 244 in the front and rear direction is L3. In the front and rear direction, the ratio L2/L3 of the length of the accommodation space 248 to the length of the rotary portion 244 is greater than or equal to 1.2. The ratio of the length of the accommodation space 248 to the length of the rotary portion 244 in the front and rear direction is greater than 1.2. Thus, the length of the accommodation space 248 is greater than the length of the rotary portion 244. The limit portion 245 does not obstruct the stopper 241 from flipping, and the stopper 241 has a sufficient space to perform the second movement. The stopper 241 rotates about the second axis 1002 by a relatively large angle. The space occupied by the stop portion 243 in the left and right direction can be reduced more when the stopper 241 is viewed along the front and rear direction, and the lifting assembly 230 can move upward by a relatively long distance.

In some examples, the ratio of the length of the accommodation space 248 to the length of the rotary portion 244 is greater than or equal to 1.2 and less than or equal to 3. In some examples, the ratio of the length of the accommodation space 248 to the length of the rotary portion 244 is greater than or equal to 1.4 and less than or equal to 2.8. Thus, the accommodation space 248 not only provides a sufficient space for the stopper 241 to perform the second movement but also prevents the rotation magnitude of the stopper 241 from being excessively large, which has a simple structure and a low cost.

Figure 22:
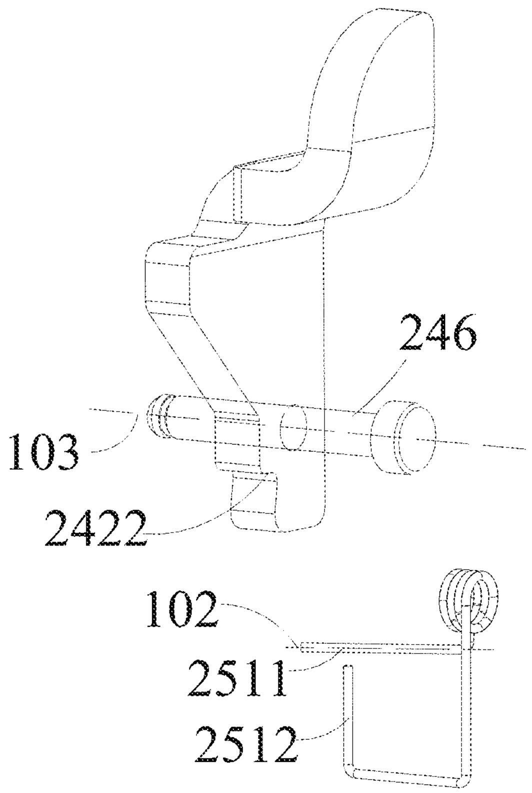
FIG. 22 is a perspective view of a stopper, a rotary shaft, and an elastic member of the fastener driver in FIG. 1.
Figure 23:
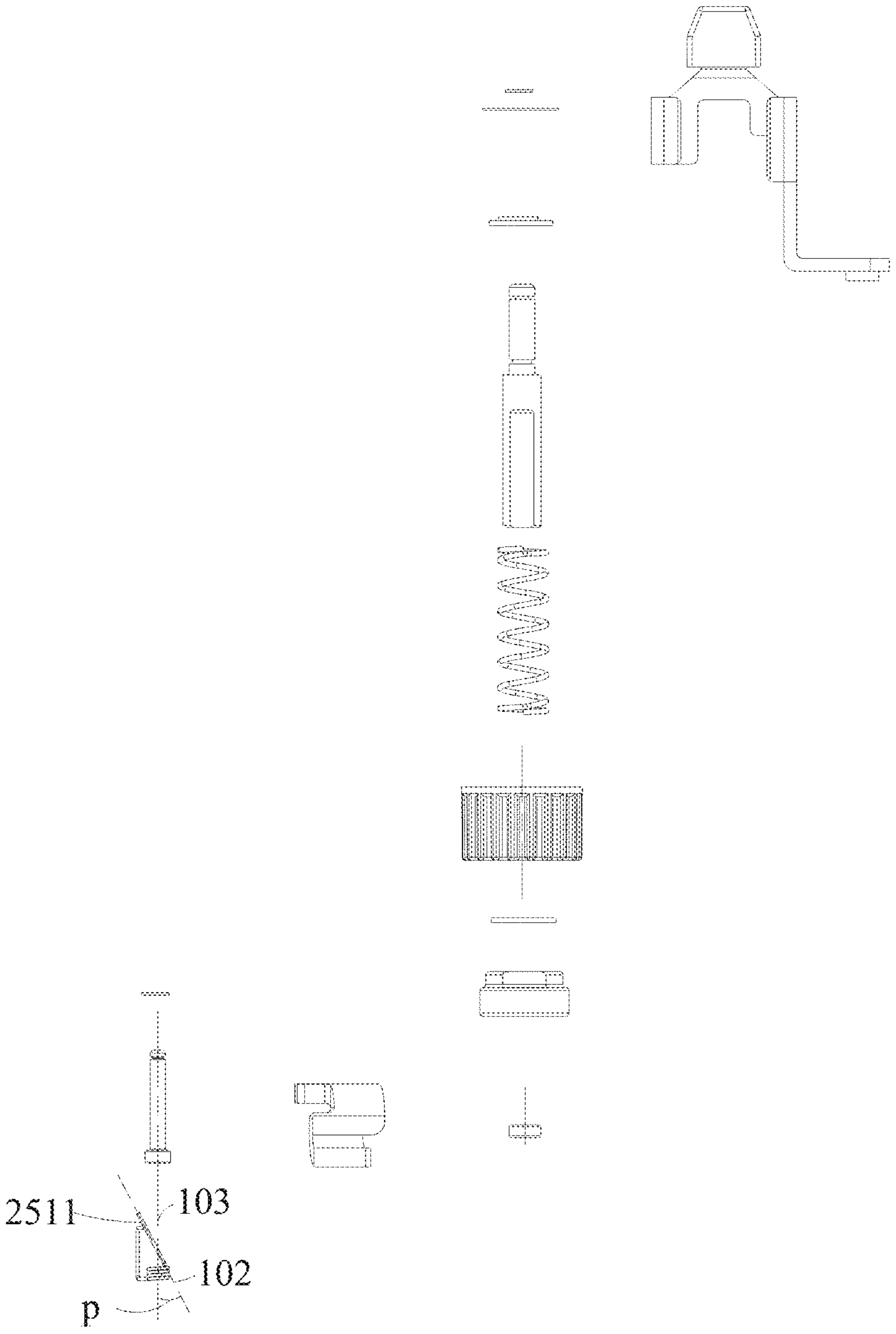
FIG. 23 is an exploded view of a trigger assembly and part of a dry fire prevention assembly of the fastener driver in FIG. 1.

As shown in FIGS. 21 to 23, the elastic member 250 is disposed on the rotary shaft 246. The elastic member 250 includes a deformation portion 251. When the elastic member 250 is compressed, the deformation portion 251 is deformed first. When the elastic member 250 restores the shape, the deformation portion 251 first drives the stopper 241 to move. The stopper 241 includes a second abutment surface 2422. The deformation portion 251 abuts against the second abutment surface 2422 to drive the stopper 241 to perform the third motion. At least part of the second abutment surface 2422 is located on the side of the rotary shaft 246 close to the first lifting portion 232 and far away from the stop portion 243. In this example, the second abutment surface 2422 is located on the lower left side of the rotary shaft 246. Thus, when the stopper 241 performs the first motion, the second motion, and the third motion, the elastic member 250 can store or release energy. The second abutment surface 2422 is a bent surface and is recessed toward the rotary shaft 246. The second abutment surface 2422 includes a groove. The deformation portion 251 abuts against the groove.

The elastic member 250 is a spring wire partially wound on the rotary shaft 246. The deformation portion 251 includes a first deformation portion 2511 and a second deformation portion 2512. The first deformation portion 2511 and the second deformation portion 2512 are two ends of the spring wire, respectively. The first deformation portion 2511 extends substantially along the second straight line 102. The rotary shaft 246 extends substantially along a third straight line 103. When the fastener driver 100 is viewed along the up and down direction, the angle p between the second straight line 102 and the third straight line 103 is greater than 0 degrees and less than or equal to 100 degrees. In some examples, the angle p between the second straight line 102 and the third straight line 103 is greater than or equal to 10 degrees and less than or equal to 50 degrees. In some examples, the angle p between the second straight line 102 and the third straight line 103 is greater than or equal to 20 degrees and less than or equal to 40 degrees. The angle p between the second straight line 102 and the third straight line 103 is greater than 0 degrees and less than or equal to 100 degrees so that the deformation portion 251 can receive the force from the stopper 241 and drive the stopper 241 to move. In some examples, the elastic member 250 may have other shapes or may be made of other materials as long as the elastic member 250 can be deformed after being subjected to the force from the stopper 241 and can drive the stopper 241 to move when restoring the shape, which is not limited here.

The elastic member 250 has an elastic force. The ratio of the elastic force to the mass of the stopper 241 is greater than 1 N/g and less than or equal to 10 N/g. In some examples, the ratio of the elastic force to the mass of the stopper 241 is greater than 1 N/g and less than or equal to 9 N/g, 8 N/g, 7 N/g, 6 N/g, 5 N/g, 4 N/g, 3 N/g, or 2 N/g. The ratio of the elastic force to the mass of the stopper 241 is greater than 1 N/g so that the elastic member 250 can drive the stopper 241 to move. The ratio of the elastic force to the mass of the stopper 241 is less than or equal to 10 N/g so that the stopper 241 can be driven by the lifting assembly 230 to drive the elastic member 250 to deform.

When the preset number of fasteners 10 remain in the magazine 120, the stopper 241 flips to allow at least part of the lifting assembly 230 to be lifted. After the lifting assembly 230 is lifted, the elastic member 250 drives the stopper 241 to flip so that the dry fire prevention assembly 240 enters the dry fire prevention state to remind the user to add the fasteners 10. Thus, the fastener driver 100 is convenient, fast, and safe to use.

As shown in FIGS. 24 to 29, the fastener driver 100 includes an accommodation portion 260 and a light-emitting device 270. The accommodation portion 260 accommodates at least part of the light-emitting device 270, and the light-emitting device 270 is configured to perform illumination and/or indication. The light-emitting device 270 includes a connection portion 271. At least part of the connection portion 271 is movably accommodated in the accommodation portion 260. The connection portion 271 is movable relative to the accommodation portion 260 so that at least part of the light-emitting device 270 is movable relative to the housing 110. The user may operate the light-emitting device 270 to move at least part of the light-emitting device 270. Thus, the light-emitting device 270 can illuminate and indicate a larger range.

In some examples, the accommodation portion 260 is disposed on the housing 110. The light-emitting device 270 is generally configured to illuminate the shooting region of the fastener 10. In this example, the accommodation portion 260 is partially disposed on the transmission portion 112 and partially disposed on the main housing 111. The connection portion 271 is configured to slide along the extension direction of the accommodation portion 260. The accommodation portion 260 is configured to be substantially parallel to the extension direction of the main housing 111. The transmission portion 112 is relatively close to the guide assembly 180 so that the light-emitting device 270 can more clearly illuminate the shooting region of the fastener 10. In some examples, the light-emitting device 270 may be disposed on the main housing 111, the transmission portion 112, the grip 113, the coupling portion 114, or the magazine 120 or may be disposed at the position of a combination of any portions of the housing 110.

Figure 24:
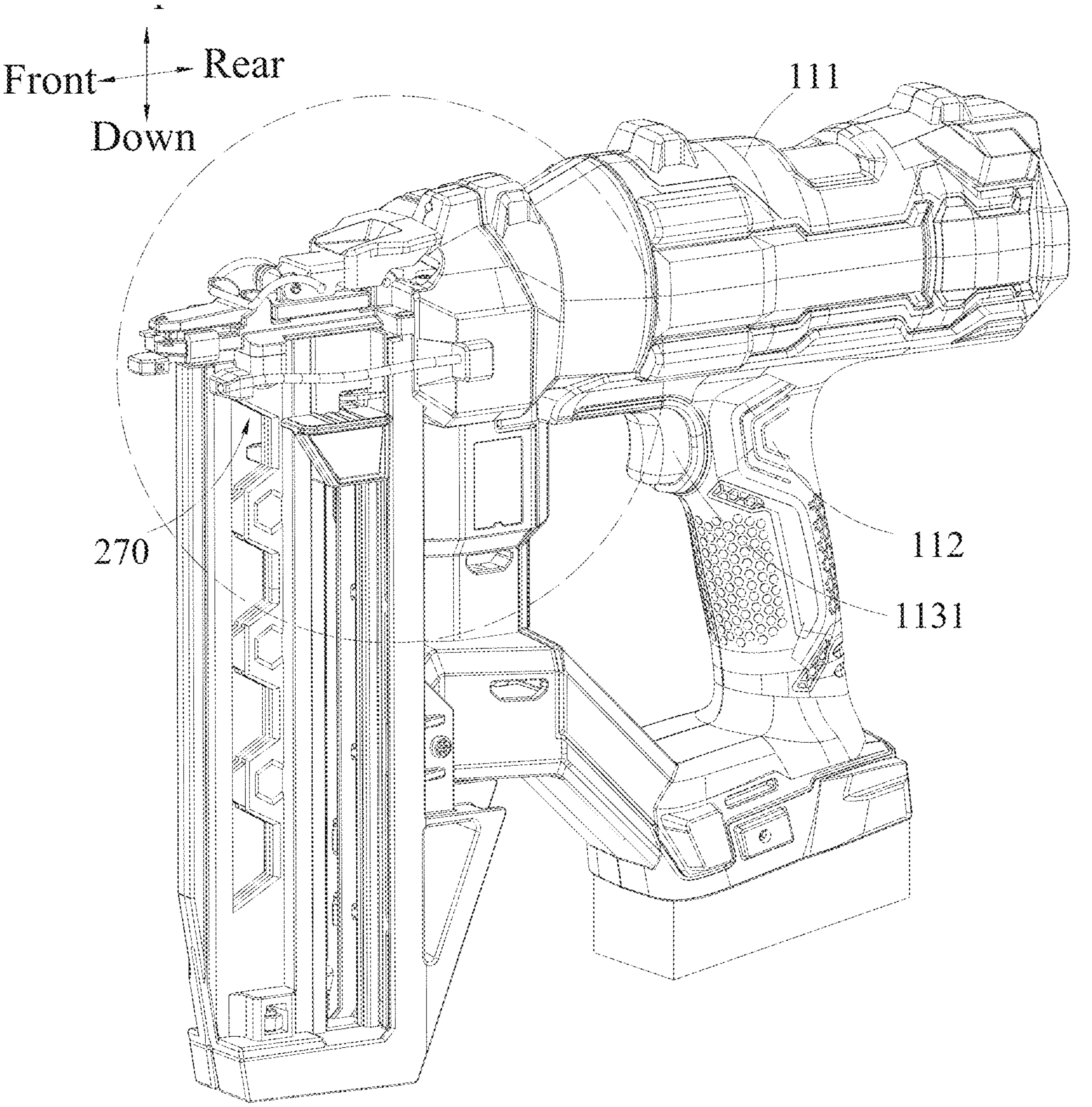
FIG. 24 is a perspective view of a fastener driver according to another example of the present application.
Figure 25:
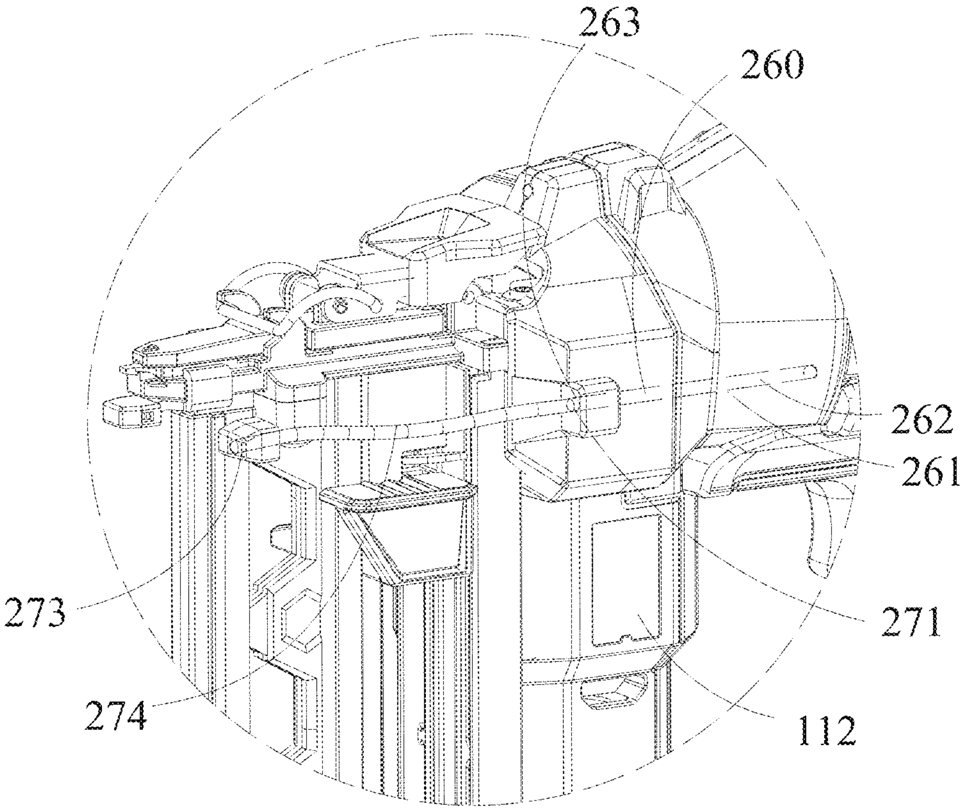
FIG. 25 is an enlarged view of a light-emitting device of the fastener driver in FIG. 24 at a position.
Figure 26:
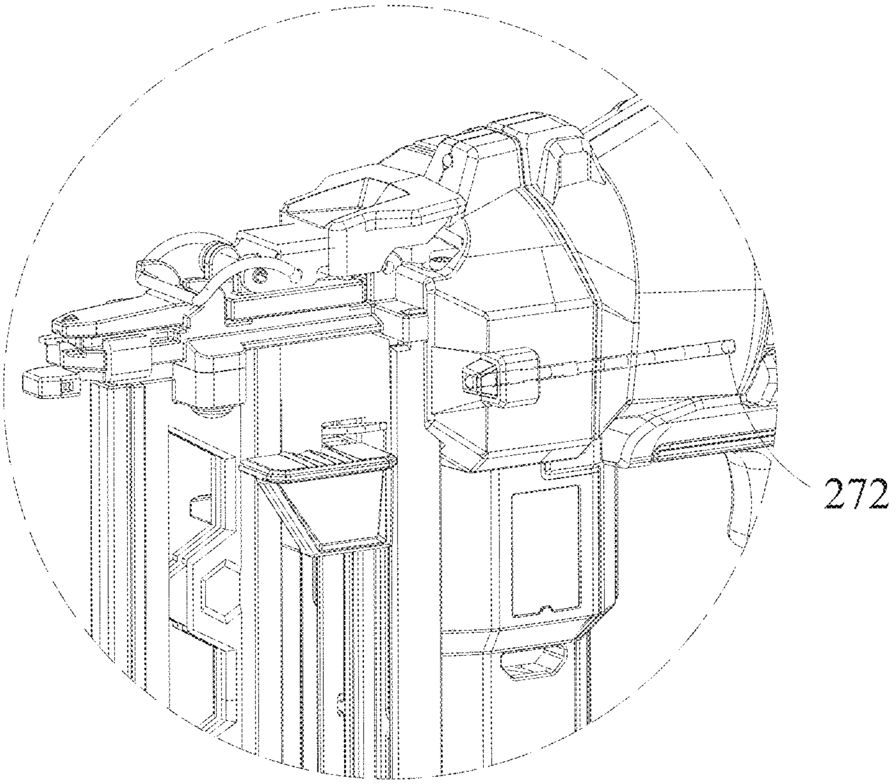
FIG. 26 is an enlarged view of a light-emitting device of the fastener driver in FIG. 24 at another position.

The connection portion 271 includes a slider 272. The accommodation portion 260 includes a rail 261, and the rail 261 guides the slider 272 to move. As shown in FIGS. 24 to 26, in this example, the surface of the slider 272 is curved. The slider 272 is spherical. The rail 261 extends substantially parallel to the extension direction of the main housing 111 and is provided on the inner side of the housing 110. The connection portion 271 may slide in the front and rear direction. The rail 261 has a channel 262 closed along the length direction of the rail 261. The channel 262 includes an opening 263 that is open forward. The inner surface of the channel 262 is curved, and the inner surface of the rail 261 is cylindrical. The slider 272 is accommodated in the rail 261 so that the light-emitting device 270 can be accommodated by sliding in the rail 261. Any dimension of the cross section of the slider 272 is larger than any dimension of the cross section of the opening 263 so that the movement distance of the slider 272 is limited by the opening 263. In this example, the diameter of the cross section of the slider 272 is larger than the diameter of the cross section of the opening 263. The slider 272 is movable within the channel 262 without being separated from the channel 262 so that it is convenient for the user to repeatedly remove the connection portion 271 from the accommodation portion 260 and accommodate the connection portion 271 into the accommodation portion 260.

The light-emitting device 270 includes a light-emitting portion 273 that can emit light. The light emitted by the light-emitting portion 273 may be lamplight or light reflected by a special structure or coating. The light-emitting portion 273 is connected to the connection portion 271. When the connection portion 271 moves relative to the accommodation portion 260, the light-emitting portion 273 moves along with the connection portion 271. The light-emitting device 270 is slidably accommodated in the accommodation portion 260. In this example, the light-emitting portion 273 is rotatable relative to the connection portion 271. The connection portion 271 is slidable relative to the accommodation portion 260, and the light-emitting portion 273 is rotatable relative to the connection portion 271. Thus, the light-emitting portion 273 can illuminate and indicate a larger range and perform the illumination and the indication at more angles for the user, which is convenient to use. It is to be noted that the rotation includes the rotation (axial rotation) of the light-emitting portion 273 around itself and the rotation (orbital revolution) of the light-emitting portion 273 relative to the connection portion 271. The type of the rotation is not limited here.

The light-emitting device 270 includes a flexible rod 274. The light-emitting portion 273 is connected to the connection portion 271 through the flexible rod 274. The flexible rod 274 supports the light-emitting portion 273. Thus, the user operates the light-emitting portion 273 to apply a force to the flexible rod 274 to deform the flexible rod 274, thereby adjusting and fixing the position of the light-emitting portion 273. The flexible rod 274 has a certain rigidity, and the diameter of the cross section of the flexible rod 274 is smaller than the diameter of the cross section of the opening 263. Thus, the flexible rod 274 can be passed through the opening 263 and be accommodated in the accommodation portion 260, which forms a compact structure and is convenient to store. The flexible rod 274 can not only change an illumination range and angle through deformation but also support the light-emitting portion 273 so that the light source is stable. In addition, the flexible rod 274 can also be accommodated in the accommodation portion 260. Thus, the flexible rod 274 is convenient to use.

At least part of the accommodation portion 260 is disposed above the trigger 1131, and the position of the accommodation portion 260 is at the upper portion of the fastener driver 100. The accommodation portion 260 may be designed to be relatively long in the front and rear direction. The storage position of the light-emitting device 270 is at the upper portion of the fastener driver 100, and the light-emitting device 270 can move back and forth relative to the housing 110 by a relatively long distance. The light-emitting device 270 has a large illumination and indication range, a high space utilization rate, and an attractive appearance.

Figure 27:
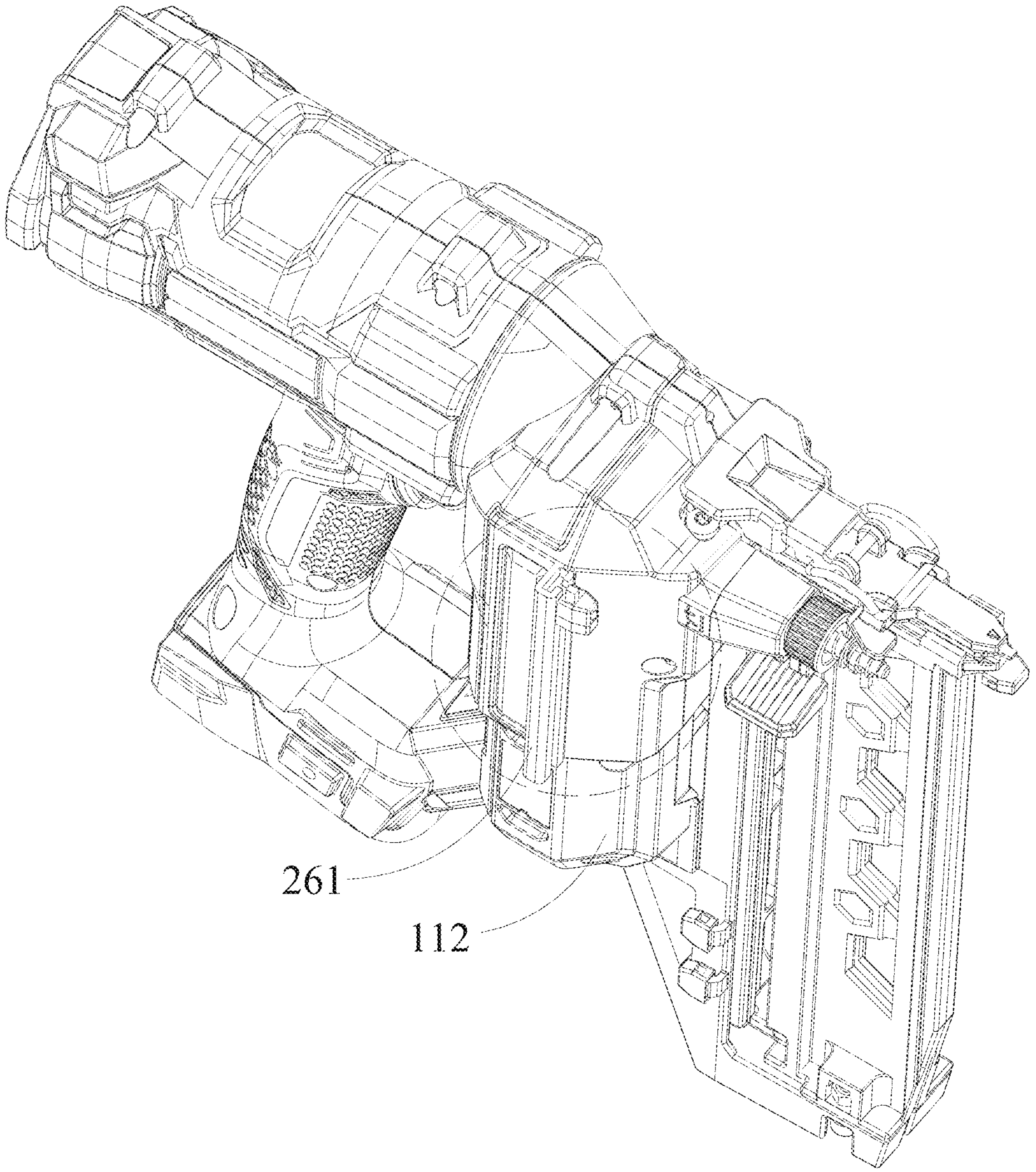
FIG. 27 is a perspective view of another example of the fastener driver in FIG. 24.
Figure 28:
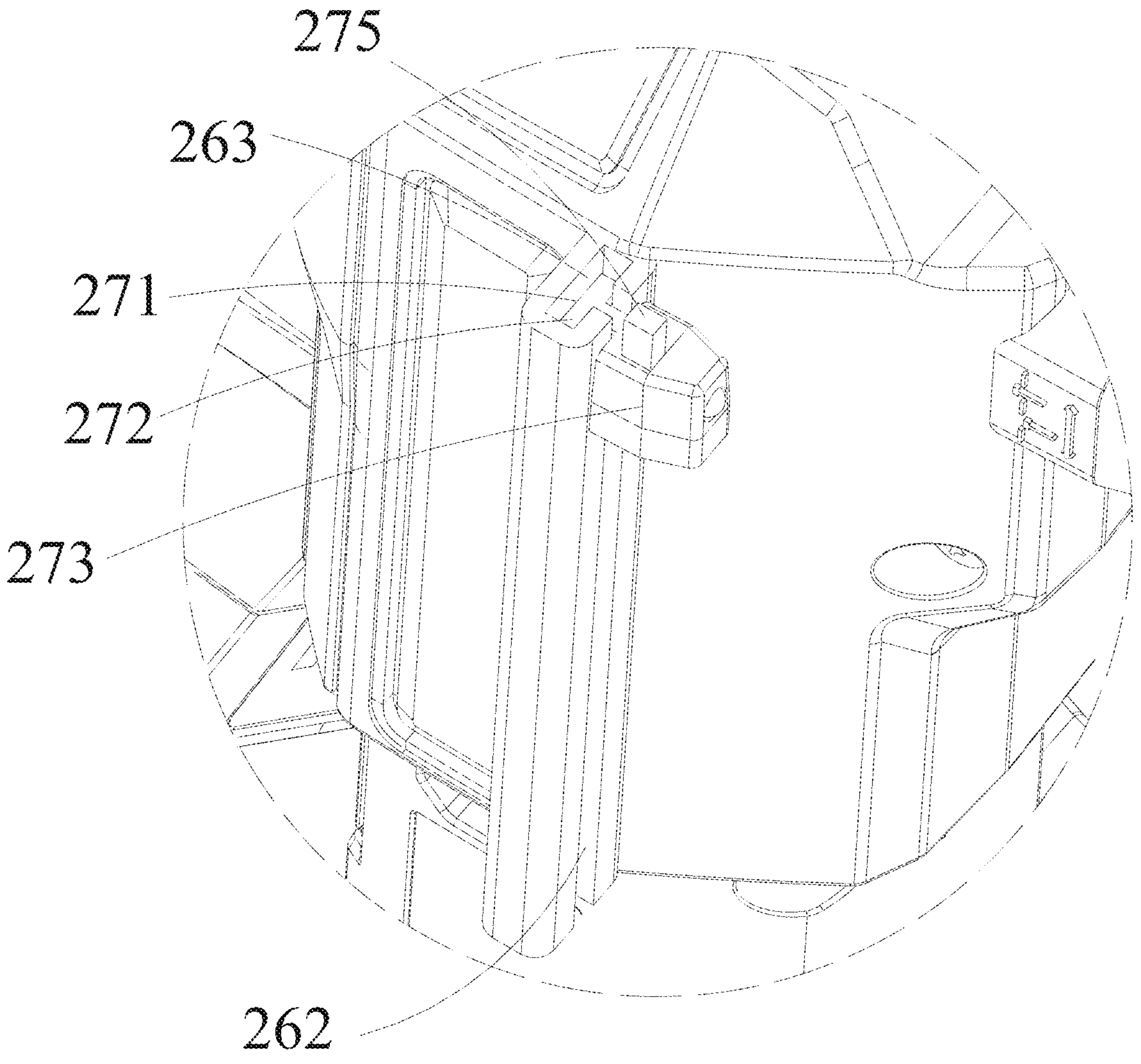
FIG. 28 is an enlarged view of a light-emitting device and an accommodation portion of the fastener driver in FIG. 27.
Figure 29:
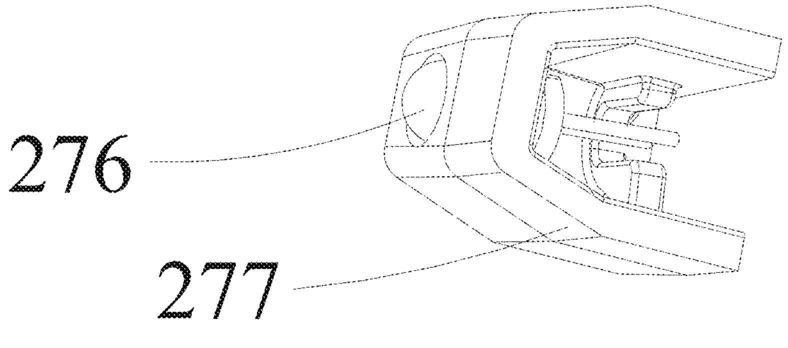
FIG. 29 is a perspective view of a light-emitting device of the fastener driver in FIG. 27.

As shown in FIGS. 27 to 29, in some examples, the accommodation portion 260 is configured to be substantially parallel to the extension direction of the transmission portion 112. The connection portion 271 slides up and down in the accommodation portion 260. The slider 272 is polygonal. The rail 261 extends substantially parallel to the extension direction of the transmission portion 112 and is provided on the outer side of the housing 110. The rail 261 has a channel 262 semi-open along the length direction of the rail 261. The channel 262 includes an opening 263 that is open forward and upward. The opening 263 is C-shaped. The inner surface of the rail 261 is movably engaged with the connection portion 271 so that the connection portion 271 can slide in the rail 261 or stop at a certain position on the rail 261. In some examples, the light-emitting portion 273 includes a pressing member 275. When the user presses the pressing member 275, the connection portion 271 is slidable relative to the accommodation portion 260 while when the user releases the pressing member 275, the connection portion 271 is fixed relative to the accommodation portion 260.

The light-emitting portion 273 includes a light-emitting diode 276 and a fixing housing 277. The light-emitting diode 276 has a small dimension, is easy to store, and has a low manufacturing cost. The light-emitting diode 276 is fixed through the fixing housing 277, and the fixing housing 277 prevents the light-emitting diode 276 from being damaged. The fixing housing 277 is formed with ribs that clamp the light-emitting diode 276. When operating the light-emitting portion 273, the user holds the fixing housing 277 with fingers and drags the light-emitting portion 273. Thus, the light-emitting portion 273 is convenient to use.

Figure 30:
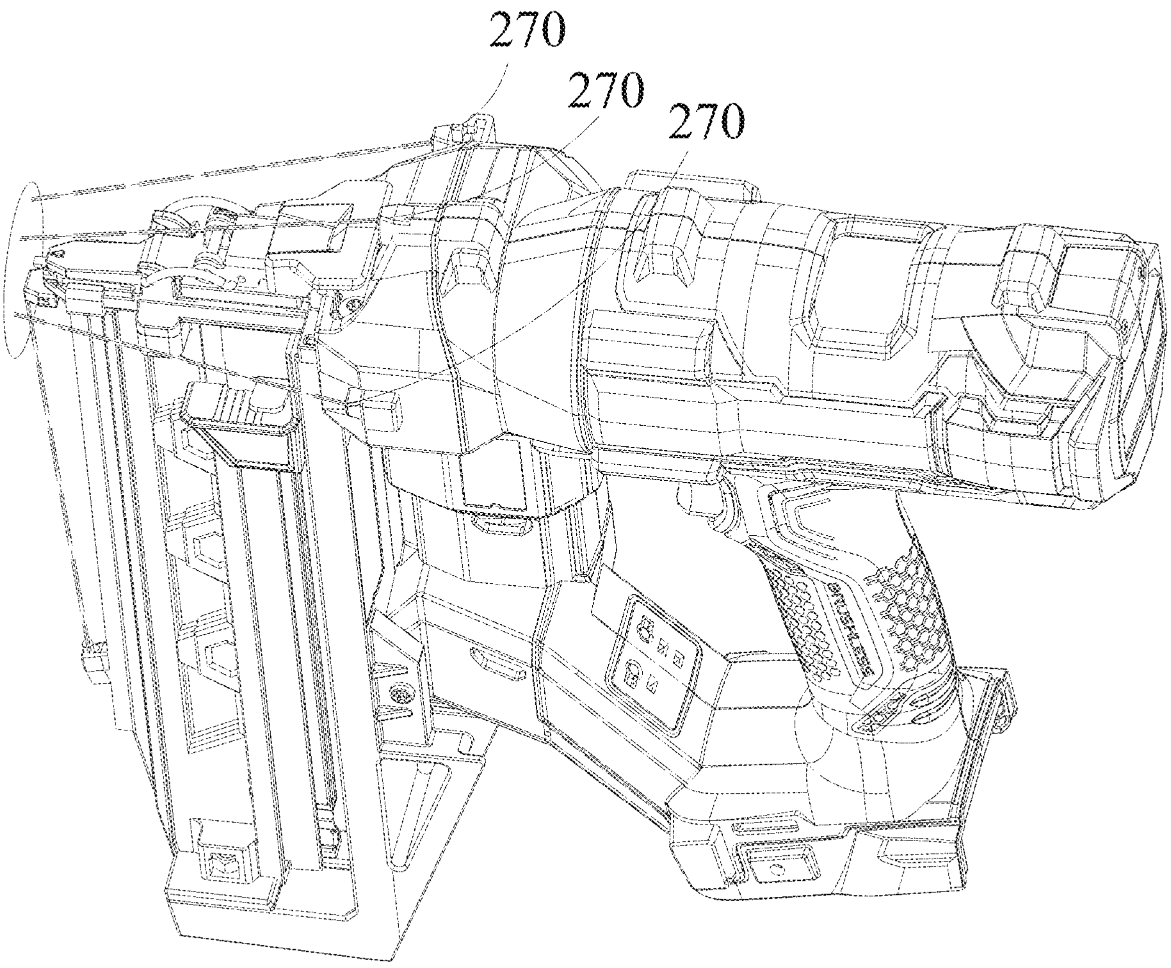
FIG. 30 is a perspective view of another example of the fastener driver in FIG. 24 from an angle.
Figure 31:
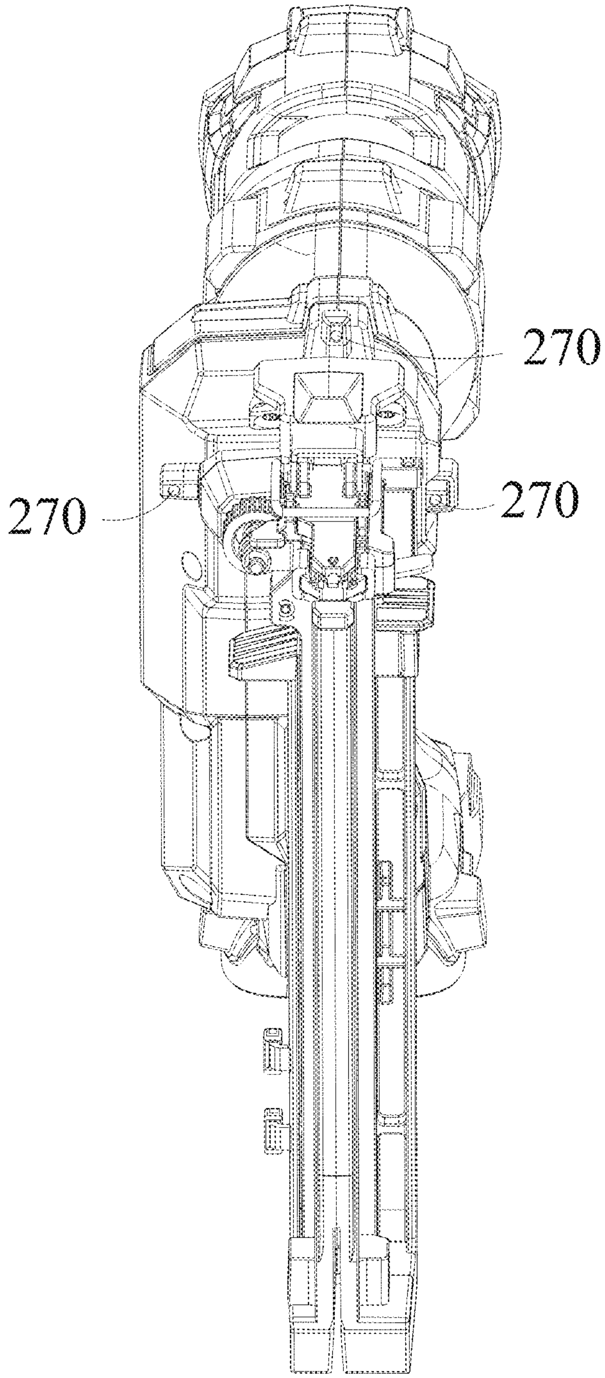
FIG. 31 is a perspective view of the fastener driver in FIG. 30 from another angle.

As shown in FIG. 30 and FIG. 31, in some examples, multiple light-emitting devices 270 are provided. For example, two or three light-emitting devices 270 are provided. The light-emitting devices 270 are distributed around the position where the fastener 10 is driven out. The light-emitting devices 270 may be movable or fixed. Each light-emitting device 270 may be individually controlled to be on and off, or the brightness of each light-emitting device 270 may be individually controlled. In different use environments, the user may choose to turn on different light-emitting devices 270 to obtain appropriate illumination brightness and an appropriate illumination angle. The user may individually adjust the brightness of one light-emitting device 270 to adjust the position of the shadow generated by light irradiation. The user can clearly see the position where the fastener 10 is driven out so that the fastener driver 100 is convenient to use.

Figure 32:
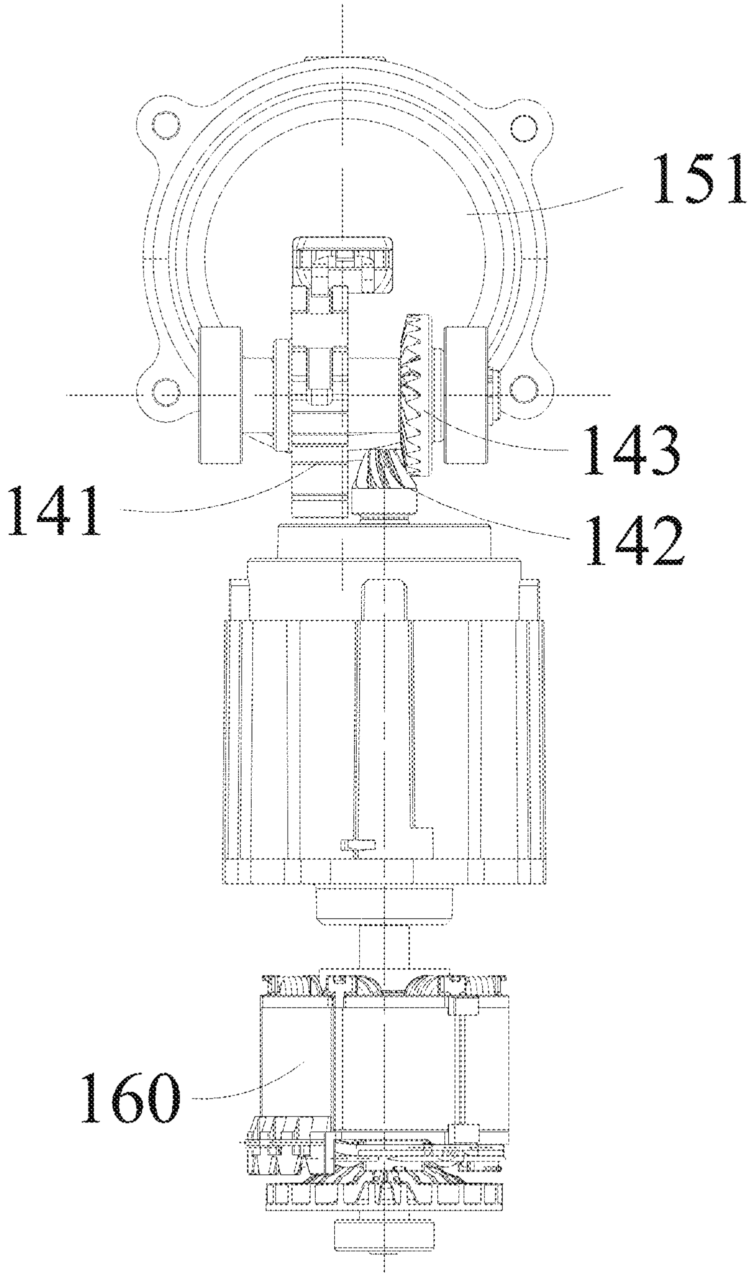
FIG. 32 is a front view of a first cylinder, a transmission mechanism, and a motor of another example of the fastener driver in FIG. 1.
Figure 33:
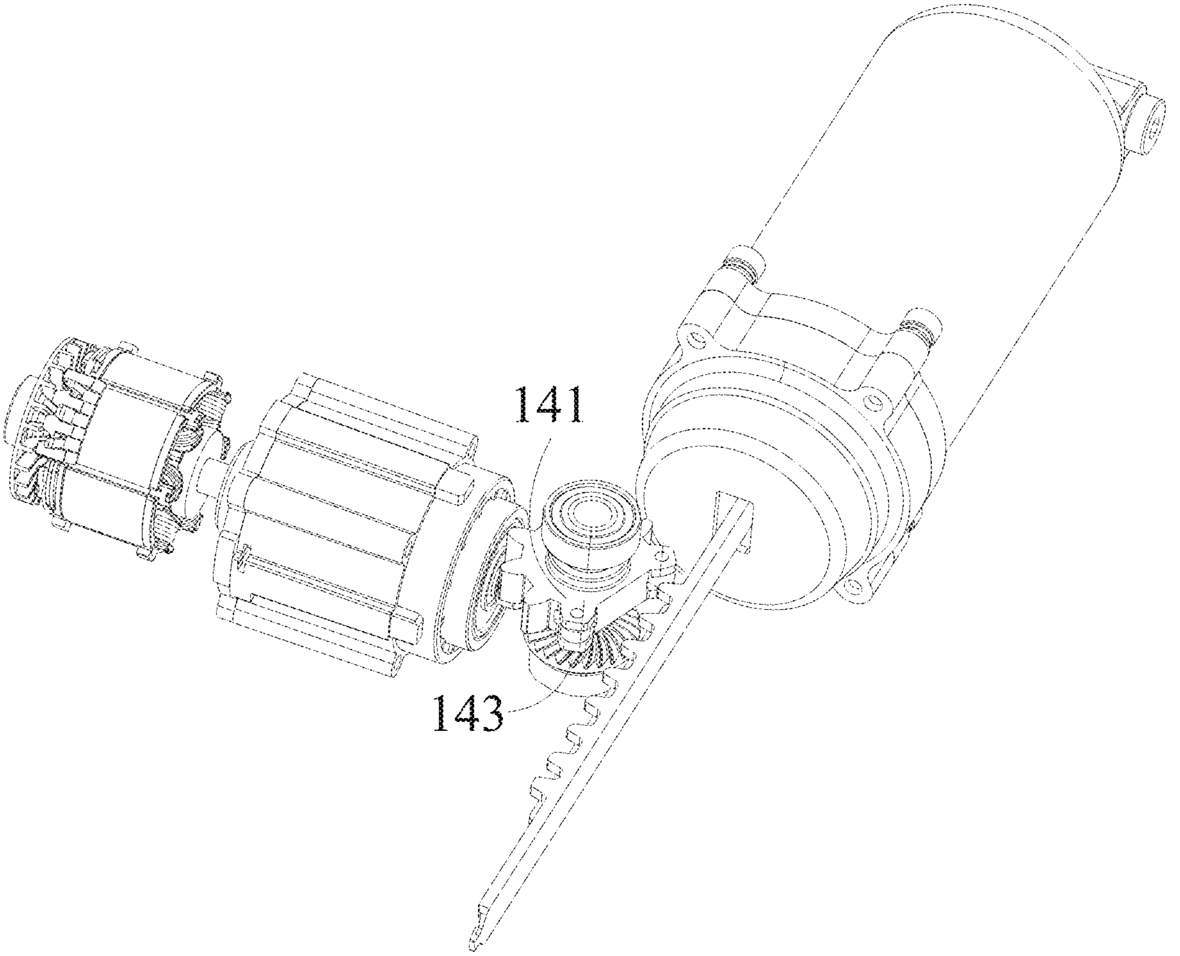
FIG. 33 is a perspective view of the fastener driver in FIG. 32.
Figure 34:
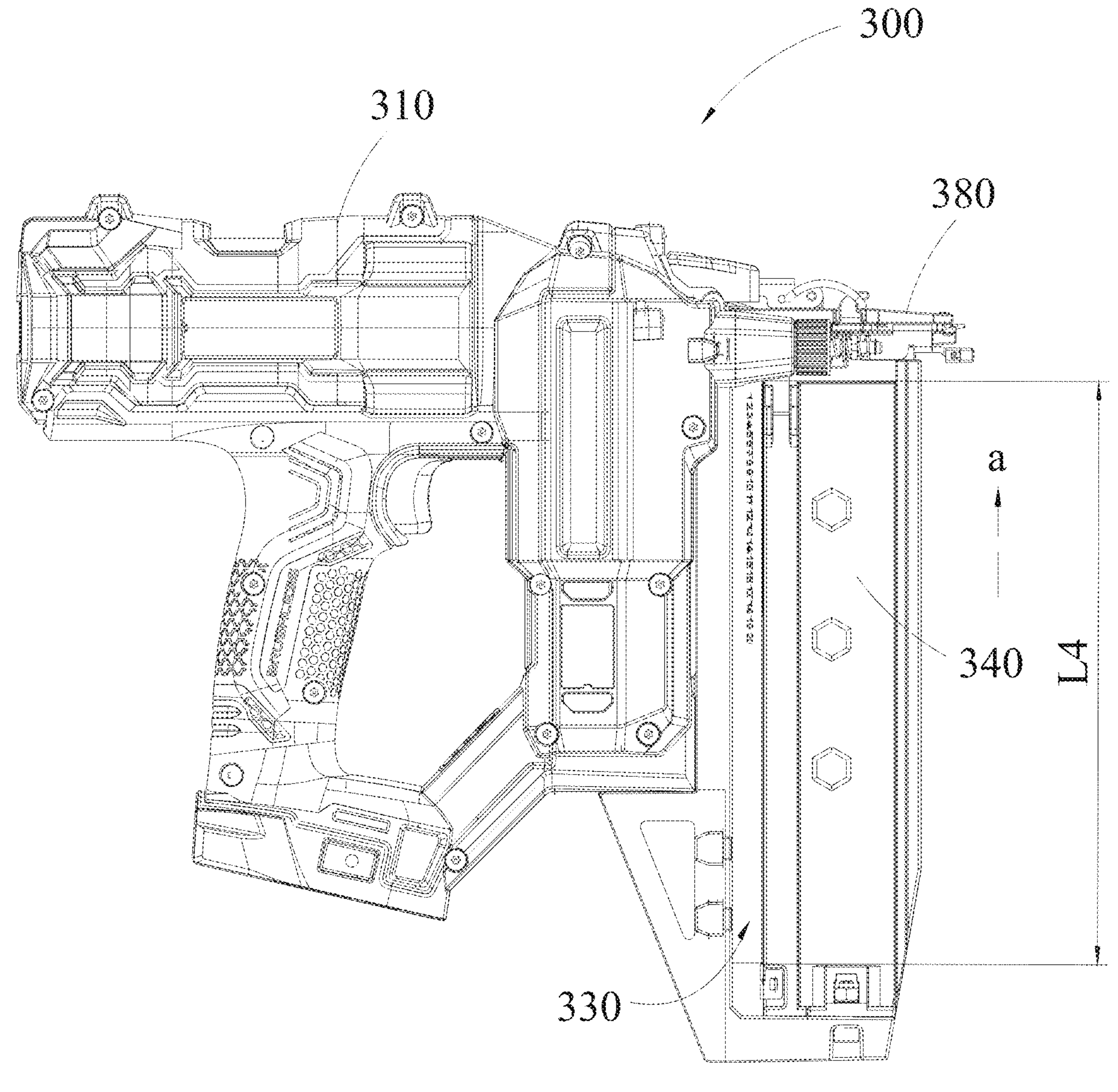
FIG. 34 is a right view of a fastener driver according to another example of the present application.
Figure 35:
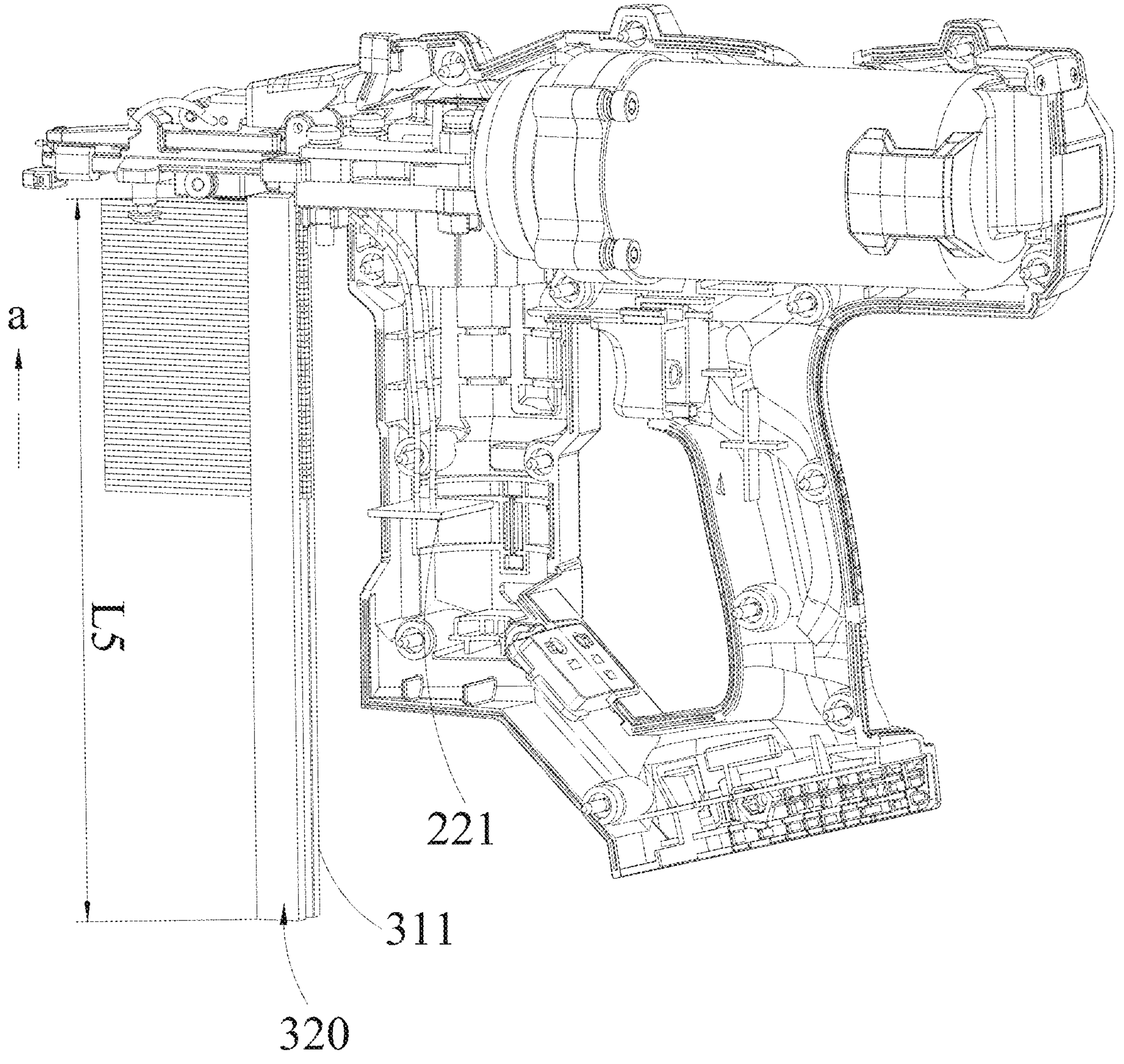
FIG. 35 is a perspective view of the fastener driver in FIG. 34 with part of a housing and a magazine removed.
Figure 36:
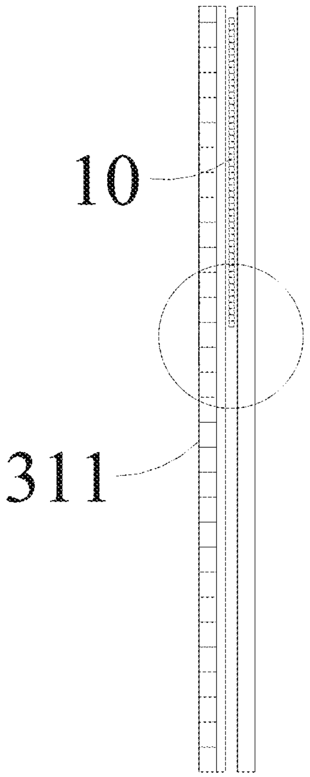
FIG. 36 is a front view of a display device, a sensing device, and a fastener of the fastener driver in FIG. 34.
Figure 37:
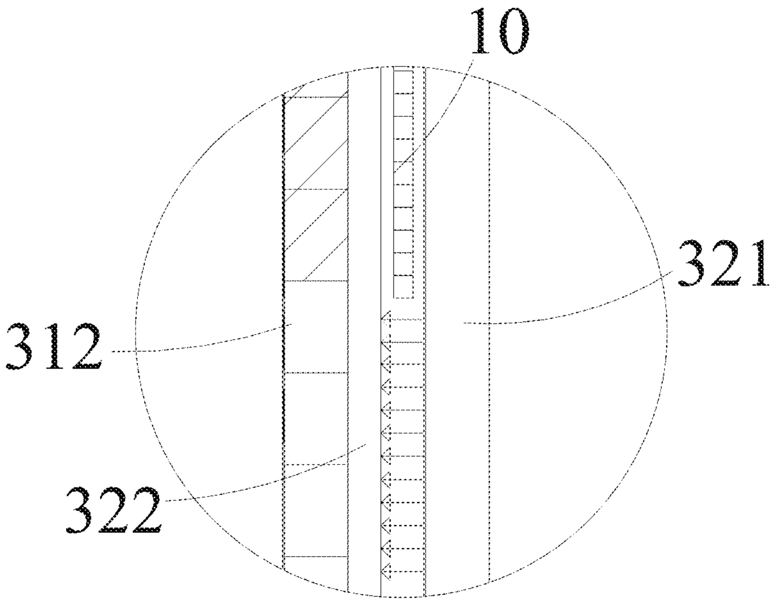
FIG. 37 is an enlarged view of a display device, a sensing device, and a fastener of the fastener driver in FIG. 36.

As shown in FIGS. 32 and 33, in some examples, the transmission mechanism 140 includes a driving wheel 141. The driving wheel 141 drives the striker 131 to move. The transmission mechanism 140 further includes a first bevel gear 142 and a second bevel gear 143. The motor 160 drives the first bevel gear 142. The first bevel gear 142 meshes with the second bevel gear 143 and drives the second bevel gear 143 to rotate. The second bevel gear 143 drives, through a shaft, the driving wheel 141 to rotate. The rotation axes of the driving wheel 141 and the second bevel gear 143 are perpendicular to the rotational axis of the first bevel gear 142. The driving wheel 141, the first bevel gear 142, and the second bevel gear 143 are located substantially below the striker 131. The distance between the first cylinder 151 and the motor 160 in the left and right direction is less than or equal to 15 mm. In some examples, the distance between the first cylinder 151 and the motor 160 in the left and right direction is less than or equal to 14 mm, 13 mm, 12 mm, 11 mm, or 10 mm.

The present application further provides a fastener driver 300 according to another example. The structure of the fastener driver 300 is substantially the same as the structure of the fastener driver 100. The fastener driver 300 includes a magazine 340, a housing 310, and a guide assembly 380.

As shown in FIGS. 34 to 37, the fastener driver 300 further includes a display device 330. The display device 330 displays visual information to the user by emitting light. The user views the display device 330 with eyes to obtain the visual information. The display device 330 extends substantially along an extension direction a. The display device 330 includes a light-emitting portion 311. The length of the light-emitting portion 311 in the extension direction is greater than or equal to 30 mm. The length L4 of the light-emitting portion 311 in the extension direction a is greater than or equal to 50 mm. The length L4 of the light-emitting portion 311 in the extension direction a is long so that the user can clearly view the information displayed by the display device 330 and the display device 330 can display rich types of information and can display more information. In some examples, the length L4 of the light-emitting portion 311 in the extension direction a is greater than or equal to 30 mm and less than or equal to 350 mm. In some examples, the length L4 of the light-emitting portion 311 in the extension direction a is greater than or equal to 40 mm and less than or equal to 300 mm. In some examples, the length L4 of the light-emitting portion 311 in the extension direction a is greater than or equal to 50 mm and less than or equal to 250 mm. In some examples, the length L4 of the light-emitting portion 311 in the extension direction a is greater than or equal to 60 mm and less than or equal to 250 mm. In some examples, the length L4 of the light-emitting portion 311 in the extension direction a is greater than or equal to 70 mm, 80 mm, 90 mm, 100 mm, 110 mm, 120 mm, 130 mm, or 140 mm.

The vertical cross section of the display device 330 in the extension direction a has a cross-sectional area. The cross-sectional area is greater than or equal to 0.2 $cm^2$ and less than or equal to 30 $cm^2$. In some examples, the cross-sectional area is greater than or equal to 0.5 $cm^2$ and less than or equal to 25 $cm^2$. In some examples, the cross-sectional area is greater than or equal to 1 $cm^2$ and less than or equal to 20 $cm^2$. In some examples, the cross-sectional area is approximately 2 $cm^2$, 3 $cm^2$, 4 $cm^2$, 5 $cm^2$, 6 $cm^2$, 7 $cm^2$, 8 $cm^2$, 9 $cm^2$, 10 $cm^2$, or 15 $cm^2$.

The fastener driver 300 also includes a sensing device 320. The sensing device 320 senses the number of fasteners 10. The display device 330 displays the visual information in response to the number of fasteners 10 sensed by the sensing device 320. The visual information displayed by the display device 330 includes light emission, being off, a flash, a color change, a number, a letter, a symbol display, and the like. The user can learn information such as the remaining number of fasteners through the visual information displayed by the display device 330. The sensing device 320 extends substantially along the extension direction a. The length L5 of the sensing device 320 in the extension direction a is greater than or equal to 50 mm. The length L5 of the sensing device 320 in the extension direction a is long so that the sensing device 320 can sense a large number of fasteners 10 and have a large sensing range. In some examples, the length L5 of the sensing device 320 in the extension direction a is greater than or equal to 30 mm and less than or equal to 350 mm. In some examples, the length L5 of the sensing device 320 in the extension direction a is greater than or equal to 40 mm and less than or equal to 300 mm. In some examples, the length L5 of the sensing device 320 in the extension direction a is greater than or equal to 50 mm and less than or equal to 250 mm. In some examples, the length L5 of the sensing device 320 in the extension direction a is greater than or equal to 60 mm and less than or equal to 250 mm. In some examples, the length L5 of the sensing device 320 in the extension direction a is greater than or equal to 70 mm, 80 mm, 90 mm, 100 mm, 110 mm, 120 mm, 130 mm, or 140 mm.

The display device 330 has a first mode and a second mode. The display device 330 switches between the first mode and the second mode according to the number of fasteners 10 sensed by the sensing device 320. In the first mode, the light-emitting portion 311 emits light. In the second mode, the light-emitting portion 311 is off. The light-emitting portion 311 includes multiple lamp beads 312. The multiple lamp beads 312 are arranged along the extension direction a. The multiple lamp beads 312 are arranged along the extension direction of the magazine 340, which are compact and attractive in structure. In some examples, in the first mode, the light-emitting portion 311 emits green light. In the second mode, the light-emitting portion 311 emits red light. In some examples, in the first mode, the display device 330 displays a first number. In the second mode, the display device 330 displays a second number.

The fastener driver 300 includes a controller 221. The sensing device 320 includes a transmitting portion 321 and a receiving portion 322. The transmitting portion 321 is configured to transmit a signal. The receiving portion 322 is configured to receive the signal transmitted by the transmitting portion 321. When the receiving portion 322 receives the signal, the controller 221 controls the display device 330 to display corresponding visual information. The fasteners 10 are disposed between the transmitting portion 321 and the receiving portion 322. The fasteners 10 may block the transmission of signals between the transmitting portion 321 and the receiving portion 322. When the transmission of signals between the transmitting portion 321 and the receiving portion 322 is blocked by the fasteners 10, the receiving portion 322 cannot receive the signal transmitted by the transmitting portion 321.

The display device 330 is disposed on the magazine 340. The sensing device 320 is disposed on the magazine 340. Both the display device 330 and the sensing device 320 are disposed on the magazine 340. Thus, a compact structure is formed, and it is convenient for the sensing device 320 to sense the number of the fasteners 10 and for the display device 330 to display the visual information. The display device 330 and at least part of the sensing device 320 are located on two sides of the fasteners 10, respectively. In this example, the display device 330 and at least part of the sensing device 320 are located on the left and right sides of the fasteners 10, respectively. The display device 330 and the transmitting portion 321 are located on the left and right sides of the fasteners 10, respectively. In some examples, the display device 330 and at least part of the sensing device 320 may be located on the upper and lower sides of the fasteners 10 or the front and rear sides of the fasteners 10, respectively.

In this example, the receiving portion 322 and the display device 330 are disposed on the same side of the magazine 340. The fasteners 10 are disposed between the whole formed by the receiving portion 322 and the display device 330 and the transmitting portion 321. The fasteners 10 are on the transmission path of the signal transmitted by the transmitting portion 321. The signal transmitted by the transmitting portion 321 is an optical signal such as infrared light. In some examples, the signal transmitted by the transmitting portion 321 may be a magnetic signal or an electrical signal. When the fasteners 10 in the magazine 340 fill the magazine 340, the fasteners 10 are located on the transmission path of the signal transmitted by the transmitting portion 321, and the fasteners 10 prevent the transmission of all signals of the transmitting portion 321 along the extension direction a. When the display device 330 is in the first mode, the light-emitting portion 311 emits light. All light-emitting portions 311 along the extension direction a emit light, and the user learns that the number of the fasteners 10 is sufficient and it is unnecessary to add the fasteners 10. When the fasteners 10 in the magazine 340 are gradually consumed, the fasteners 10 move upward. As the fasteners 10 move upward, the accommodation position corresponding to the fastener 10 at the lower portion of the magazine 340 is vacated, the signal transmission path originally obstructed by the fasteners 10 is unobstructed, and part of the receiving portion 322 at the lower portion of the magazine 340 receives the signal transmitted by the transmitting portion 321. The controller 221 controls the lamp bead 312 corresponding to the position vacated by the fastener 10 to be off, and the display device 330 switches to the second mode. Along the extension direction a, as more and more lamp beads 312 start to be off from the lower portion of the magazine 340, the user learns that the number of fasteners 10 gradually decreases and the fasteners 10 may be added. The number of fasteners 10 is sensed by the sensing device 320 and the information about the number of fasteners 10 is displayed to the user by the display device 330 so that the user can easily learn the number of fasteners 10 in various use environments, thereby making the use convenient.

Figure 38:
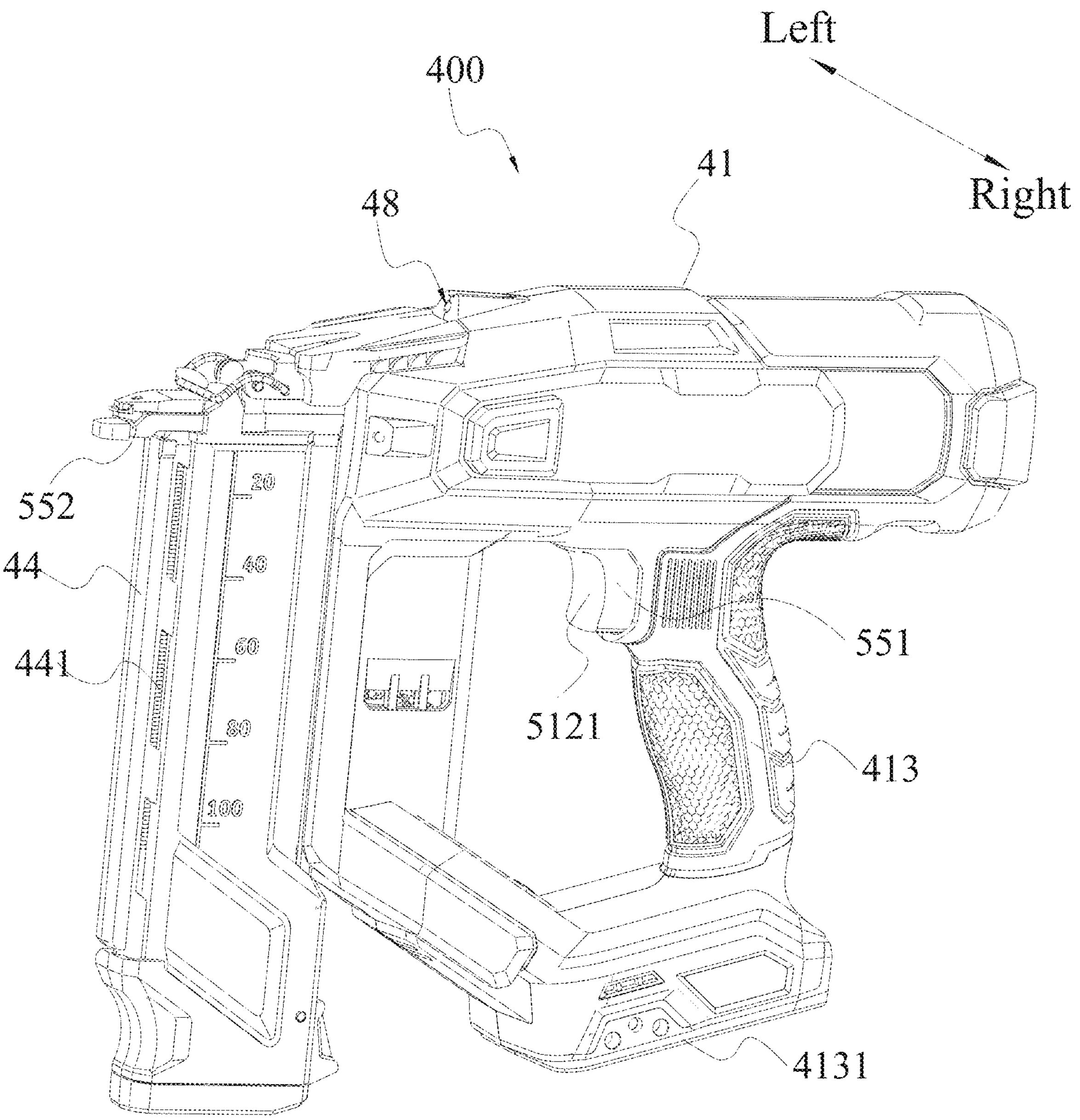
FIG. 38 is a perspective view of a nail gun according to an example of the present application from one angle of view.
Figure 39:
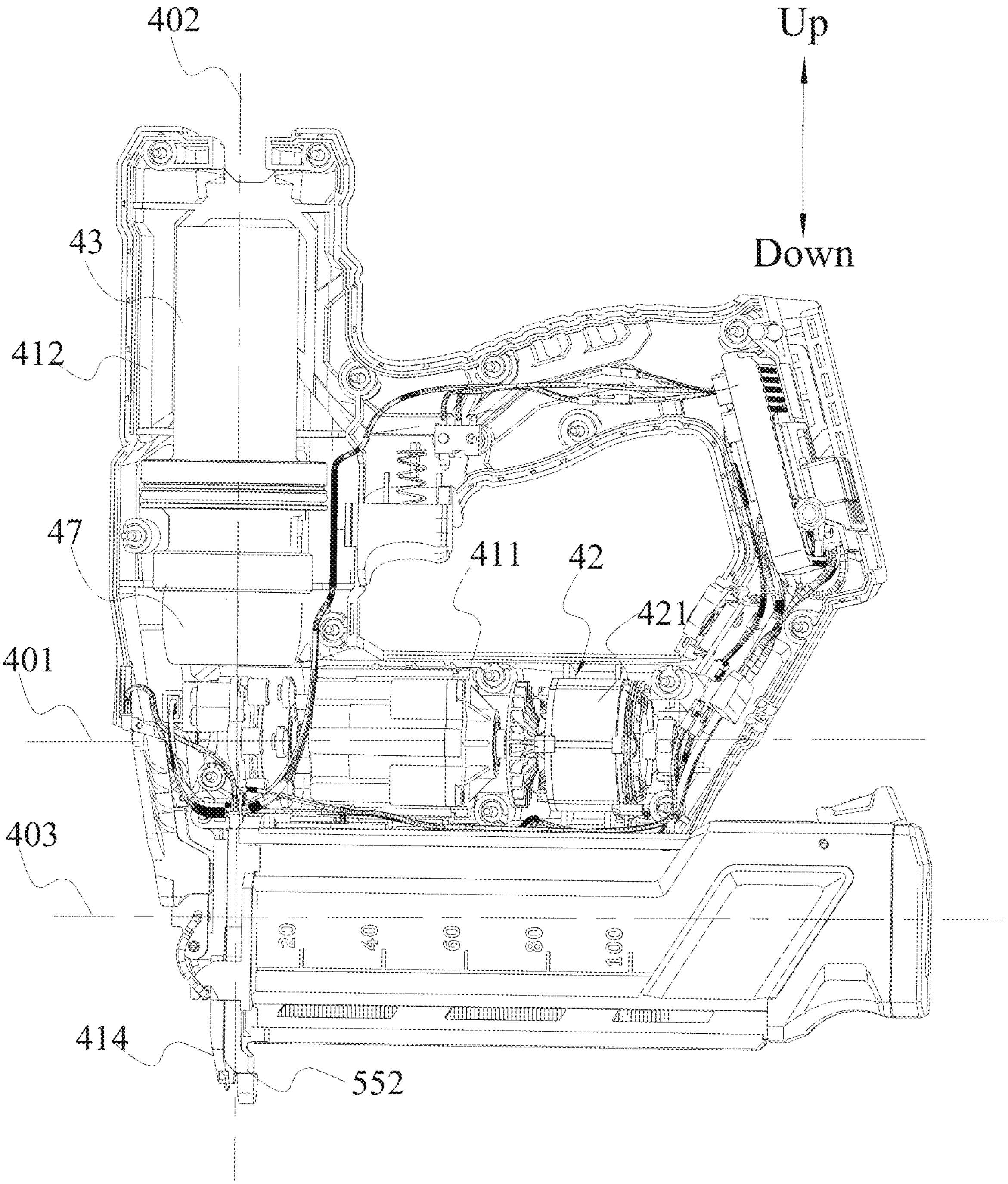
FIG. 39 is a sectional view of the nail gun in FIG. 38.

In an example, as shown in FIGS. 38 and 39, a nail gun 400 includes a housing 41, a power output portion 42, a cylinder 43, and a magazine assembly 44. The housing 41 includes a first accommodation space 411 extending along the direction of a first straight line 401 and a second accommodation space 412 extending along the direction of a second straight line 402. In an example, the power output portion 42 may be partially disposed in the first accommodation space 411 or partially disposed in the second accommodation space 412. In an example, the power output portion 42 may include an electric motor 421 or an energy storage device. The energy storage device may be understood as one that releases stored kinetic energy during the first half of a nailing cycle to achieve nailing and stores energy during the second half of the nailing cycle to prepare for the next nailing. The energy storage device may be a cylinder capable of pre-storing gas, a cylinder capable of inflation and deflation in an operating process, or an elastic element such as a spring. In this example, the cylinder 43 serves as the energy storage device and is disposed in the second accommodation space 412.

The housing 41 is further formed with a handle portion 413 for the user to hold. A power interface 4131 is provided at an end of the handle portion 413 and configured to connect a direct current or alternating current power supply. In this example, the power interface 4131 is configured to connect a battery pack 115. A main unit switch **413*a* is disposed on the handle portion 413. The user controls the start and stop of the nail gun 400 through the main unit switch 413*a***.

The other end of the handle portion 413 is connected to the cylinder 43, and the cylinder 43 extends along the direction of the second straight line 402, where the first straight line 401 and the second straight line 402 are perpendicular to each other. The magazine assembly 44 is disposed along the direction of a third straight line 403 parallel to the first straight line 401. As an optional example, the magazine assembly 44 is provided with a window 441 for the user to view the remaining nails. The window 441 is configured to be one or more gaps on the magazine assembly 44. In one aspect, the window 141 may be used for the user to check the number of remaining nails. In the other aspect, the window 141 may be used for the user to perform simple maintenance on the magazine assembly 44 without detaching the magazine assembly 44.

A firing assembly 46 is disposed in the cylinder 43, and gas in the cylinder 43 does work to push the firing assembly 46 to move, thereby driving out a nail. The nail gun 400 further includes a striking portion 47. The striking portion 47 is at least partially disposed in the cylinder 43 and may be, for example, a piston disposed in the cylinder 43 and connected to the firing assembly 46. The striking portion 47 may be connected to the firing assembly 46 and can strike the firing assembly 46 so that the firing assembly 46 moves within the cylinder 43. In an example, the cylinder 43 further includes an inflation nozzle configured to pre-fill gas into the cylinder 43. The pre-filled gas in a compressed state stores a relatively large amount of kinetic energy and can push the striking portion 47 to quickly strike the firing assembly 46 so that the firing assembly 46 drives out the nail. Alternatively, the cylinder 43 may include an air intake nozzle and an air exhaust nozzle so that the cylinder 43 does not need to be pre-filled with gas and may be inflated in an operating process of the nail gun 400.

Figure 40:
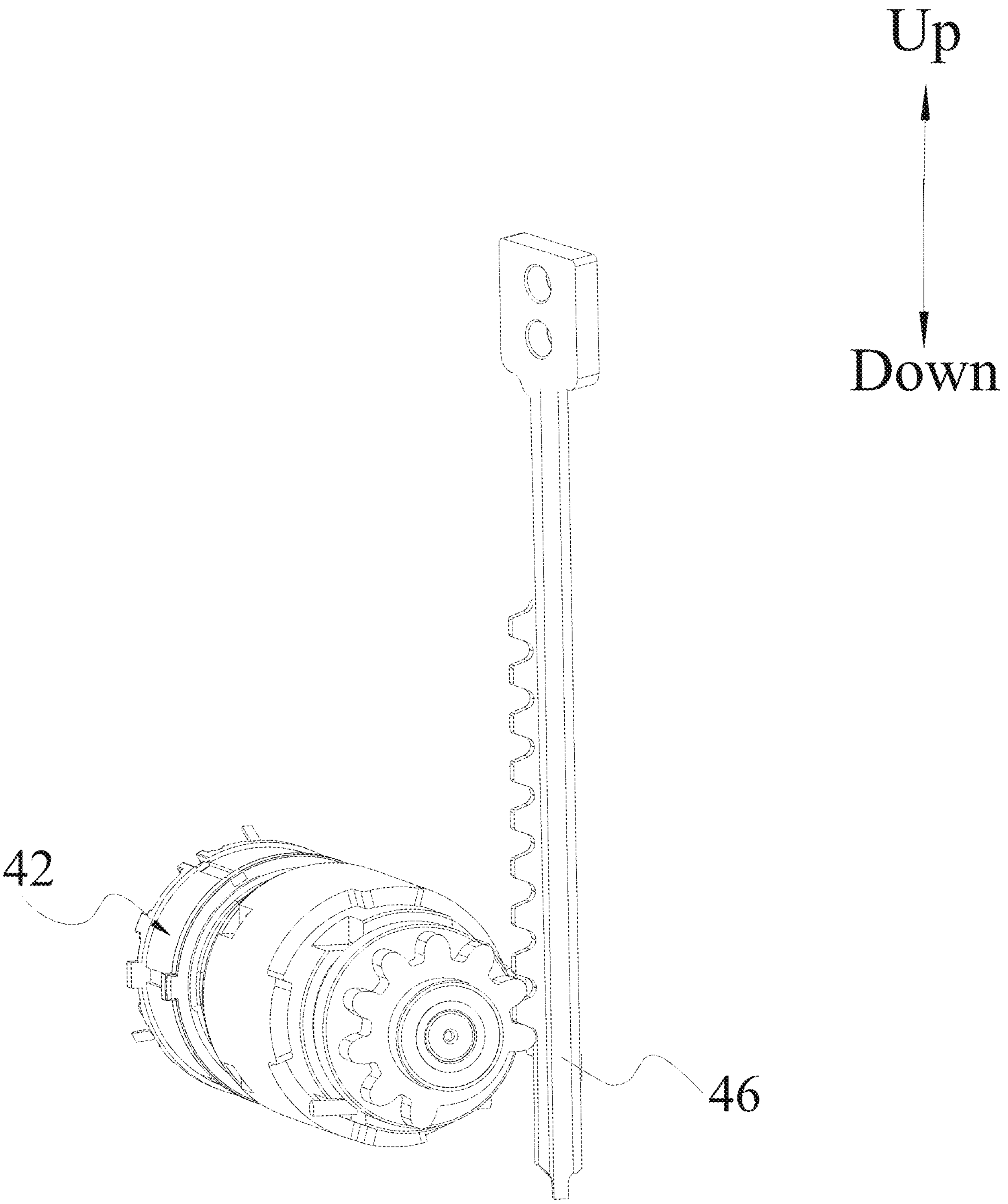
FIG. 40 is a schematic view of internal structures of the nail gun in FIG. 38 at an initial position.

The cylinder 43 that can be pre-filled with gas is used as an example here. After the nail gun 400 shuts down, the electric motor 421 stops outputting power and can make the firing assembly 46 stop at an initial position. The pre-filled gas in the cylinder 43 is in the compressed state. After the nail gun 400 is energized and the electric motor is started, the electric motor 421 outputs power, the firing assembly 46 is released, and the striking portion 47 can convert the kinetic energy of the cylinder 43 into a striking force for striking the firing assembly 46 so that the firing assembly 46 obtains instantaneously a relatively large acceleration, moves to a firing position shown in FIG. 41, and drives out the nail. After the nail is driven out, the firing assembly 46 is driven by the electric motor 421 to return from the firing position shown in FIG. 41 to the initial position shown in FIG. 40 and shuts down, during which the firing assembly 46 can continuously drive the striking portion 47 to compress the gas in the cylinder 43. A process from the startup of the nail gun to the return of the firing assembly 46 to the initial position or the proximity of the initial position, that is, a shutdown position after nailing is referred to as a nailing cycle. It is to be noted that the initial position shown in FIG. 40 is a position at which the firing assembly 46 stops after the nail gun 400 shuts down and may also be referred to as the shutdown position. A position to which the firing assembly 46 can move upward farthest may be referred to as a top dead center, and a position to which the firing assembly 46 can move downward farthest is referred to as a bottom dead center. The firing position and the bottom dead center may be the same position, while the initial position approaches the top dead center from bottom to top but is not the top dead center, that is to say, the distance between the initial position and the top dead center is greater than 0.

As shown in FIG. 39, the electric motor 421 extends substantially along the direction of the first straight line 401, and the cylinder 43 and the firing assembly 46 disposed in the cylinder 43 extend substantially along the direction of the second straight line 402. The electric motor 421 and the cylinder 43 are substantially perpendicular to each other. The electric motor 421 may serve as a power source to drive the firing assembly 46 to move within the cylinder 43. In an optional implementation, the electric motor 421 may be part of the electric motor 421. The electric motor 421 can output power to a driving shaft (not shown), and a driving wheel 425 is disposed on the driving shaft (not shown). The firing assembly 46 includes at least a striker 461. In an example, the firing assembly 46 may further include the striking portion 47, where the striking portion 47 may be a piston connected to the top of the striker 461. The piston is fixedly or detachably connected to the striker 461. The striking portion 47 can compress the pre-filled gas in the cylinder 43 in the process where the striker 461 is driven to move upward, that is, toward the initial position. The striker 461 is formed with transmission teeth 461*a*, and the striker 461 can move along the direction of the second straight line 402 within the cylinder 43, where the second straight line 402 may be understood as a nailing direction. The driving wheel 425 can mate with the transmission teeth 461*a* to drive the firing assembly 46 to do work against pressure in the cylinder 43 so that the firing assembly 46 can move to the initial position shown in FIG. 40.

Figure 41:
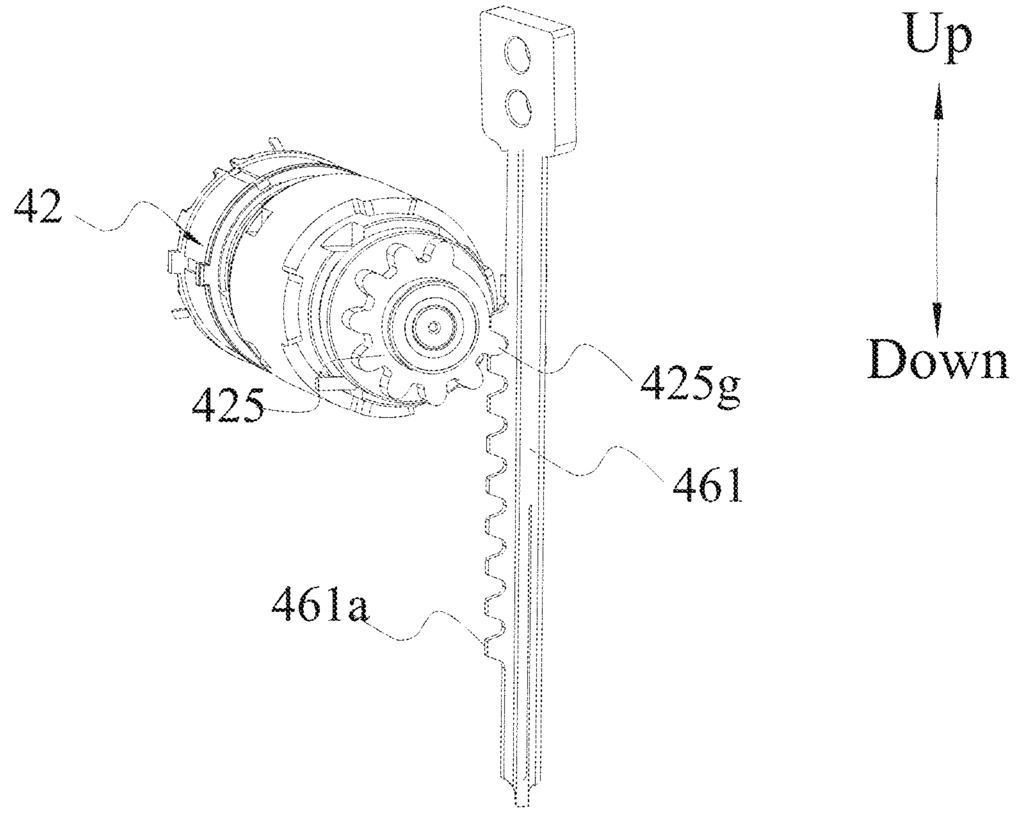
FIG. 41 is a schematic view of internal structures of the nail gun in FIG. 38 at a firing position.
Figure 42:
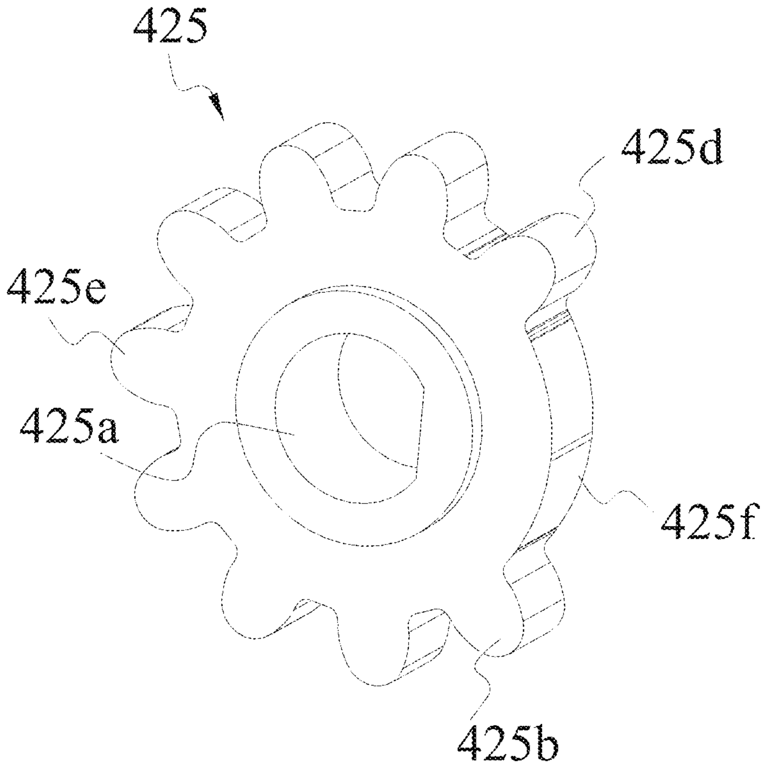
FIG. 42 is a perspective view of a driving wheel of the nail gun in FIG. 38.

As shown in FIGS. 41 and 42, the driving wheel 425 is a gear structure. The driving wheel 425 is formed with a second connection hole 425*a* for the driving shaft (not shown) to be connected to. The second connection hole 425*a* is specifically a flat hole. When the driving shaft (not shown) is connected to the second connection hole 425*a*, the driving wheel 425 can rotate synchronously with the driving shaft (not shown). Multiple driving teeth 425*g* are formed around a body portion of the driving wheel 425, and the driving teeth 425*g* include a first tooth 425*b* at a starting end and a second tooth 425*d* at a tail end. Here, a driving tooth 425*g* that is first in contact with the striker 461 of the firing assembly 46 when the driving wheel 425 starts driving the firing assembly 46 to reset to the initial position shown in FIG. 40 is defined as the first tooth 425*b*, and a driving tooth 425*g* that last meshes with the striker 461 of the firing assembly 46 when the firing assembly 46 is already at the initial position is defined as the second tooth 425*d*. A first section 425*e* and a second section 425*f* are included between the first tooth 425*b* and the second tooth 425*d*. The multiple driving teeth 425*g* are evenly distributed on the first section 425*e*; and the second section 425*f* is smooth and continuous without any driving tooth 425*g*. When the driving teeth 425*g* on the first section 425*e* mesh with the transmission teeth 461*a* on the striker 461, the driving wheel 425 can drive the striker 461 to compress the gas in the cylinder 43 and do work. When the second section 425*f* mates with the striker 461, since the second section 425*f* is smooth and continuous, the striker 461 is not stopped by the driving teeth 425*g* and is rapidly pushed out by the gas in the cylinder 43, achieving the nailing effect.

In other examples, the driving wheel 425 may be another form of driving component, and the structures and forms of other possible driving wheels 425 are not specifically limited in the present application.

Figure 43:
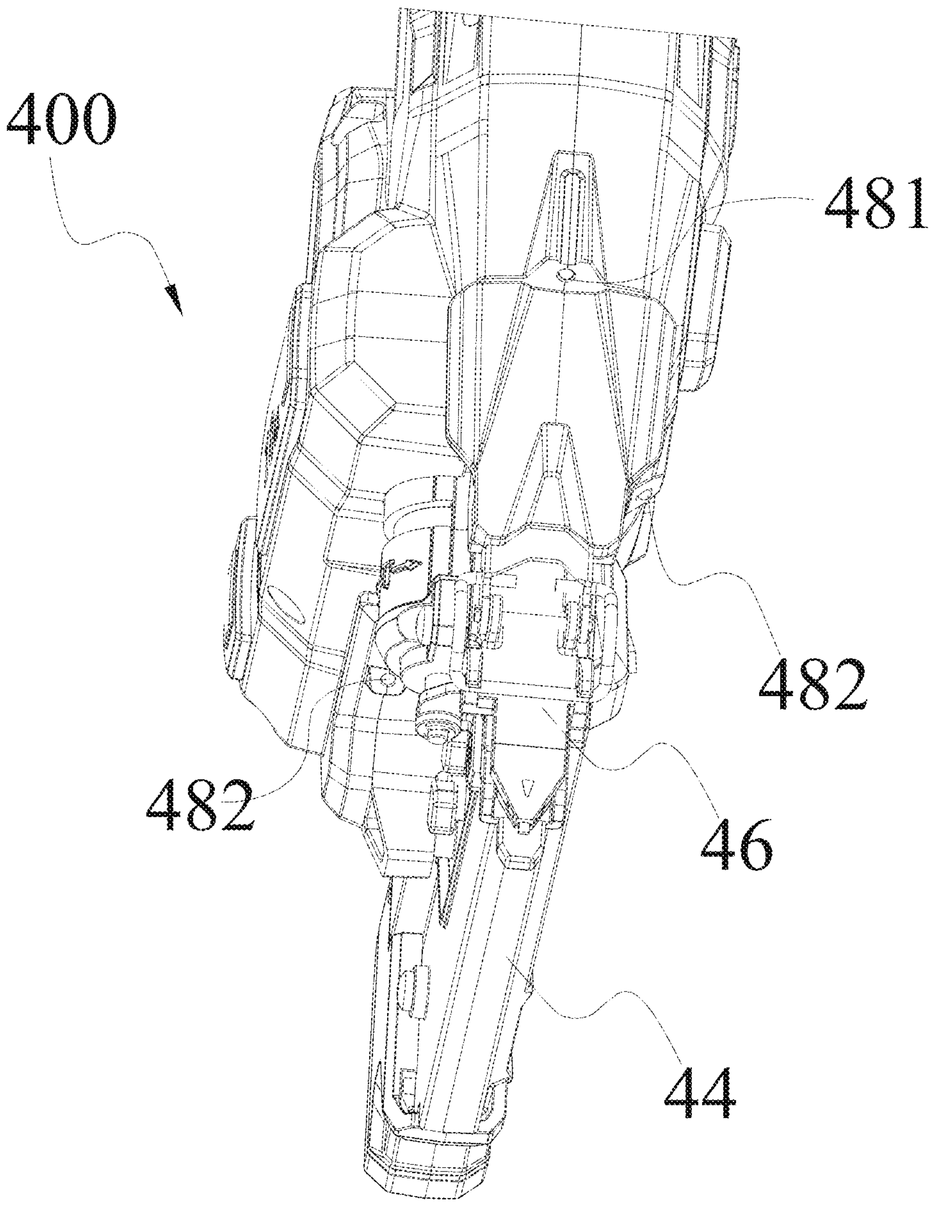
FIG. 43 is a perspective view of a nail gun from another angle of view.

In this example, the nail gun 400 is provided with a light-emitting device 48. The light-emitting device 48 may be one or more LED lamp beads arranged at different positions, a light strip, a Nixie tube, or a display screen. As shown in FIG. 43, the light-emitting device 48 includes three LED lamps disposed on the housing 41. One light-emitting device 481 is disposed directly above a horizontal plane where the striker 461 is located, and the other two light-emitting devices 482 can collaborate with the light-emitting device 481 to project a V-shaped, arrow-shaped, or triangular light spot on a workpiece to be nailed, where the light spot can indicate a nailing position on the workpiece. In an implementation, the other two light-emitting devices 482 are disposed on the left and right sides of the front end of the housing 41 of the nail gun 400.

The light-emitting device may be the light-emitting device 270. That is to say, the user may operate the light-emitting device 270 to move at least part of the light-emitting device 270 so that the light-emitting device 270 can illuminate and indicate a larger range. The light-emitting device may be the light-emitting portion 311. That is to say, the light-emitting device may have a certain extended length, or the light-emitting device may be disposed on the magazine assembly 44. The light-emitting device may be a combination of part or more of the light-emitting device 48, the light-emitting device 270, and the light-emitting portion 311. In this example, the light-emitting device 48 is used as an example, but the following control manner and control circuit are applicable to the light-emitting device 270 and the light-emitting portion 311 or may be used in a fastener driver provided with the light-emitting device 270 and the light-emitting portion 311.

Figure 44:
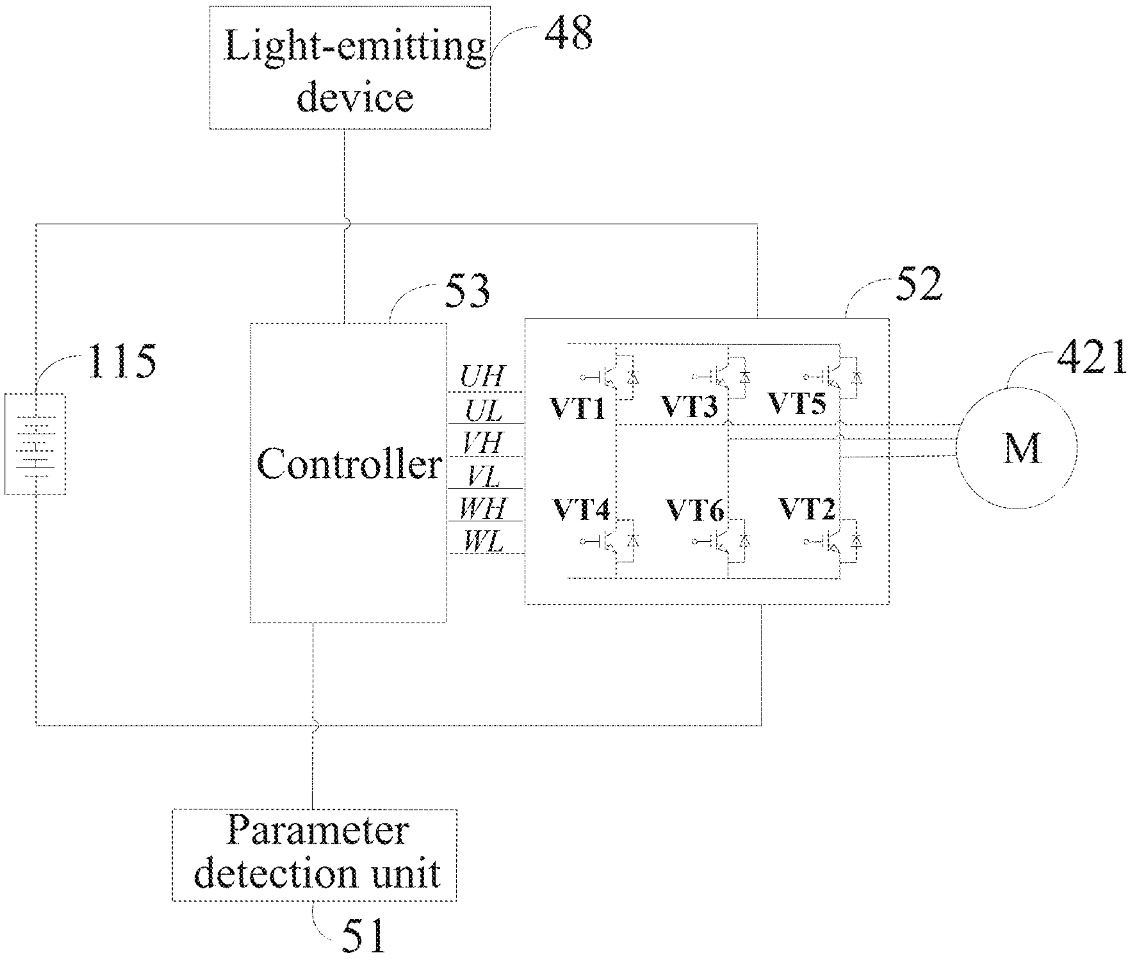
FIG. 44 is a circuit schematic of a nail gun according to an example.

As shown in FIG. 44, a control circuit may include at least a parameter detection unit 51, a driver circuit 52, a controller 53, the light-emitting device 48, and the electric motor 421. As a power supply for the control circuit, the battery pack 115 can not only provide electrical energy for driving the electric motor 421 but also provide electrical energy at a low voltage for the controller 53 after conversion by a power conversion unit, provide electrical energy for the parameter detection unit 51, or provide electrical energy for the light-emitting device 48. This example illustrates only a power supply path for the battery pack 115 to provide electrical energy for the electric motor 421 and omits a detailed description of other possible power supply paths.

In an example, the driver circuit 52 at least controls the energization of the electric motor 421, and the controller 53 at least controls the running of the electric motor 421. The driver circuit 52 is connected between the controller 53 and the electric motor 421. The driver circuit 52 may receive control signals outputted from the controller 53 and change its own conduction state, so as to control a running state of the electric motor 421, including, for example, shutdown, rotation, a rotational speed, or a direction of rotation. Optionally, the driver circuit 52 may consist of one or more power elements. In an example, as shown in FIG. 44, the driver circuit 52 includes multiple power elements VT1, VT2, VT3, VT4, VT5, and VT6. The gate terminal of each of the power elements is electrically connected to the controller 53 and configured to receive control a signal from the controller 53. The drain or source of each of the power elements is connected to a stator winding of the electric motor 421. The power elements VT1 to VT6 receive the control signals from the controller 53 to change their respective conduction states, thereby changing the current loaded to stator windings of the electric motor 421 by the battery pack. In an example, the driver circuit 52 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding power elements may be any other types of solid-state switches, such as IGBTs or BJTs.

To make the electric motor 421 rotate, the driver circuit 52 has multiple driving states. In one driving state, the stator windings of the electric motor generate a magnetic field, and the controller 53 outputs corresponding pulse-width modulation (PWM) control signals to switching elements in the driver circuit according to a rotor position or a back electromotive force of the electric motor so that the driving state of the driver circuit is switched and thus the stator windings generate a changing magnetic field to drive a rotor to rotate, thereby achieving the rotation or commutation of the electric motor. It is to be noted that any other circuits and control manners that can drive the rotation or commutation of the electric motor can be applied to the present disclosure and the circuit structure of the driver circuit 52 and the control of the driver circuit 52 by the controller 53 are not limited in the present disclosure.

The parameter detection unit 51 can detect at least an operating parameter of the electric motor 421 or an electrical parameter of the battery pack 115. In an example, the parameter detection unit 51 may detect an output current, an output voltage, or output power of the electric motor 421, an operating time of the electric motor 421 within the nailing cycle (that is, a time of the nailing cycle), a nailing frequency, the number of revolutions of the electric motor within the nailing cycle, or the like. In an example, the parameter detection unit 51 may also detect a battery parameter of the battery pack 115, such as an output voltage, a current, energy consumption, or power consumption of the battery pack within the nailing cycle. It is to be understood that the parameter detection unit 51 may include one or more detection devices that can detect various different operating parameters or battery parameters separately or simultaneously.

Figure 45:
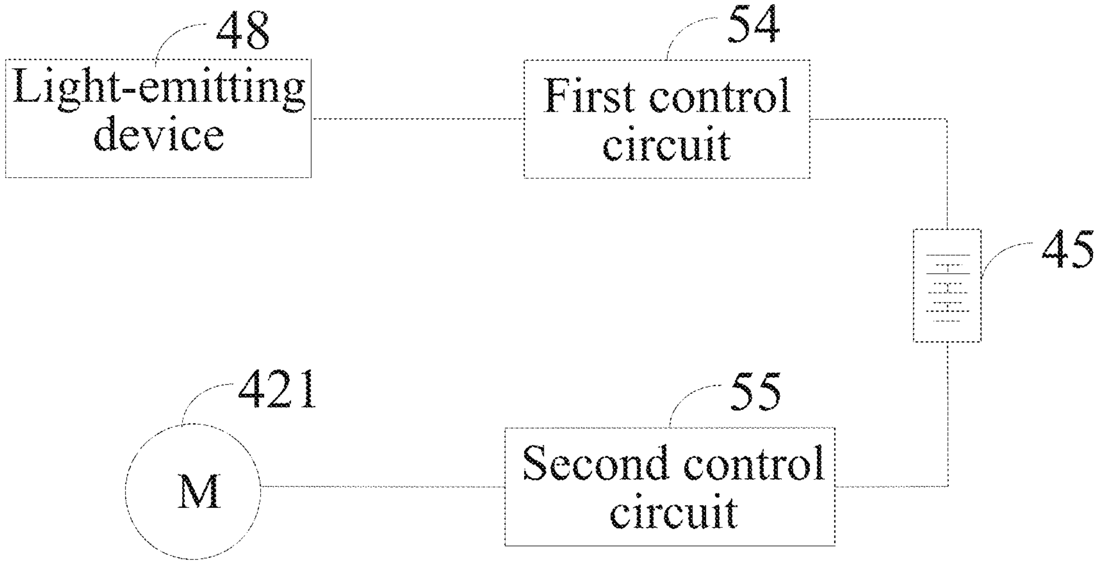
FIG. 45 is another circuit schematic of a nail gun according to an example.

Referring to a control circuit of the nail gun shown in FIG. 45, the control circuit includes some structures or parts that are the same as those in the control circuit in FIG. 44, and the circuit in FIG. 45 uses the same reference numerals as that in FIG. 44. The control circuit includes at least a first control circuit 54 capable of controlling the operation of the light-emitting device 48 and a second control circuit 55 for controlling the electric motor 421. When the electric motor 421 is not energized, the first control circuit 54 can at least independently control the light-emitting device 48 to be on. That is, in the case where the electric motor 421 is not energized or is energized but not started, the first control circuit 54 controls, in advance, the light-emitting device 48 to be on. When the light-emitting device 48 is turned on before nailing, the workpiece or the working environment can be illuminated in advance so that the user obtains better user experience. Even if the electric motor 421 fails to start, the illumination device 48 can operate.

In an example, the first control circuit 54 and the second control circuit 55 may be disposed on the same circuit board. In an example, the first control circuit 54 and the second control circuit 55 may be disposed on different circuit boards.

Figure 46:
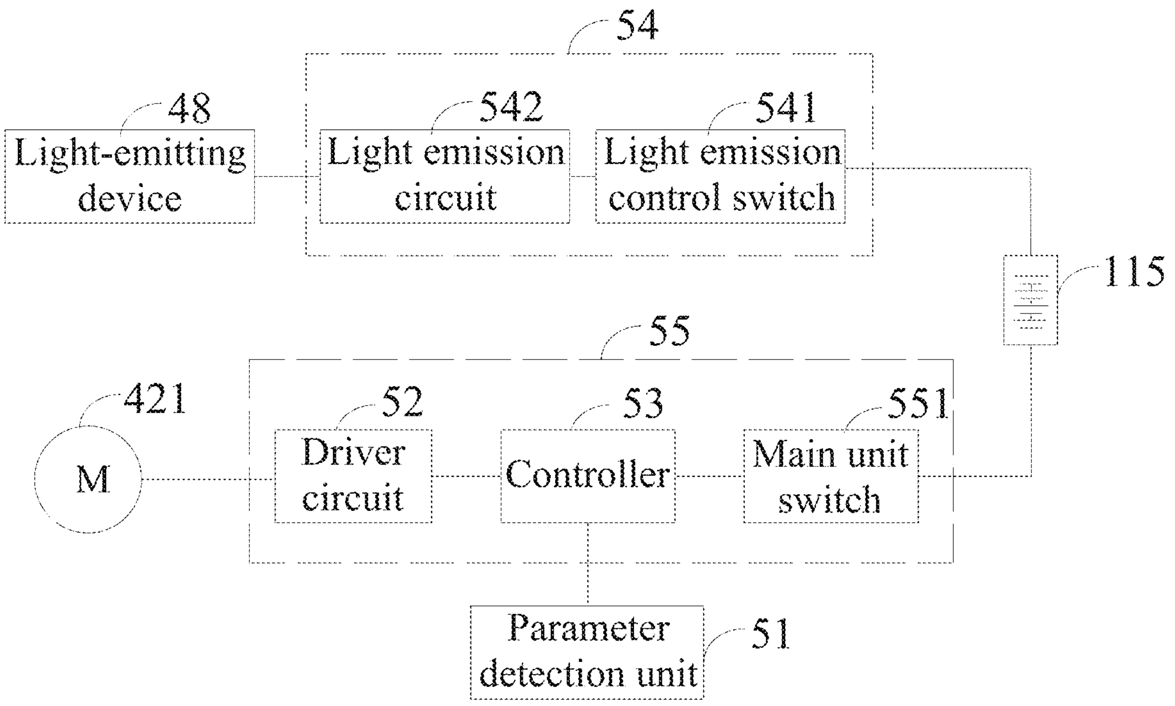
FIG. 46 is a third circuit schematic of a nail gun according to an example.

Referring to a control circuit of the nail gun shown in FIG. 46, the first control circuit 54 includes at least a light emission control switch 541 and a light emission circuit 542. After being operated by the user, the light emission control switch 541 can conduct a current path between the light emission circuit 542 and the battery pack 115 so that the light-emitting device 48 can be turned on. In this example, the light emission control switch 541 may be a button switch, a toggle switch, a membrane switch, a lever switch, a microswitch, a travel switch, or the like. The second control circuit 55 is substantially consistent with the control circuit in FIG. 44, is a circuit for controlling the operation or shutdown of the electric motor 421, and may also be referred to as a main control circuit of the nail gun 400. In this example, the second control circuit 55 may include a main unit switch 551, the driver circuit 52, and the controller 53. After being operated by the user, the main unit switch 551 can conduct a current path between the controller 53, the driver circuit 52, and the electric motor 421. After outputting the control signals, the controller 53 can control the operation of the electric motor 421. For implementations where the controller 53 controls the operation of the electric motor 421, reference may be made to the description of the control circuit shown in FIG. 44, and the details are not repeated here. It is to be noted that the main unit switch 551 may be a button switch, a toggle switch, a membrane switch, a lever switch, a microswitch, a travel switch, or the like.

In other examples, it may be considered that the light emission control switch 541 does not belong to the first control circuit 54 but is connected to the first control circuit 54. Alternatively, it is considered that the main unit switch 551 does not belong to the second control circuit 55 but is connected to the second control circuit 55. That is to say, the control circuit may be divided in other manners, which can be accepted as long as the corresponding functions can be implemented.

In an example, the nail gun 400 may include one travel switch (not shown). The travel switch functions as the light emission control switch 541 in response to a first switch travel and functions as the main unit switch 551 in response to a second switch travel. In an example, when the travel switch has the second switch travel, the controller 53 in the second control circuit 55 is conductive, but the electric motor 421 is not started. When the travel switch is operated to a third switch travel, the electric motor 421 is started. In an example, when the travel switch is operated to a fourth switch travel, the controller 53 may perform a particular control operation on the electric motor 421, for example, the controller 53 can control the electric motor 421 to run at a constant speed.

In an example, the light emission control switch 541 may be operated to control the light-emitting device 48 to be turned off. Alternatively, the controller 53 in the second control circuit 55 may control the light emission circuit 542 to be de-energized to turn off the light-emitting device 48. In an example, the controller 53 may control the light emission circuit 542 to be disconnected with a delay so that the light-emitting device 48 is turned off with a delay. It is to be understood that the function of the light emission circuit 542 may be implemented by different elements, and the specific circuit structure of the light emission circuit is not limited in the present application.

Still referring to FIG. 46, the controller 53 may control, according to the operating parameter of the electric motor 421 and/or the battery parameter of the battery pack 115 detected by the parameter detection unit 51, the light emission circuit 542 to change a circuit state so that the light-emitting device 48 can change a light emission form to issue an alarm prompt. The operating parameter of the electric motor 421 may be the output current, output voltage, or output power of the electric motor 421, the operating time of the electric motor 421 within the nailing cycle (that is, the time of the nailing cycle), the nailing frequency, the number of revolutions of the electric motor within the nailing cycle, the temperature of the electric motor, or the like. The battery parameter may be the output voltage, current, energy consumption, or power consumption of the battery pack 115 within the nailing cycle, the temperature of the battery pack 115, or the like. For example, when determining the locked-rotor of the electric motor according to the current of the electric motor 421, the controller 53 may control the electric motor 421 to stop rotating and control the light emission circuit 542 to change the circuit state so that the light-emitting device 48 flashes and/or emits red light as an alarm prompt. In this example, the controller 53 may control the light-emitting device 48 to issue the alarm prompt in at least one form of the number of light-emitting devices, an emitted color, a light emission frequency, the number of flashes, a brightness level, or the content displayed through light emission. The controller 53 may also set an alarm according to a fault type or a fault level.

Figure 47:
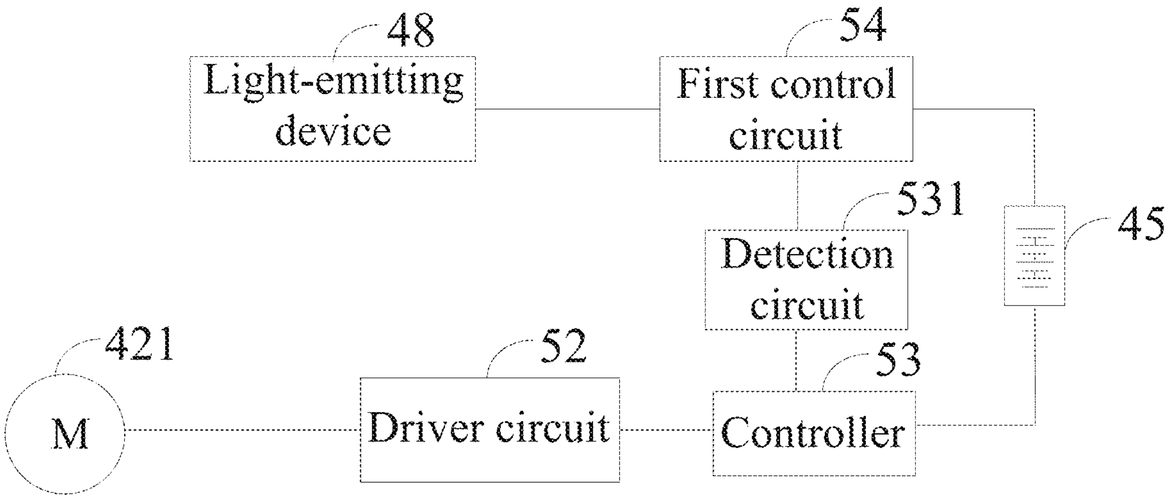
FIG. 47 is a fourth circuit schematic of a nail gun according to an example.
Figure 48:
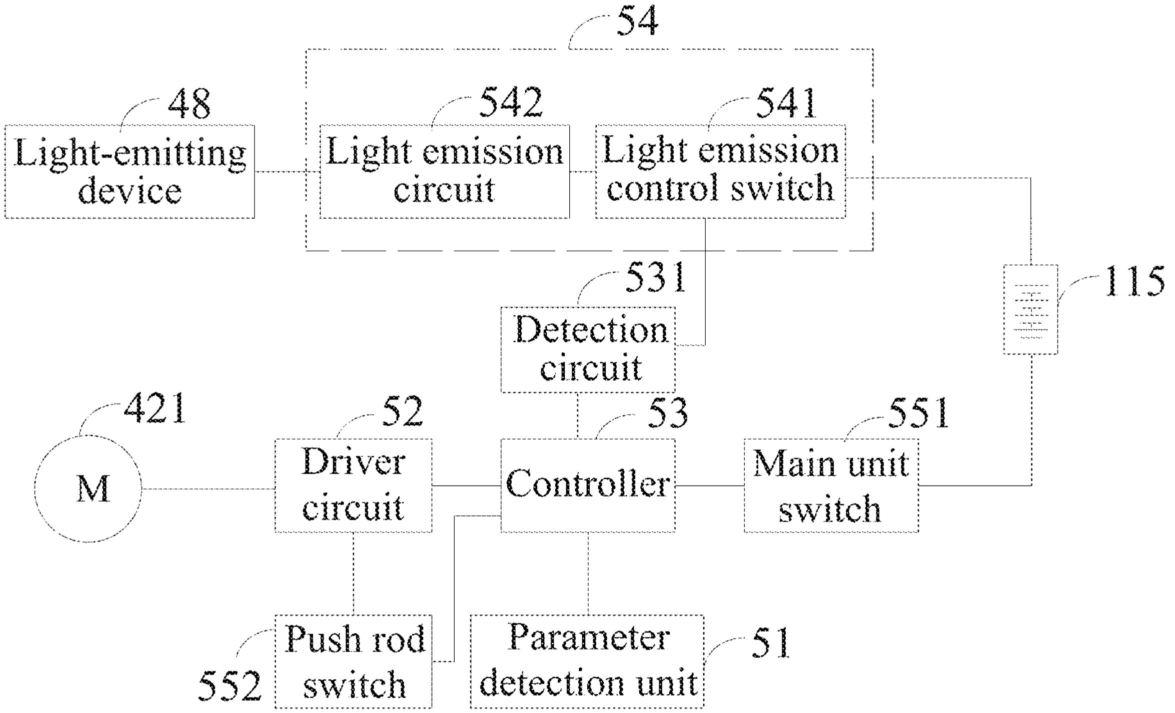

Referring to other control circuits of the nail gun shown in FIGS. 47 and 48, the control circuits include some structures or parts that are the same as those in the control circuits in FIGS. 44 and 46, and the circuits in FIGS. 47 and 48 uses the same reference numerals as those in FIGS. 44 and 46. The difference between these control circuits and the control circuits in FIGS. 45 and 46 is that the start state of the electric motor is also affected by the light emission control switch 541.

In the related art, as a nailing tool, a nail gun may include a mechanical nail gun or a cylinder-based nail gun. The cylinder-based nail gun drives nails by compressing the volume of gas within a cylinder and using the pressure difference of the gas while the mechanical nail gun drives nails by doing work through the compression of an elastic member such as a spring. Generally, nail guns are provided with LED lamps for illumination or marking a nailing position and may also be provided with display screens capable of intelligently displaying information such as the electric quantity of a battery pack or a nailing mode.

In this example, when the electric motor 421 is not energized, the first control circuit 54 can at least independently control the light-emitting device 48 to be on. That is, in the case where the electric motor 421 is not energized, the first control circuit 54 controls, in advance, the light-emitting device 48 to be on. When the electric motor 421 is not started, the first control circuit 54 can at least independently control the light-emitting device 48 to be on. That is, in the case where the electric motor 421 is energized but not started, the first control circuit 54 controls, in advance, the light-emitting device 48 to be on. When the light-emitting device 48 is turned on before nailing, the workpiece or the working environment can be illuminated in advance so that the user obtains better user experience. Even if the electric motor 421 fails to start, the illumination device 48 can operate. The first control circuit 54 includes at least the light emission control switch 541 and the light emission circuit 542. After being operated by the user, the light emission control switch 541 can conduct the current path between the light emission circuit 542 and the battery pack 115 so that the light-emitting device 48 can be turned on. In this example, the light emission control switch 541 may be a button switch, a toggle switch, a membrane switch, a lever switch, a microswitch, a travel switch, or the like.

Still referring to FIGS. 38 and 39, the nail gun 400 includes a push rod switch 552 in addition to the main unit switch 551. The push rod switch 552 may serve as a safety switch and is disposed at the lower end of the firing assembly 46. In addition, when the user pushes the nail gun 400 downward along the nailing direction, that is, the direction of the second straight line 402, the push rod switch 552 can be pressed against the workpiece. Thus, the push rod switch 552 is turned on, that is, the push rod switch 552 is triggered. In this example, the nail gun 400 is further provided with a guide assembly 414. The guide assembly 414 may be formed by the housing 41 or disposed on the housing 41 and can partially or fully cover the firing assembly 46 and at least guide the firing assembly 46 to perform nailing in the nailing direction. It is to be understood that the lower end of the guide assembly 414 may be an exit of the nail. A height difference exists between the lower end of the push rod switch 552 and the lower end of the guide assembly 414. When the push rod switch 552 is just in contact with the workpiece, the distance between the lower end of the guide assembly 414 and the workpiece is the height difference.

The driver circuit 52 at least controls the energization of the electric motor 421. The controller 53 controls the running of the electric motor 421. In this example, the main unit switch 551 at least causes the controller 53 to be energized, which may be understood as follows: when the main unit switch 551 is triggered, a current path between the battery pack 115 and the controller 53 is conductive. The driver circuit 52 is connected between the controller 53 and the electric motor 421. The main unit switch 551 and the push rod switch 552 collectively control the energization of the driver circuit 52. When the main unit switch 551 and the push rod switch 552 are triggered and maintained in the triggered state separately, the driver circuit 52 is energized, and the electric motor 421 is energized. That is, when both the main unit switch 551 and the push rod switch 552 are in the triggered state, a current path between the battery pack 115 and the driver circuit 52 is conductive, a current path between the battery pack 115 and the electric motor 421 is conductive, and the electric motor is energized but not started.

The controller 53 is configured to control the electric motor 421 to start when determining that the electric motor is energized and the light emission control switch 541 is triggered. That is, after the driver circuit 52 is energized and the light emission control switch 541 is triggered, the controller 53 sends a start signal to the electric motor. Upon being energized and receiving the start signal, the electric motor 421 starts and runs in response to a parameter of the start signal. After receiving the control signal that the driver circuit 52 is energized and the signal that the light emission control switch 541 is triggered, the controller 53 outputs the start signal to the electric motor 421.

In this example, the controller 53 controls the electric motor 421 to start when determining that the light emission control switch 541, the main unit switch 551, and the push rod switch 552 are all triggered and remain in the triggered state. When receiving the signal that the light emission control switch 541, the main unit switch 551, and the push rod switch 552 are all triggered, the controller 53 outputs the start signal to the electric motor. In this example, the first control circuit 54 controls the light-emitting device individually. In this example, a detection circuit 531 is provided and connected between the first control circuit 54 and the controller 53. After receiving the signal that the first control circuit 54 is turned on, the detection circuit 531 outputs a corresponding response signal to the controller 53. Optionally, the detection circuit 531 is configured to detect whether the light emission control switch 541 is triggered and send the corresponding response signal to the controller 53. The controller 53 is connected to the driver circuit 52 and the detection circuit 531. After receiving the signal that the driver circuit 52 is energized and the response signal from the detection circuit 531, the controller 53 outputs the start signal to the electric motor 421. The circuit that can independently control the light-emitting device is provided so that the light-emitting device can be turned on in advance before the electric motor starts. During the start of the electric motor, the light-emitting device is controlled, in conjunction, to be on or off. Thus, the light-emitting device is on, which is used as a necessary condition for the start of the electric motor, thereby improving the safety with which the nail gun is started.

In some examples, the detection circuit 531 is an independent circuit or control chip configured to detect the triggered state of the light emission control switch 541. In some examples, the detection circuit 531 is a detection module in the controller 53 and is configured to collect the signal or current of the light emission control switch 541.

In some examples, the sequence in which the main unit switch 551 and the push rod switch 552 are turned on does not affect the energization of the driver circuit 52. In some examples, when the main unit switch 551 and the push rod switch 552 are turned on in a specified sequence, the driver circuit 52 is energized.

Figure 49:
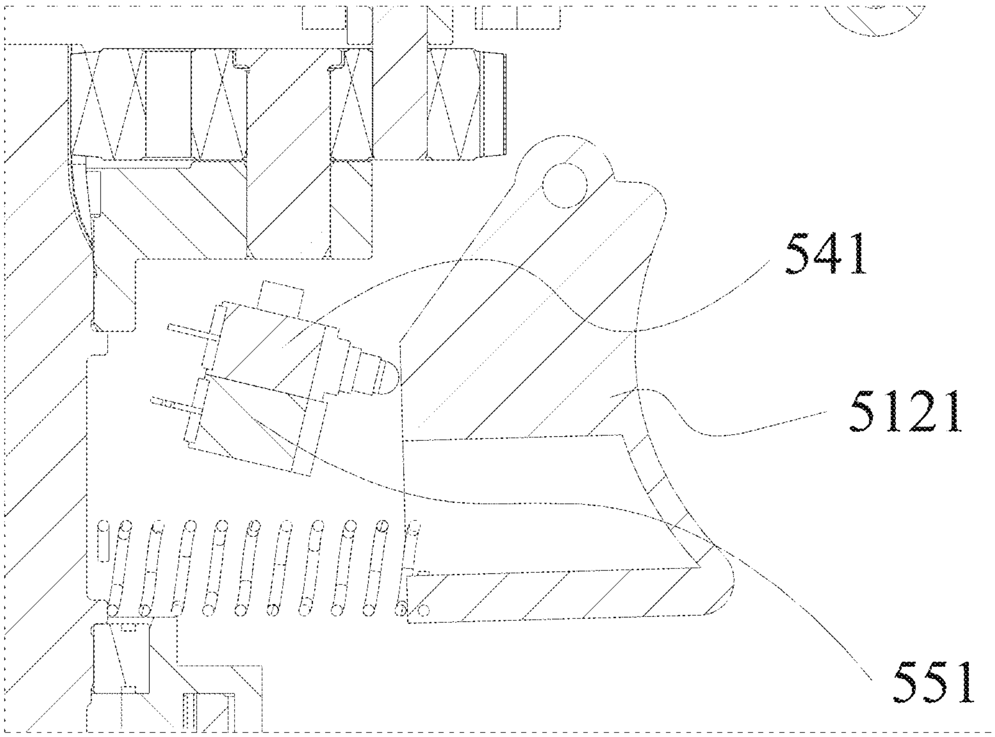
FIG. 49 is a sectional view of structures of a nail gun according to an example.

In this example, as shown in FIG. 49, the light emission control switch 541 is also disposed in a grip and is adjacent to the main unit switch 551. A trigger 5121 is disposed on the grip and is movably coupled to the grip 413 so that the trigger 5121 moves relative to the housing of the grip 413. The light emission control switch 541 and the main unit switch 551 are located on the rear side of the trigger 5121, and the light emission control switch 541 is also configured to be activated by the trigger 5121. The light emission control switch 541 is further configured to be activated by the trigger 5121 prior to the main unit switch 551. Thus, the light-emitting device 48 can be turned on before the electric motor 421 starts, thereby facilitating the illumination of a working region.

Exemplarily, in the front and rear direction, the main unit switch 551 is located farther from the trigger 5121 than the light emission control switch 541. Thus, during the rotation or movement of the trigger 5121, the trigger 5121 is first in contact with the light emission control switch 541 to turn on an illumination element 196 and is then in contact with the main unit switch 551 to start the fastener driver 100.

In some cases, the user may operate the trigger 5121 to rotate or move by only a small angle or distance and maintain the position of the trigger 5121. Thus, the trigger 5121 may only trigger the light emission control switch 541 without triggering the main unit switch 551, thereby only turning on the illumination element 196 to illuminate the working region.

In some examples, the sequence in which the light emission control switch 541, the main unit switch 551, and the push rod switch 552 are turned on does not affect the start of the electric motor 421. In some examples, when the light emission control switch 541, the main unit switch 551, and the push rod switch 552 are turned on in a specified sequence, the controller 53 controls the electric motor 421 to start. For example, when the user sequentially triggers the light emission control switch 541, the main unit switch 551, and the push rod switch 552, the controller controls the electric motor 421 to start. For example, the user triggers the main unit switch 551 and the push rod switch 552 to energize the driver circuit 52 and then triggers the light emission control switch 541. After detecting that the driver circuit 52 is energized and detecting that all the three switches are in the triggered state, the controller controls the electric motor 421 to start.

In an example, the first control circuit 54 and the driver circuit 52 may be disposed on the same circuit board. In an example, the first control circuit 54 and the driver circuit 52 may be disposed on different circuit boards.

The controller 53 may control, according to the operating parameter of the electric motor 421 and/or the battery parameter of the battery pack 115 detected by the parameter detection unit 51, the light emission circuit 542 to change the circuit state so that the light-emitting device 48 can change the light emission form to issue the alarm prompt. The operating parameter of the electric motor 421 may be the output current, output voltage, or output power of the electric motor 421, the operating time of the electric motor 421 within the nailing cycle (that is, the time of the nailing cycle), the nailing frequency, the number of revolutions of the electric motor within the nailing cycle, the temperature of the electric motor, or the like. The battery parameter may be the output voltage, current, energy consumption, or power consumption of the battery pack 115 within the nailing cycle, the temperature of the battery pack 115, or the like. For example, when determining the locked-rotor of the electric motor according to the current of the electric motor 421, the controller 53 may control the electric motor 421 to stop rotating and control the light emission circuit 542 to change the circuit state so that the light-emitting device 48 flashes and/or emits red light as an alarm prompt. In this example, the controller 53 may control the light-emitting device 48 to issue the alarm prompt in at least one form of the number of light-emitting devices, an emitted color, a light emission frequency, the number of flashes, a brightness level, or the content displayed through light emission. The controller 53 may also set an alarm according to the fault type or the fault level. During the start of the electric motor, it is determined whether the light emission control switch 541 is triggered. Thus, the light-emitting device is also in a start state when the electric motor starts, thereby further reducing the risk of a mistrigger. Moreover, on the premise that the light-emitting device can be started independently, the synchronicity of the light-emitting device with the electric motor can still be ensured. The prompt and alarm functions of the light-emitting device are better implemented.

In an example, the controller 53 may also control the light-emitting device 48 to display different prompt information when determining a relationship between the pressure in the cylinder 43 and a pressure threshold. For example, when the pressure is lower than the pressure threshold, the cylinder 43 may have the air leakage problem, and the controller 53 may control the light-emitting device 48 to output prompt information in a first manner. The first manner may include at least one of the number of light-emitting devices, an emitted color, a light emission frequency, a brightness level, or the content displayed through light emission. When the pressure is substantially equal to the pressure threshold, the controller 53 may control the light-emitting device 48 to emit no light or emit light in a second manner different from the first manner. When the pressure is greater than the pressure threshold, the controller 53 may control the light-emitting device 48 to emit light in a light emission manner different from the first manner and the second manner. Similarly, for the determination of the elastic force of the spring or a warning manner for the elastic force of the spring, reference may be made to the determination of the pressure in the cylinder 43 or the warning manner for the pressure in the cylinder 43, and the details are not repeated here.

Figure 50:
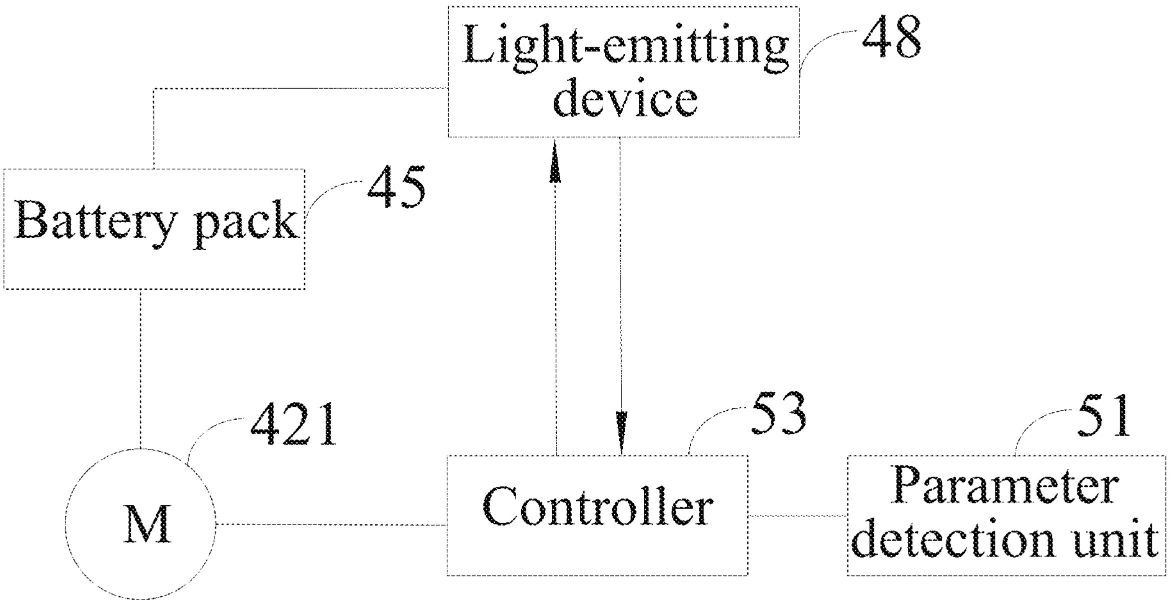
FIG. 50 is a control circuit diagram of a light-emitting device according to an example.

Referring to a control circuit of the light-emitting device shown in FIG. 50, some units or devices are consistent with those in FIG. 44 and use the same reference numerals as those in FIG. 44. The parameter detection unit 51 may include a sensor that can detect the total number of nails in the magazine assembly 44 or the number of remaining nails, a sensor that can detect the depth of the driven nail, or a sensor that can detect the nailing strength. Types, mounting positions, or operating manners of various sensors are not specifically limited in this example.

The controller 53 may acquire information transmitted by the parameter detection unit 51 and control the light-emitting device 48 to display first information about the nails in the magazine assembly 44 and/or second information about the driven nail. In an example, the first information may include the specific number of remaining nails in the magazine assembly 44, a number range of remaining nails, or alarm information when the number of remaining nails is less than a preset number. The second information may include the nailing depth, the nailing strength, or a nailing angle of the driven nail or a nailing interval between driven nails. A display screen may also be included. The Nixie tube may display the first information and/or the second information in one or more manners such as a light intensity, a flashing frequency, the number of flashes, an emitted color, and a light emission number. The display screen may directly display content data. The light-emitting device 48 may display the graphic of the nail and the number of nails, or display the image or depth of the nail driven out actually, or display a nailing animation. The light-emitting device is not limited to the Nixie tube or the display screen, and any light-emitting device that can display the preceding information is within the scope of the present application.

In an example, the controller 53 may also display fault information or a current operating mode of the nail gun 400 or information about the battery pack. The fault information may include various common faults, such as overtemperature, overvoltage, undervoltage, overcurrent, a locked-rotor, and anti-lock. The operating mode may include a single striking mode (that is, a single driving mode) and a continual striking mode (that is, a continual driving mode). Battery information may include the remaining electric quantity, remaining battery time, output voltage, output current, or temperature of the battery pack. In this example, the light-emitting device 48 may also display the fault information, the operating mode, or the information about the battery pack in at least one manner of the light intensity, the flashing frequency, the number of flashes, the emitted color, the light emission number, or content data display.

In an example, the light-emitting device 48 may be divided into an illumination device and a fault prompt device. In some examples, the illumination device and the fault prompt device may be the same device or different devices. If the illumination device and the fault prompt device are the same light-emitting device, when the nail gun 400 has no fault, the light-emitting device 48 remains in an always on state. When the nail gun 400 has a fault, the fault may be prompted in a manner such as the flashing frequency, the color, the number of flashes, or a fault code, or the light-emitting device may be off to prompt the fault. If the illumination device and the fault prompt device are different light-emitting devices, when the nail gun 400 has no fault, the illumination device may remain in the always on state, and the fault prompt device may remain in an always off state. When the fault occurs, the illumination device may remain always on or be off, and the fault prompt device may prompt the fault in the preceding fault prompt manner. If the illumination device and the fault prompt device are different light-emitting devices, when the nail gun 400 has no fault, the illumination device and the fault prompt device may both remain in the always on state. When the fault occurs, the illumination device may remain always on or be off, and the fault prompt device may be off to prompt the fault or prompt the fault in the preceding fault prompt manner. In an example, when or after prompting a fault type, the fault prompt device may prompt a fault level through the emitted color and/or the flashing frequency. For example, in response to no fault, a green light is always on; in response to a minor fault (such as undervoltage protection or overtemperature protection), a yellow light is on or flashes; and in response to a serious fault (such as overcurrent protection, locked-rotor protection, or anti-lock protection), a red light is on or flashes.

In an example, the parameter detection unit 51 may be a brightness sensor or another sensor that can detect the illumination intensity of a working environment of the nail gun. The controller 53 may control, according to the detected illumination intensity, whether the light-emitting device 48 is turned on or control the light intensity. For example, during outdoor work in the daytime with good weather, the light-emitting device 48 may be controlled to be off, or at least the illumination device may be controlled to be off. During indoor work in a dim environment, the brightness of the light-emitting device may be increased, or at least the brightness of the illumination device may be increased.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A fastener driver, comprising:

a striking assembly comprising a striker configured to strike a fastener;

a magazine for accommodating the fastener;

a trigger assembly operated by a user to switch between a first state in which the striker is allowed to strike the fastener and a second state in which the striker is forbidden to strike the fastener;

a lifting assembly, wherein at least part of the lifting assembly is movably disposed in the magazine to drive the fastener to move in the magazine; and a dry fire prevention assembly having a dry fire prevention state, wherein the dry fire prevention assembly comprises a stopper and, in the dry fire prevention state, the trigger assembly is forbidden by the stopper to switch to the first state;

wherein, when the trigger assembly obstructs the stopper from performing a first motion, the lifting assembly drives the stopper to perform a second motion.

2. The fastener driver according to claim 1, wherein the first motion is a first movement of rotating about a first axis along a first direction, and the second motion comprises the first movement of rotating about the first axis along the first direction and a second movement of rotating about a second axis along a second direction.

3. The fastener driver according to claim 1, wherein the lifting assembly comprises a first lifting portion, the stopper comprises a first abutment surface, and the first lifting portion abuts against the first abutment surface to drive the stopper to perform the first motion or the second motion.

4. The fastener driver according to claim 1, wherein, when the stopper performs the second motion, the lifting assembly drives the fastener to move.

5. The fastener driver according to claim 1, wherein at least part of the trigger assembly is configured to move along a first straight line, and the trigger assembly comprises an obstruction portion in a circumferential direction of the first straight line and a trigger portion extending substantially perpendicular to the first straight line.

6. The fastener driver according to claim 5, further comprising an elastic member, wherein, when the lifting assembly applies a first action force to the stopper and the obstruction portion applies a second action force to the stopper, the stopper applies a third action force to the elastic member to perform the second motion.

7. The fastener driver according to claim 6, wherein the elastic member drives the stopper to perform a third motion when the second action force decreases to zero.

8. The fastener driver according to claim 7, wherein the first motion is a first movement of rotating about a first axis along a first direction, the second motion comprises the first movement of rotating about the first axis along the first direction and a second movement of rotating about a second axis along a second direction, and the third motion comprises the first movement of rotating about the first axis along the first direction and a third movement of rotating about the second axis along a third direction.

9. The fastener driver according to claim 6, wherein the elastic member has an elastic force, and a ratio of the elastic force to mass of the stopper is greater than 1 N/g and less than or equal to 10 N/g.

10. The fastener driver according to claim 1, wherein the trigger assembly comprises an accommodation compartment, and the accommodation compartment accommodates at least part of an induction device that causes the trigger assembly to switch between the first state and the second state.

11. The fastener driver according to claim 1, wherein the dry fire prevention assembly comprises a limit portion that limits a magnitude of the second motion of the stopper.

12. The fastener driver according to claim 11, wherein the limit portion comprises an accommodation space, the stopper comprises a rotary portion accommodated in the accommodation space, and a length of the accommodation space in a front and rear direction limits the magnitude of the second motion of the stopper.

13. The fastener driver according to claim 12, wherein, in the front and rear direction, a ratio of the length of the accommodation space to a length of the rotary portion is greater than or equal to 1.2.

14. The fastener driver according to claim 11, wherein the limit portion is provided on the magazine.

15. A fastener driver, comprising:

a striking assembly comprising a striker configured to strike a fastener;

a magazine for accommodating the fastener;

a trigger assembly operated by a user to switch between a first state in which the striker is allowed to strike the fastener and a second state in which the striker is forbidden to strike the fastener;

a lifting assembly, wherein at least part of the lifting assembly is movably disposed in the magazine to drive the fastener to move in the magazine; and a dry fire prevention assembly, comprising a stopper, having a dry fire prevention state in which the trigger assembly is forbidden by the stopper to switch to the first state;

wherein, when a preset number of fasteners remain in the magazine, the lifting assembly drives the stopper to perform a motion, and the motion comprises a movement of rotating about a first axis and a movement of rotating about a second axis.

16. The fastener driver according to claim 15, wherein the stopper flips to allow at least part of the lifting assembly to be lifted when the preset number of the fasteners remain in the magazine.

17. A fastener driver, comprising:

a striking assembly comprising a striker configured to strike a fastener;

a magazine for accommodating the fastener;

a trigger assembly operated by a user to switch between a first state in which the striker is allowed to strike the fastener and a second state in which the striker is forbidden to strike the fastener;

a dry fire prevention assembly having a dry fire prevention state, wherein the dry fire prevention assembly comprises a stopper and, in the dry fire prevention state, the trigger assembly is forbidden by the stopper to switch to the first state;

a lifting assembly, wherein at least part of the lifting assembly is movably disposed in the magazine to drive the fastener to move in the magazine, and the lifting assembly is configured to drive the stopper to switch to the dry fire prevention state; and an elastic member abutting against the stopper;

wherein, when the trigger assembly is in the first state and obstructs the stopper from switching to the dry fire prevention state, the elastic member absorbs energy, and when the trigger assembly switches to the second state, the elastic member releases the energy to drive the stopper to switch to the dry fire prevention state.

18. The fastener driver according to claim 17, wherein at least part of the trigger assembly is configured to move along a first straight line, and the trigger assembly comprises an obstruction portion in a circumferential direction of the first straight line and a trigger portion extending substantially perpendicular to the first straight line.

19. The fastener driver according to claim 17, wherein the trigger assembly comprises an accommodation compartment, and the accommodation compartment accommodates at least part of an induction device that causes the trigger assembly to switch between the first state and the second state.

20. The fastener driver according to claim 17, wherein the elastic member has an elastic force, and a ratio of the elastic force to a mass of the stopper is greater than 1 N/g and less than or equal to 10 N/g.

* * * * *